US012703965B2

(12) United States Patent
Friesen et al.

(10) Patent No.: US 12,703,965 B2
(45) Date of Patent: Aug. 11, 2026

(54) SYSTEMS AND METHODS FOR GENERATING WATER FROM AIR USING A SOLAR COLLECTION AND REFRIGERATION SYSTEMS

(71) Applicant: Source Global, PBC, Scottsdale, AZ (US)

(72) Inventors: Cody Friesen, Scottsdale, AZ (US); Kamil Salloum, Scottsdale, AZ (US); Joshua Peterson, Scottsdale, AZ (US); Kimberly McGuinness, Scottsdale, AZ (US)

(73) Assignee: Source Global, PBC, Scottsdale, AZ (US)

( * ) Notice: Subject to any disclaimer, the term of this patent is extended or adjusted under 35 U.S.C. 154(b) by 401 days.

(21) Appl. No.: 18/124,196

(22) Filed: Mar. 21, 2023

(65) Prior Publication Data

US 2023/0304270 A1 Sep. 28, 2023

Related U.S. Application Data

(60) Provisional application No. 63/404,096, filed on Sep. 6, 2022, provisional application No. 63/355,032, filed
(Continued)

(51) Int. Cl.
*E03B 3/28* (2006.01)
*B01D 53/04* (2006.01)
*B01D 53/26* (2006.01)

(52) U.S. Cl.
CPC ............ *E03B 3/28* (2013.01); *B01D 53/0438* (2013.01); *B01D 53/0454* (2013.01); *B01D 53/261* (2013.01); *B01D 53/265* (2013.01)

(58) Field of Classification Search
CPC ......... E03B 3/28; B01D 53/26; B01D 53/261; B01D 53/265; B01D 53/0438; B01D 53/0454
See application file for complete search history.

(56) References Cited

U.S. PATENT DOCUMENTS 4,334,524 A * 6/1982 Mccullough .......... F24S 10/755 126/650
5,301,516 A * 4/1994 Poindexter ........... B01D 5/0039 165/72
(Continued)

FOREIGN PATENT DOCUMENTS

CN 2885942 Y * 4/2007
CN 102677739 B * 7/2014
(Continued)

*Primary Examiner* — Nathan C Zollinger
(74) *Attorney, Agent, or Firm* — Dennemeyer & Associates LLC

(57) ABSTRACT

Water generation systems and related methods of generating water from air are disclosed herein. In various embodiments, water generation systems and related methods comprise a solar unit or layer to convert solar radiation into heat and/or electrical energy, a sorption unit or layer comprising a hygroscopic material to capture water vapor from ambient air, a regeneration gas to accumulate water vapor from the sorption unit or layer, and a heat exchange assembly to condense water vapor from the regeneration gas to produce liquid water. Disclosed heat exchange assemblies can comprise a vapor-compression cycle or refrigeration circuit configured to circulate a refrigerant. A refrigerant evaporator can transfer heat from condensation of water vapor in the regeneration gas to the refrigerant and/or a refrigerant condenser can transfer heat from condensation of refrigerant vapor to the sorption unit or layer. Various embodiments
(Continued)

include a controller to adjust a system operational setpoint based on a system operational state and/or an environmental condition.

21 Claims, 42 Drawing Sheets

Related U.S. Application Data on Jun. 23, 2022, provisional application No. 63/322,583, filed on Mar. 22, 2022.

(56) References Cited

U.S. PATENT DOCUMENTS

| | | | | |
|---|---|---|---|---|
| 7,467,523 | B2 * | 12/2008 | Vetrovec | C02F 1/14 96/108 |
| 9,005,349 | B2 * | 4/2015 | Ball | F25B 37/00 95/231 |
| 10,583,389 | B2 * | 3/2020 | Stuckenberg | E03B 3/28 |
| 10,718,101 | B2 * | 7/2020 | Panda | B01D 53/261 |
| 10,804,841 | B2 * | 10/2020 | Weekley | H02S 40/44 |
| 10,835,861 | B2 * | 11/2020 | Friesen | B01D 53/261 |
| 11,285,435 | B2 * | 3/2022 | Friesen | B01D 53/30 |
| 11,623,178 | B2 * | 4/2023 | Ball | B01D 5/006 62/271 |
| 11,814,820 | B2 * | 11/2023 | Friesen | E03B 3/28 |
| 2007/0028769 | A1 * | 2/2007 | Eplee | B01D 53/06 95/113 |
| 2009/0151368 | A1 * | 6/2009 | Bar | B01D 5/0039 62/235.1 |
| 2021/0121821 | A1 * | 4/2021 | Ball | B01D 53/263 |
| 2023/0381710 | A1 * | 11/2023 | Balakrishnan | E03B 3/28 |
| 2023/0390696 | A1 * | 12/2023 | Friesen | C02F 1/325 |

FOREIGN PATENT DOCUMENTS

| | | | | |
|---|---|---|---|---|
| WO | WO-03073029 | A1 * | 9/2003 | B01D 5/0003 |
| WO | WO-2021195704 | A1 * | 10/2021 | |
| WO | WO-2023057801 | A1 * | 4/2023 | B01D 1/26 |

* cited by examiner

SYSTEMS AND METHODS FOR GENERATING WATER FROM AIR USING A SOLAR COLLECTION AND REFRIGERATION SYSTEMS

CROSS-REFERENCE TO RELATED APPLICATIONS

This application claims priority to, and the benefit of, U.S. Provisional Patent Application Ser. No. 63/322,583, filed on Mar. 22, 2022 entitled "SYSTEMS AND METHODS FOR GENERATING WATER FROM AIR", U.S. Provisional Patent Application Ser. No. 63/355,032, filed on Jun. 23, 2022 entitled "SYSTEMS AND METHODS FOR GENERATING WATER FROM AIR WITH RECUPARATIVE HEAT EXCHANGE", and U.S. Provisional Patent Application Ser. No. 63/404,096, filed on Sep. 6, 2022 entitled "SYSTEMS AND METHODS FOR GENERATING WATER FROM AIR", the disclosures of which are hereby incorporated by reference in their entirety.

TECHNICAL FIELD

This disclosure is related to systems and methods for generating liquid water from air.

BACKGROUND

Producing liquid water by extracting water vapor from ambient air or atmospheric air can present various challenges. Certain challenges are associated with maximizing a water production rate and/or efficiency at a low cost and high reliability. Additionally, there are challenges with employing desiccant or hygroscopic materials for water uptake and release of water vapor to produce liquid water. Water from air systems can include solid or liquid desiccants and other systems can require significant energy and operate inefficiently for water production due to various limitations.

There exists a need for improved systems and methods for efficient and consistent water production with hygroscopic systems in deployable form factors.

BRIEF SUMMARY

Water generation systems and methods of generating water from air are disclosed herein. In various embodiments, water generation systems comprise a solar unit or layer configured to convert solar radiation into heat and/or electrical energy; a sorption unit or layer comprising a hygroscopic material to capture water vapor from ambient air during a sorption mode or cycle; a regeneration gas to accumulate water vapor from the sorption unit or layer during a desorption mode or cycle; and, a heat exchange assembly to condense water vapor from the regeneration gas during the desorption mode or cycle.

In various embodiments, the heat exchange assembly includes a vapor-compression cycle or refrigeration circuit to circulate a refrigerant. In some embodiments, a refrigerant evaporator transfers heat from condensation of water vapor in the regeneration gas to the refrigerant. In some embodiments, a refrigerant condenser transfers heat from condensation of refrigerant vapor to the sorption unit or layer. In an embodiment, the heat exchange assembly condenses water vapor from the regeneration gas during the desorption mode or cycle. Various embodiments include a controller to adjust a system operational setpoint based on a system operational state and/or an environmental condition.

Methods of generating water from ambient air are also disclosed herein. In various embodiments, methods of generating water from air can include converting solar radiation into heat and/or electrical energy to power the water generation system. Disclosed methods can include flowing ambient air through a sorption unit or layer comprising a hygroscopic material to capture water vapor from ambient air during a sorption mode or cycle; transitioning to a desorption mode or cycle; and, flowing a regeneration gas to accumulate water vapor from the sorption unit or layer during a desorption mode or cycle. In an embodiment, the method comprises circulating a refrigerant in a vapor-compression cycle and condensing water vapor from the regeneration gas to produce liquid water.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. Views in the figures are drawn to scale (unless otherwise noted), meaning the sizes of the depicted elements are accurate relative to each other for at least the embodiment in the view.

Figure 1:
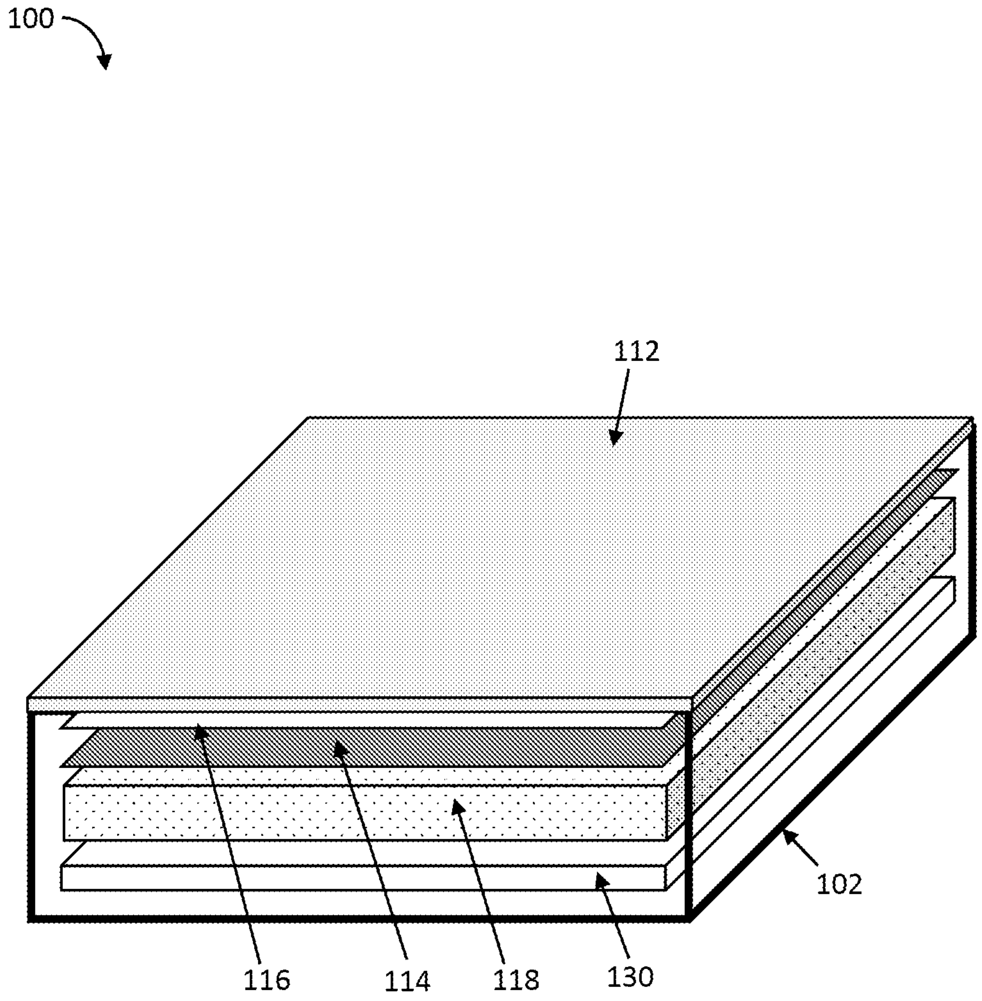
FIG. 1 illustrates a top-down perspective cross-sectional view of a water generation system, according to an embodiment.

For simplicity and clarity of illustration, the drawing figures show the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

DESCRIPTION OF ILLUSTRATIVE EMBODIMENTS

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure.

Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Surface shading lines may be used throughout the figures to denote different parts but not necessarily to denote the same or different materials.

This disclosure includes embodiments of systems and methods, such as, for example, for water treatment and storage. The term "coupled" is defined as connected, although not necessarily directly, and not necessarily mechanically. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately" and "about" may be substituted with "within [a percentage] of" what is specified, where the percentage includes 0.1, 1, 5, and 10%. Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, an apparatus that "comprises," "has," "includes," or "contains" one or more elements possesses those one or more elements, but is not limited to possessing only those elements Likewise, a method that "comprises," "has," "includes," or "contains" one or more operations or steps possesses those one or more operations or steps, but is not limited to possessing only those one or more operations or steps.

Any embodiment of any of the apparatuses, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. The feature or features of one embodiment may be applied to other embodiments or implementations, even though not described or illustrated, unless expressly prohibited by this disclosure or the nature of the embodiments.

As will be described in detail below, this disclosure describes various systems and methods for efficient water production from a process gas, for example ambient air. The systems and methods for producing water from ambient air can provide several advantages including efficient and consistent production of liquid water from air across varying environmental conditions to autonomously drive efficient water vapor capture and release from a hygroscopic material. Systems and methods described herein provide opportunities for water production from air with limited power availability and/or without external power in robust and deployable form factors. Prior water-from-air devices are limited in low water production or high external or non-renewable power requirements. Systems and methods for highly efficient water production enabled by independent power and energy management will become apparent from the following disclosure.

FIG. 1 depicts a water generation system 100 for generating liquid water from a process gas containing water vapor, for example ambient air at atmospheric temperature and pressure. System 100 comprises a solar thermal unit, for example configured as a top cover and/or glazing layer(s) 112 coupled to a housing 102 such that an outer top surface is exposed to the ambient environment to collect solar radiation. Furthermore, system 100 includes a power generation unit or a solar power unit, or more particularly a photovoltaic (PV) panel or layer 114 comprising one or more photovoltaic cells. In some embodiments, water generation system 100 can further comprise at least one interstitial layer (e.g., 116) below the top cover layer 112 for improving solar radiation collection.

Water generation systems of the present technology can comprise a solar unit or solar layer which can include the assembly of a solar thermal unit (e.g., glazing layer(s) 112), PV layer(s) (e.g., PV panel 114), and/or interstitial layer(s) (e.g., interstitial glazing 116). In some embodiments, water generation systems of the present technology comprise a solar layer that is configured to generate both thermal energy (e.g., with a solar absorber) and electrical energy (e.g., a solar cell) from the sun. In one embodiment, water generation systems of the present technology are configured to generate electricity from photovoltaic module(s), panel(s) or layer(s) and heat is generated primarily via waste heat from the photovoltaic cell(s).

Water generation systems of the present disclosure can convert solar radiation or insolation to thermal energy by transferring energy from sunlight to a regeneration fluid, heat absorbing fluid or working fluid that flows through the water generation system. In some embodiments, the water generation system can convert solar radiation or insolation to both thermal and electrical energy, for example via a solar unit including one or more glazing layer(s) and photovoltaic layer(s). In one embodiment, the water generation system is configured to convert solar radiation or insolation to electrical energy via photovoltaic module(s), panel(s) or layer(s) generating waste heat that can be harvested (e.g., at maximum power point (MPP), about 15-25% of the incident sunlight can be converted into electricity, with the remainder being converted into heat which can be transferred to hygroscopic materials of the system for water vapor desorption).

Figure 2A:
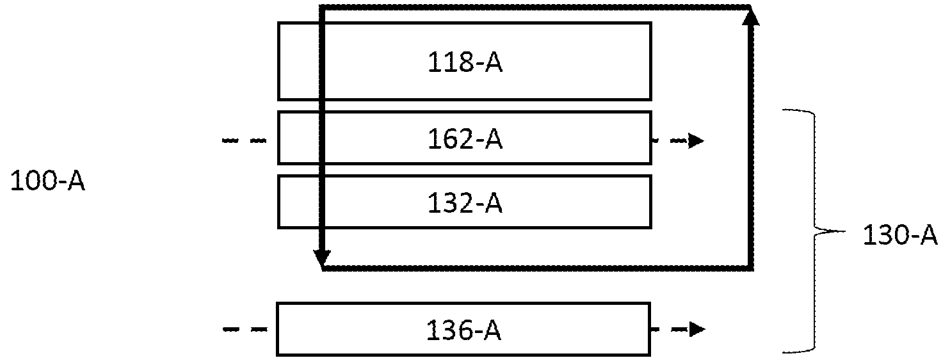
FIG. 2A shows a block diagram of a water generation system comprising a vapor-compression cycle, according to an embodiment.
Figure 2B:
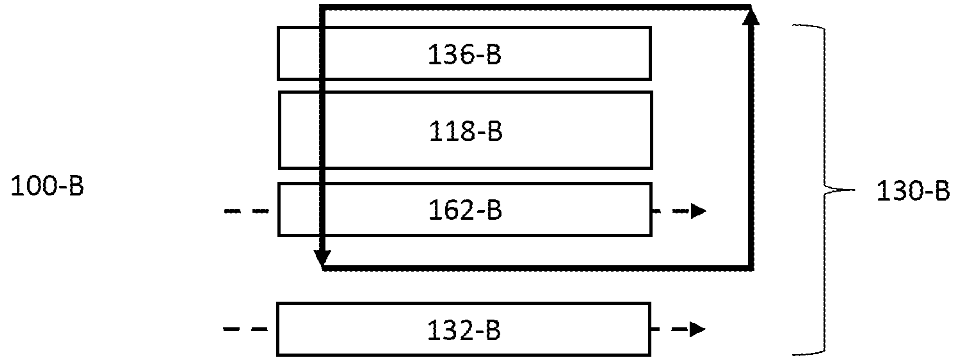
FIG. 2B shows a block diagram of a water generation system comprising a vapor-compression cycle, according to an embodiment.
Figure 2C:
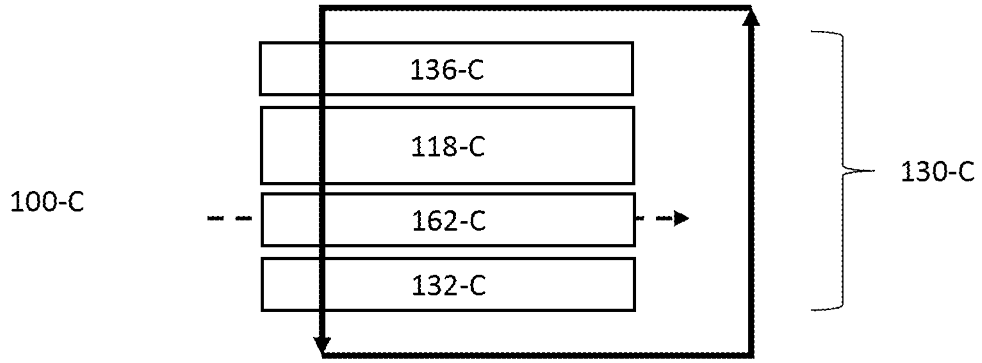
FIG. 2C shows a block diagram of a water generation system comprising a vapor-compression cycle, according to an embodiment.
Figure 3:
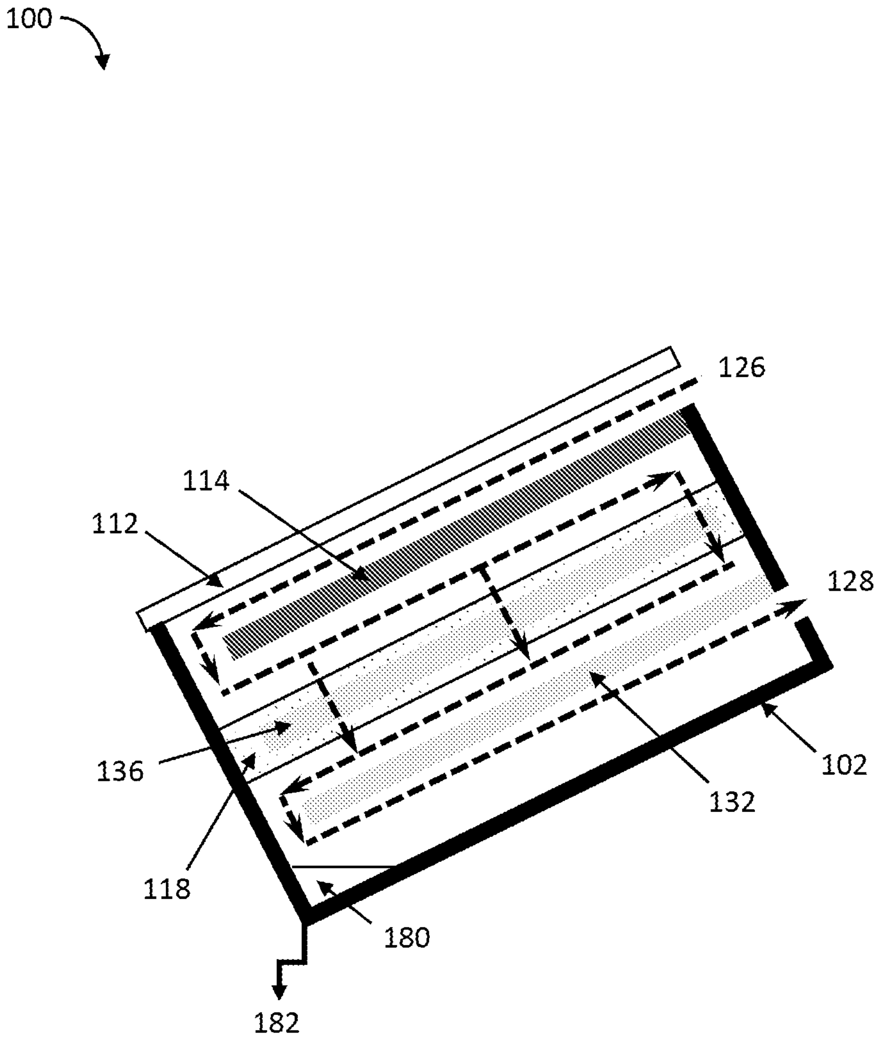
FIG. 3 illustrates a side cross-sectional view of a water generation system, according to an embodiment.

Turning again to FIG. 1, top cover layer 112 comprises an outer surface exposed to ambient air and an inner surface opposite from the outer surface. The top cover or glazing layer can include a transparent material (e.g. glass) allowing solar radiation to pass into the interior of the water generation system 100. In some embodiments, the top cover layer can comprise one or more photovoltaic panels including PV cells for converting solar radiation to electrical energy. Furthermore, one or more interstitial layers can comprise an assembly including one or more photovoltaic (PV) panels or layers for converting solar radiation to electrical energy, one or more glazing layers (e.g., transparent layers, glass layers) or a combination thereof. In some embodiments, optional interstitial glazing layers can be distinct layers from one or more photovoltaic layers (e.g., separated by a gap), such as depicted in FIG. 1 (i.e., interstitial glazing layer 116 is positioned above and spaced apart from photovoltaic layer 114). However, in other embodiments, an interstitial layer can be integrally formed or comprise both a glazing portion (e.g., glass) and a photovoltaic unit or portion (e.g., photovoltaic cells), in addition to other components (e.g., encapsulation materials, electrical wiring, and/or the like). In some embodiments, water generation systems of the present disclosure can comprise a photovoltaic panel or layer 114 below and spaced apart from top cover layer 112 without any intervening layer(s), such as depicted in FIG. 3. In FIG. 1-4, sorption layer 118 is positioned below and spaced apart from glazing layer 112 and interstitial photovoltaic layer 114, however other configurations are also possible.

In some embodiments, the water generation systems can be configured as a solar glazed or unglazed thermal collector (s) to convert radiant solar energy into thermal energy, and in turn, heat the sorption layer and/or regeneration fluid. Furthermore, some water generation systems can include hybrid solar collectors, or photovoltaic thermal solar collectors that convert solar radiation into both thermal and electrical energy such that the generated heat is transferred to the sorption layer and/or regeneration fluid and the generated electricity powers the components of the water generations system (e.g., fan(s), compressor(s), controller(s) and/or the like).

Water generation system 100 further comprises a sorption unit, body or layer 118. The sorption unit, layer or body 118 can comprise a light absorbing material configured to absorb solar radiation, for example during daytime hours. In an embodiment, the sorption layer 118 comprises or is formed of a hygroscopic material, hygroscopic body, hygroscopic composite and/or hygroscopic assembly configured to capture (e.g., adsorb, absorb) water vapor from a process gas (e.g., ambient air at atmospheric pressure) upon flow across and/or therethrough, for example during a sorption cycle (e.g., nighttime hours). Furthermore, the sorption layer 118 can be configured to transfer water vapor heat and/or heat to a regeneration or working gas during an unloading, release or desorption operational cycle. In embodiments where the sorption unit, body or layer comprises a hygroscopic material, it can also be referred to as a hygroscopic unit, body or layer.

In many embodiments the sorption layer(s) (e.g., 118) comprise or are formed of a porous hygroscopic layer, material, composite, body or assembly configured to capture and release water vapor upon exposure to a process gas (e.g., ambient air) and can have various compositions and structures which will be described in more detail below. For ease of description, the following terms will be used to describe hygroscopic or water vapor sorption/desorption portions or layers within the water generation system, unless otherwise noted.

The term "hygroscopic media" or "hygroscopic material" is used herein to describe a functional material involved in absorption/adsorption and desorption of water.

The term "support media" or "support substrate" is used herein to describe a support structure that has a tuned or specified pore distribution to support a deliquescent salt or hygroscopic material, for example such that as the hygroscopic material gains water and transitions to a liquid state, the resulting capillary forces generated by the interaction of the liquid and the pore walls substantially retains the liquid in the pore structure.

The term "hygroscopic composite" or "composite material" is used herein to describe the combination of the support media and the hygroscopic media. The hygroscopic media is supported in and on the surfaces defined by the internal pore structure and external surface geometry of the support media.

The term "hygroscopic composite assembly" or "composite assembly" is used herein to describe the assembly, form, or structure created to hold the "hygroscopic composite" into a functional part that meets the physical criteria of the system including structural properties, pressure drop, flow paths, and thermal properties. The composite assembly can be a loose packed structure of the composite material held within a frame, or it can itself be a composite structure containing the composite material, a binder, and/or structural components that form a rigid self-supporting composite.

In various embodiments, the sorption layer can be configured as one or more porous hygroscopic body or layer, for example as a hygroscopic composite including a support substrate. The 'porous' or 'porosity' term used herein can describe a flow-through implementation, as opposed to flow-over or flat plate implementation of the sorption layer. While flow-over or flat plate implementations could be employed without departing from the scope of this invention, it can be preferable to keep the boundary layers small with a high degree of percolation for example as can be provided in porous flow-through bodies, units or layers. A porous hygroscopic material, composite, composite assembly or layer can be further configured to absorb thermal energy (e.g., radiative solar thermal energy) and release captured water vapor to a working or regeneration fluid, for example during a desorption/release operational mode or cycle. In one example, a hygroscopic material and/or composite can be arranged within a flow distributor, such as but not limited to a lattice structure, top and bottom rigid porous plates, inter-corrugated fluidic channels, interdigitated fluidic channels, and/or woven and fiber meshes to sustain back pressure and distribute the flow. A hygroscopic composite can be further configured as a composite assembly such that its structure provides the system with structural properties, pressure drop, flow paths, and/or thermal properties.

The sorption layer can be configured to receive heat from at least one thermal source to desorb water vapor captured therein during a desorption mode or cycle. For example a regeneration gas, solar radiation or insolation, a photovoltaic cell, a heater, a heat exchanger, a condenser of a vapor-compression cycle or a combination thereof can be provided as a thermal source. Furthermore, the regeneration gas can accumulate heat and/or water vapor upon flowing across or through the sorption layer comprising a hygroscopic material.

Water generation systems of the present technology can include or be integrated with a vapor-compression cycle (VCC) configured to circulate a refrigerant in a closed circuit. One or more of components of the vapor-compression cycle (i.e., for compression, condensation, expansion, and evaporation of the refrigerant) can be integrated with or formed with other components of the water generation system. FIG. 2A, FIG. 2B and FIG. 2C depict various examples of water generation systems comprising a vapor compression cycle (VCC) to illustrate variations in the way the VCC components exchange heat with a regeneration gas flowing in a regeneration flow path of the water generation system. For ease of description, a solar layer is not depicted in FIG. 2A, FIG. 2B and FIG. 2C, however a solar layer is preferably present to generate electricity (e.g., to power a refrigerant compressor of the VCC), generate heat (e.g., to heat the regeneration gas in advance of a sorption layer), or a combination thereof.

Unless otherwise specified below, the numerical indicators used to refer to components in FIG. 1 are similar to those used to refer to components or features in FIG. 2A, FIG. 2B and FIG. 2C, except that a hyphenated reference letter has been added to the numerical indicator for ease of description (i.e., numerical indicators of FIG. 2A include "-A", numerical indicators of FIG. 2B include "-B", and numerical indicators of FIG. 2C include "-C").

Water generation system 100-A comprising heat exchange assembly 130-A (FIG. 2A), water generation system 100-B comprising heat exchange assembly 130-B (FIG. 2B) and water generation system 100-C comprising heat exchange assembly 130-C (FIG. 2C) are each configured to direct a regeneration gas through a closed loop regeneration flow path (depicted as thick solid arrows) during a desorption, release or unloading operational cycle. Heat exchange assemblies 130-A, 130-B and 130-C each comprise a refrigeration or VCC circuit configured to circulate a refrigerant in a closed refrigerant loop from a refrigerant evaporator (i.e., 132-A, 132-B, 132-C), a refrigerant compressor (not shown), a refrigerant condenser (i.e., 136-A, 136-B, 136-C), and a refrigerant expansion device (not shown).

In water generation system 100-A of FIG. 2A, the regeneration flow path (indicated as thick solid arrows) is configured to flow regeneration gas through sorption layer 118-A, heat exchanger 162-A and refrigerant evaporator 132-A such that refrigerant evaporator 132-A transfers heats from condensation of water vapor in the regeneration gas to the refrigerant, thereby driving condensation of water vapor from the regeneration gas during a desorption mode or cycle. In FIG. 2A, refrigerant condenser 136-A is not configured to transfer heat to the sorption layer 118-A. Furthermore, a cooling flow path (indicated by dashed arrows) directs a cooling fluid (e.g., ambient air) across or through heat exchanger 162-A and refrigerant condenser 136-A so as to reject heat to the ambient environment and further drive condensation of water vapor from the regeneration gas. In FIG. 2A, refrigerant evaporator 132-A is configured as, coupled to, or integrated with a liquid water condenser to function as a heat exchanger transferring heat from the regeneration gas (and/or latent heat form condensation of water vapor from regeneration gas) to refrigerant circulating through refrigerant evaporator 132-A so as to drive condensation of water from the regeneration gas.

In water generation system 100-B of FIG. 2B, the regeneration flow path (indicated as thick solid arrows) is configured to flow the regeneration gas through refrigerant condenser 136-B, sorption layer 118-B, and heat exchanger 162-B such that refrigerant condenser 136-B transfers heat from condensation of refrigerant vapor to heat the regeneration gas (e.g., to heat sorption layer via convection) and/or sorption layer 118-B (e.g., via conduction) so as to drive desorption of water vapor from sorption layer 118-B. In FIG. 2B, refrigerant condenser 136-B is configured as or integrated with the sorption layer 118-B to transfer heat from the refrigerant circulating through refrigerant condenser 136-B to the regeneration gas and/or sorption layer 118-B such that heat from condensation of refrigerant vapor is transferred to the sorption layer 118-B. In FIG. 2B, refrigerant evaporator 132-B is not configured to receive heat from the regeneration gas. Furthermore, a cooling flow path (indicated by dashed arrows) can be configured to direct a cooling fluid (e.g., ambient air) across or through refrigerant evaporator 132-B and/or heat exchanger 162-B so as to reject heat to the ambient environment and further drive condensation of water vapor from the regeneration gas.

The water generation system 100-C of FIG. 2C is a hybrid example wherein the regeneration flow path (indicated as thick solid arrows) is configured to flow regeneration gas through refrigerant condenser 136-C, sorption layer 118-C, heat exchanger 162-C and refrigerant evaporator 132-C such that 1) heat from condensation of refrigerant vapor heats the regeneration gas and/or sorption layer 118-C, and 2) refrigerant evaporator 132-C transfer heats from condensation of water vapor in the regeneration gas to the refrigerant, thereby driving both desorption of water vapor from sorption layer 118-C and condensation of water vapor from the regeneration gas during a desorption mode or cycle.

Figure 4A:
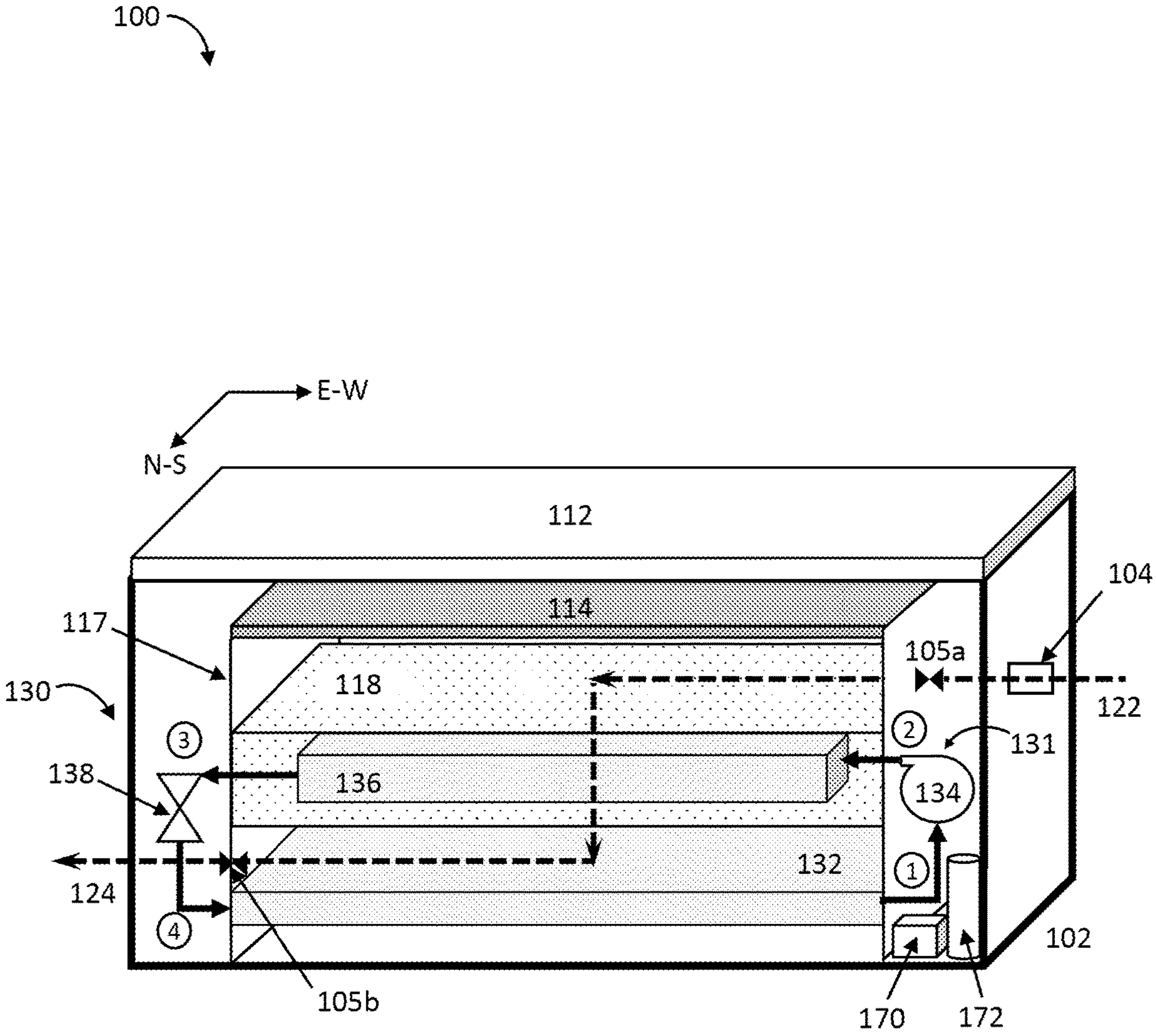
FIG. 4A illustrates a side perspective cross-sectional view of a water generation system including a process flow path, according to an embodiment.

FIG. 4A illustrates a cross-sectional view of water generation system 100 during a sorption, uptake or loading operational cycle. As depicted in FIG. 4A, a process flow path (indicated by dashed lines) can direct ambient air into process inlet 122. Process gas, for example ambient air, from outside system 100 can be transported into system 100, for example via a blower or fan assembly 104 and/or valve 105*a*. In various embodiments, one or more filters can be provided to filter process gas (e.g., remove contaminants like dust and the like from ambient air) in advance of ingress into system 100. For example, a porous filter layer can be included as part of fan assembly 104 and/or valve 105*a*. During the sorption operational mode, ambient air can enter process inlet port 122 (e.g., via actuation of fan assembly 104 and/or valve 105*a* by system controller 170). Upon entering process inlet port 122, process gas can be transported through system 100 along a process flow path (e.g., process flow path indicated by dashed lines in FIG. 4A) including sorption layer 118 before exiting system 100 through outlet 124, for example via outlet valve 105*b*. The example of FIG. 4A depicts one fan assembly and two valves to control flow of process gas, e.g., ambient air, through system 100, however other configurations are also possible. Any suitable or desirable number or type of fans, blowers, valves, inlets, outlets, separately or in combination, can be used to direct, manage or control flow through system 100. In some embodiments, various flow management elements can passively or actively seal one or more interior chambers closed. Furthermore, system 100 can include one or more valves or mechanisms for flow bypass and/or alternative fluid passageway configurations, as well as to provide a system-wide or total ingress protection mode wherein the system 100 is partially or fully sealed from the outside environment, for example in response to a severe weather event forecast or standby mode. The system can include valves operating under any number of mechanisms including but not limited to inflatable valves, iris valves, butterfly valves, poppet valves, actuated valves, passive valves, active flow directing valves, restricting valves and/or the like.

Figure 4B:
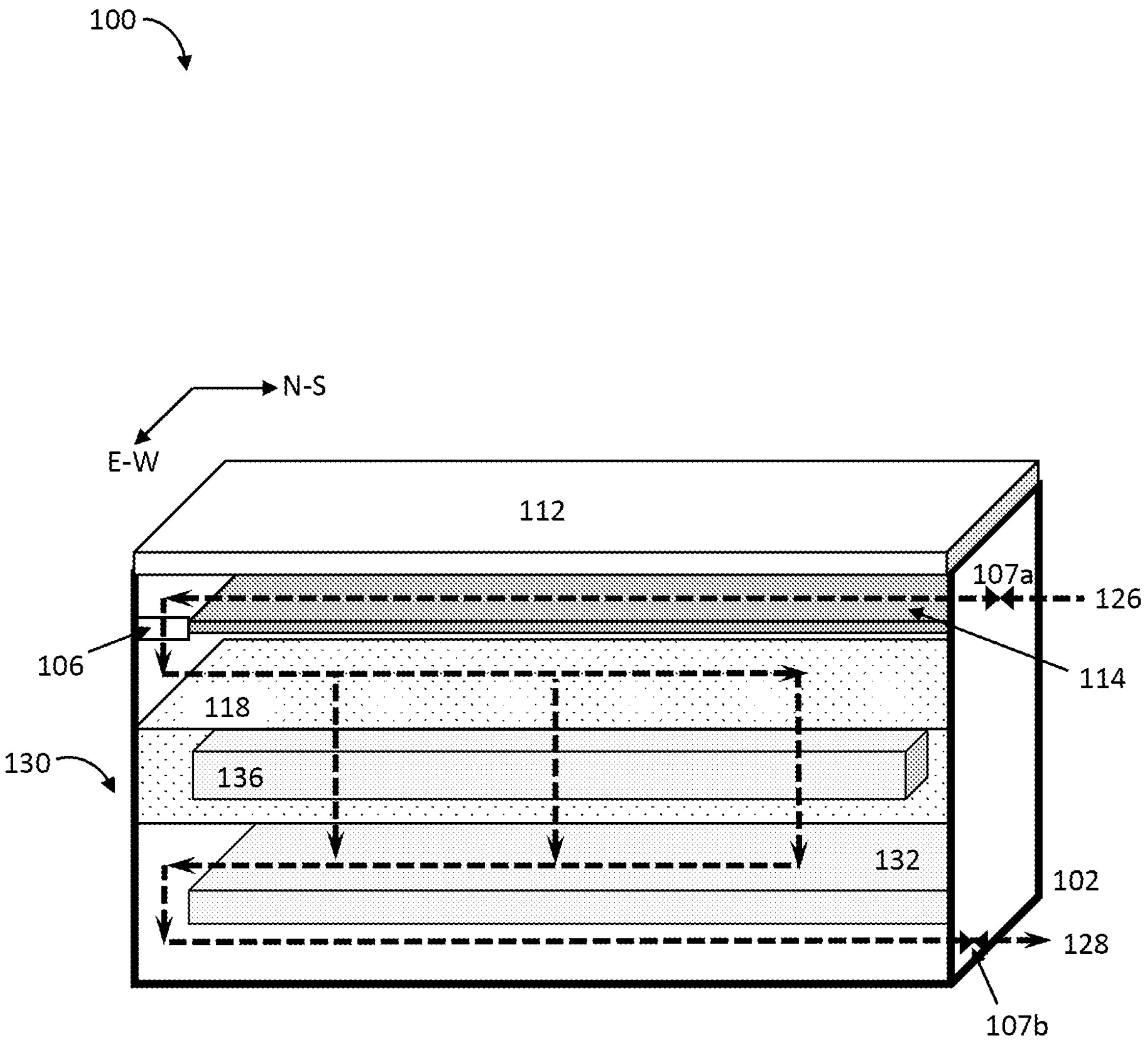
FIG. 4B illustrates a side perspective cross-sectional view of a water generation system including a regeneration flow path, according to an embodiment.

Water generation system 100 can be configured to direct a regeneration fluid or gas through a regeneration flow path. FIG. 3 and FIG. 4B depict a regeneration flow path (indicated by dashed lines) wherein a regeneration gas flows into water generation system 100 via regeneration inlet 126, through the interior of water generation system 100, and exits via regeneration outlet 128 during a desorption, release or unloading operational cycle. The regeneration gas, for example air, from outside system 100 can be transported into system 100, for example via a blower or fan assembly 106 and/or valve 107*a*. In various embodiments, one or more filters can be provided to filter regeneration gas (e.g., remove contaminants like dust and the like from ambient air) in advance of ingress into system 100.

As shown in FIG. 3 and FIG. 4B, the regeneration flow path first directs regeneration gas to a top flow path segment or upper portion of the water generation system, in particular between glazing layer 112 and PV panel 114, to collect heat and then through the sorption layer 118 to collect additional heat and/or water vapor. This may result in heat being substantially extracted or directed away from upper layers of the system, such as glazing layer(s) 112 (and interstitial layer(s) 116, if present), keeping such layers relatively cool. In at least some examples, water generation systems of the present disclosure may be configured such that the temperature gradient increases along the depth of the water generation system, in the direction that a regeneration fluid or gas flows along a regeneration flow path within the water generation system.

In the example depicted in FIG. 4A and FIG. 4B, four inlet/outlet ports (i.e., 122, 124, 126, 128), two fan assemblies (i.e., 104, 106) and four valves (i.e., 105*a-b*, 107*a-b*) are depicted to direct fluid or gas through a process flow path (i.e., dashed lines of FIG. 4A) and a regeneration flow path (i.e., dashed lines of FIG. 4B), however other embodiments may employ different numbers or configurations of inlets, outlets, blowers, fans, circulators or valves, for example in association with any suitable or desirable fluid movement or routing devices to manage flow into, through and/or out of water generation system 100. In one example, a single inlet, a single outlet and single fan assembly are employed to direct a process gas through water generation system 100 during the sorption cycle or mode, and to direct a regeneration gas through water generation system during the desorption cycle or mode. To minimize complexity, maintenance, leakage and/or cost, fewer or simplified fans, blowers, actuators, valves and other fluidic routing devices can also be employed in the water generation system.

The regeneration gas can accumulate heat from one or more thermal sources during operation, for example during the desorption cycle. In many embodiments, the regeneration gas can accumulate heat from solar radiation impinging on one or more internal surfaces or bodies within water generation system 100, for example from porous sorption layer 118. In some embodiments, one or more heating elements can be incorporated into one or more layers of the system (e.g., glazing layer 112 and/or interstitial layer 116, if present) and for example, can be activated, via a system controller (e.g., 170), based on an ambient condition (e.g., if solar irradiance or insolation is below a predetermined threshold), a system operational condition (e.g., if regeneration fluid temperature or system water content is below a predetermined threshold) and/or the like. The configuration of the water generation system may also result in heat from solar radiation being directed to and retained in the most insulated areas of the water generation system, reducing radiative losses from the system. Furthermore, the regeneration fluid may collect heat from the PV layer or panel 114 from a top surface and then a bottom surface of the PV layer or panel 114 as depicted in FIGS. 3 and 4B. Because photovoltaic cells operate more efficiently when they are cooled, the regeneration fluid collecting heat from the PV panel 114 may maintain or improve the efficiency of the PV panel 114, as well as increasing the amount heat absorbed by the regeneration fluid. The front and/or rear sides of the PV panel may be modified to promote flow interaction with the panel to enhance cooling of the panel. Additionally, the cell layout and wiring of the panel may be configured to maximize the panels performance considering temperature gradients across the panel.

In some embodiments, the regeneration gas can collect heat from a nearby or accessory waste heat-generating system, for example a waste heat-generating system that comprises a heating fire (e.g., a campfire, a gas heater and/or stove, etc.), a heating element, an electric generator, a photovoltaic system, a fuel cell, a battery, a heat engine (e.g., an internal combustion engine of a vehicle), multiple computer servers (e.g., a server farm), a refrigeration system (e.g., an air conditioner, a refrigerator, etc.), geothermal energy and/or the like.

In some embodiments, water generation system 100 can include or be integrated with a vapor-compression or refrigeration cycle or can include or be integrated with a subsystem comprising one or more components for compression, condensation, expansion, and evaporation of a refrigerant circulating in a closed circuit. Furthermore, some water generation systems 100 can include or be integrated with a vapor-compression or refrigeration cycle comprising one or more components for recuperation (e.g., a waste heat recuperator for counter-flow energy recovery heat exchange positioned between a refrigerant evaporator and a refrigerant condenser). Various examples will be described in more detail below.

As depicted in FIG. 4A and FIG. 4B, water generation system 100 further comprises a heat exchange assembly 130 for increasing the relative humidity and/or the partial pressure of water vapor in the regeneration fluid to drive condensation of water vapor from the regeneration gas during the desorption cycle. The heat exchange assembly 130 can be configured to reduce the temperature of the regeneration fluid by rejecting heat to ambient and/or another heat absorbing fluid, e.g., a refrigerant. The heat exchange assembly 130 can be configured as a single unit provided as an assembly of components (e.g., including all components of a refrigeration circuit) or be a component of a larger refrigeration or heat transfer cycle (e.g., including some components of a refrigeration circuit, a heat exchanger and/or the like).

In one example, heat exchange assembly 130 comprises liquid water condenser 132. The liquid water condenser 132 can be configured to provide a high surface area for heat transfer for condensation of water vapor from the regeneration fluid with minimal pressure drop upon flow across or therethrough. For example, liquid water condenser 132 can comprise a heat sink and/or heat transfer surfaces (e.g., heat dissipating surfaces, fins, ridges, ribs, protrusions, clamshell, passive heat sink and/or the like) to reject heat from the regeneration gas to the ambient environment. In some embodiments, the heat exchange assembly 130 and/or liquid water condenser 132 can form an outer portion of the housing 102 so as to reject heat to the ambient environment. In other embodiments, the heat exchange assembly can be located entirely within the housing 102.

In addition to heat dissipating features, heat exhaust approaches and/or active or passive flow directing elements, additional components can be included to improve water production efficiency, for example, to improve the efficiency of the liquid water condenser (e.g., 132) condenser for the production of water from the regeneration flow path. This can be advantageous, for example when the system is in a high system water content states such that the hygroscopic materials of the system and/or the regeneration fluid are water rich (e.g., high absolute humidity, high equilibrated humidity or equilibrated water content of hygroscopic materials) to balance the efficiency of water release relative to water uptake. In some operational conditions or system states, water condensation can limit water production rather than water uptake or other system functions being limiting. In such states, it may be preferable to boost or improve the systems water condensation efficiency, for example by providing additional power to the cool condenser (e.g., increase power to a cooling fan for ambient air cooling) and/or refrigeration circuit (e.g., increase power to refrigerant compressor).

Liquid water condensers (e.g., 132) of the present disclosure can be configured as an air-cooled condenser (e.g., formed from plastic and/or metallic materials) that can condense water from the regeneration fluid of the regeneration flow path. The system can power (e.g., via onboard PV or battery power) blower(s) or fan(s) (e.g., fan 104) to flow ambient air over the condenser (e.g., 132), thereby improving heat transfer, condenser efficiency and therefore water production. In such implementations, ambient air cools (via heat transfer across condenser surfaces) the hot regeneration fluid flowing through the condenser in order to extract water and excess heat is exhausted to the outside environment.

In some embodiments, the liquid water condenser (e.g., 132) can be cooled via liquid water, coolant or refrigerant flow inside (via internal piping) and/or outside (via external surfaces) of the condenser. Refrigerant, coolant or water-cooled condensers can be configured as tube-and-fin, shell-and-tube, plate-type or similar heat exchangers in which a radiator, cooling tower and/or other external cooling source cools the regeneration fluid flowing in condenser. Tube-and-fin heat exchange condensers can be formed from highly thermally conductive materials such as copper and aluminum. In such implementations, the regeneration fluid and the refrigerant or coolant do not directly contact each other, but rather flow in separate passageways within the heat exchanger or condenser designed for close contact for efficient heat transfer. The refrigerant or coolant can flow over and/or inside conduits or tubes to absorb the heat from the regeneration fluid so as to reduce the regeneration fluid flow temperature to below the dew point of the regeneration fluid, thereby condensing water on the regeneration fluid-side of the condenser.

While ambient air-cooled heat exchangers or condensers of the present disclosure can be simple in design and easy to manufacture, low heat transfer performance can limit water production rates of the system. As will be described in more detail below, a refrigeration circuit, either alone or in combination with an ambient air-cooling fan assembly can be employed. In some implementations, water generation systems can operate in a hybrid or dynamic manner wherein an operational setpoint is adjusted (e.g., power distribution between ambient air cooling fan and refrigeration circuit via controller) based on a system operational state (e.g., system power state, system water content) and/or an environmental condition (e.g., ambient relative humidity, ambient temperature) to improve water production performance.

During the desorption operational cycle or mode, the regeneration flow path (indicated by dashed line in FIG. 3 and FIG. 4B) directs the regeneration gas along the inner surface of the top glazing layer 112 and the top surface of a PV layer 114 to accumulate heat therefrom, and then flows down through porous sorption layer 118 to accumulate water vapor from the sorption layer comprising a hygroscopic material during the desorption cycle. The regeneration gas flows across or through condenser 132 before being exhausted to the ambient environment via outlet 128.

FIG. 3 and FIG. 4B depict a regeneration flow path configured to flow regeneration gas in an open loop and/or single pass such that the regeneration gas is exhausted to the ambient environment after condensation of water vapor from the regeneration gas by liquid water condenser 132. However, in other embodiments, the regeneration flow path can be configured to flow regeneration gas in a closed loop such that at least a portion of the regeneration gas is recirculated within water generation system. For example, FIG. 7 depicts water generation system 200 comprising a regeneration flow path configured to flow regeneration gas in a closed loop through system 200.

In various embodiments, it may be preferable to configure the regeneration flow path in a single pass or open loop rather than a closed loop or recirculating path. In a single pass, open loop regeneration flow path, an inlet (e.g., 126) inputs ambient air (i.e., acting as the regeneration fluid) to accumulate heat from the solar unit (e.g., glazing 112, PV panel 114 and/or interstitial layer(s) 116, if present), then flows through the sorption unit (e.g., 118) to accumulate water vapor therefrom, and then to a heat exchange assembly or liquid water condenser (e.g., 132) before being exhausted to the ambient environment via an outlet (e.g., 128) during the desorption cycle or mode. The open loop or single pass flow architecture can have the advantage of inputting a regeneration fluid, i.e., ambient air, that has a lower water content, lower absolute relative humidity and/or lower relative humidity than the regeneration fluid exhausted via the outlet. As such, the driving force for desorption of water vapor from the sorption layer is greater than if wetter regeneration fluid, i.e., as part of the closed loop recirculation, as the wetter air can retard the desorption performance of sorption layer. However, because the "fresh" ambient air input to the regeneration flow path in the open loop configuration can also be colder than that exhausted from the system, the integrated refrigeration circuit can be dynamically operated such that the temperature and humidity shift in the psychrometric chart for a single pass to ensure both desorption and condensation of water in a single pass. In other words, it is not necessary, to desorb and condense all or the majority of the water in the single pass. Rather, the system can realize operational efficiency by condensing less than the majority of the water captured on a prior sorption, uptake or loading cycle (e.g., condense less than 50%, less than 30% of the water content of the hygroscopic or sorption layer(s) of the system). A system controller can be configured to dynamically adjust the amount of electrical energy directed to the refrigeration circuit based on an environmental condition, a system power state, a system water content, or combinations thereof. As an illustrative example, the controller can be configured to redirect electrical energy from the refrigeration circuit to one or more fans to cool the heat exchange assembly via ambient air flow if the regeneration fluid output reaches a threshold temperature (e.g., is below a predetermined threshold value indicating that the refrigeration circuit can be operated with less power draw).

Unless otherwise specified below, the numerical indicators used to refer to components in FIG. 7-16 are similar to those used to refer to components or features in FIG. 1-4 above, except that the index has been incremented by 100.

Figure 7:
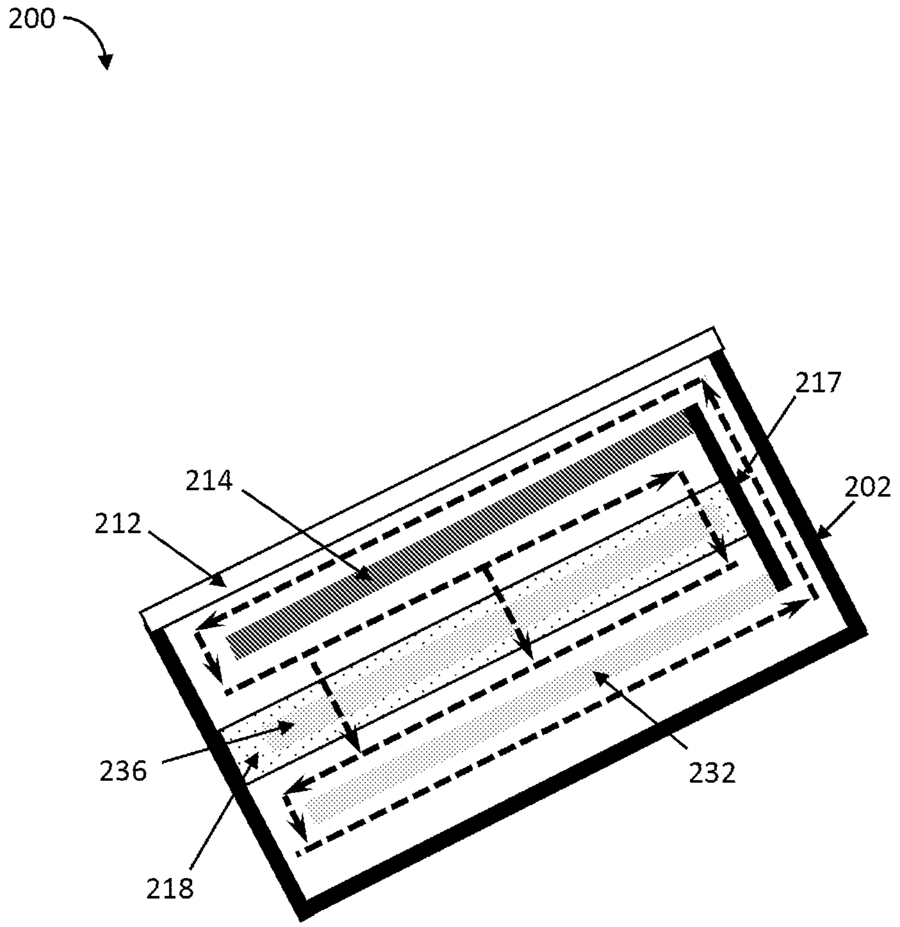
FIG. 7 illustrates a side cross-sectional view of a water generation system including a closed-loop regeneration flow path, according to an embodiment.

As shown in FIG. 7, a closed-loop or fully recirculating system 200 comprises a regeneration flow path (indicated by dashed lines) that directs regeneration gas between glazing layer 212 and PV panel 214, to collect heat, through the sorption layer 218 to collect additional heat and/or water vapor, and across or through condenser 232 for cooling and condensation of water vapor before being redirected back to the upper layer of the system 200 in a closed loop manner. In this way, heat and/or moisture are recycled within system 200.

In some embodiments, water generation system can be operated between an open loop and closed loop cycle such that controller (e.g., 170) operates the system in an open loop mode during a first time period and operates the system in a closed loop mode during a second time period. Furthermore, water generation system can be operated in a hybrid or partial closed loop mode such that a passive or active flow diverter (e.g., actuated by controller 170 during a third time period) directs or recirculates a first portion of the regeneration fluid within the system and exhausts a second portion of the regeneration fluid to the ambient environment. In this way, at least a portion of heat and/or moisture in the regeneration fluid can be recycled or recirculated back to the condenser and/or sorption layer by regeneration fluid output from condenser (e.g., 132) with incoming new moisture flux from the ambient environment.

In various embodiments, a system controller can adjust the setpoints or operational states of each mode, for example by adjusting the portion of the regeneration fluid being recycled within the water generation system. The water generation system can compromise one or more active or passive flow directing elements or diverters configured to recycle or recirculate regeneration fluid (e.g., T-valve, door, flap or other flow element operable to selectively or automatically move, swing, or alternate between a plurality of states). Flow diverters can be programmatically, automatically, or selectively controlled (e.g., between an open, partially open and closed positions) by signals sent from controller 170. In some embodiments, one or more flow diverters can be opened by incremental amounts to allow more or less regeneration fluid to return back to condenser and/or sorption layer (e.g., via a return duct). By controlling when and in what amount of regeneration fluid is recycled, the system can control for greater amounts of water condensate from water vapor in the regeneration fluid based on system state and environmental condition to minimize need for additional heating and/or water uptake, without requiring an increase in additional heat or water transfer into regeneration fluid and/or greater operational power requirement.

The operation of recirculating regeneration fluid within the system can increase the total amount of water produced by the system or water production rate instantaneously, periodically and/or over the course of a time period or cycle, for example a day. For example, the system can operate by recirculating all or most of regeneration fluid during an initial or end-portion of a desorption cycle (e.g., early morning or late afternoon) when the absolute humidity of the regeneration fluid flowing in regeneration fluid flow path and/or temperature of the regeneration fluid may be lowest. When the desorption cycle is at peak humidity flux (e.g., late morning or mid-day hours), the system can decrease or end recirculation of regeneration fluid (i.e., operate entirely in an open loop mode). In some implementations, a water generation system can be configured to operate entirely in an open loop mode (i.e., no recirculation of regeneration fluid during desorption cycle), whereas in other implementations a water generation system can be configured to operate in at least a partially closed loop mode or hybrid mode wherein at least a portion of the regeneration fluid is recirculated during some or all of the desorption cycle.

In some embodiments, a system controller (e.g., 170) can determine if, where and/or when at least a portion of regeneration fluid should be recirculated, for example based on a change in humidity or temperature, reaching a threshold humidity or water production, time of day and so on. In one example, a controller (e.g., 170) can determine a recirculation portion of regeneration fluid to direct or divert back to some portions of the regeneration flow path, for example returning regeneration fluid back to the condenser 132 rather than returning the regeneration fluid back to the full regeneration flow path including the upper portions of the system for heat collection, for example by actuate one or more flow diverters positioned along the regeneration flow path. In various implementations, the controller can be configured to determine if, when and to what extent a recirculation portion of regeneration fluid is diverted back to the condenser based on a temperature of the regeneration fluid, a relative humidity of the regeneration fluid, an absolute humidity of the regeneration fluid, a pressure of the regeneration fluid, a solar insolation, a solar irradiance, an ambient temperature, an ambient humidity, a water production rate, an amount of water produced, a time of day, an elapsed time, a predetermined schedule, a system water content, a system power state, or combinations thereof. For example, the controller can estimate or determine an absolute humidity or temperature of the regeneration fluid flowing in the regeneration fluid path is above a predetermined threshold (e.g., via a sensor, via a calculation or estimation based on amount of produced water and/or the like). In response to determining the absolute humidity of the regeneration fluid or temperature is above the predetermined threshold, the controller can actuate a flow diverter in the regeneration flow path to direct at least a portion (e.g., 50%) of the regeneration fluid back to the condenser.

In an embodiment, the heat exchange assembly 130 comprises a refrigeration circuit 131 configured to circulate a refrigerant in a closed refrigerant loop (indicated by thick solid arrows from states 1→4 in FIG. 4A and FIG. 5) including a refrigerant evaporator (e.g., configured as part of or integrated with liquid water condenser 132), a refrigerant compressor (e.g., 134), a refrigerant condenser (e.g. component 136 embedded in sorption layer 118), and a refrigerant expansion device (e.g., expansion valve or capillary 138) via refrigerant piping or tubing.

Figure 5:
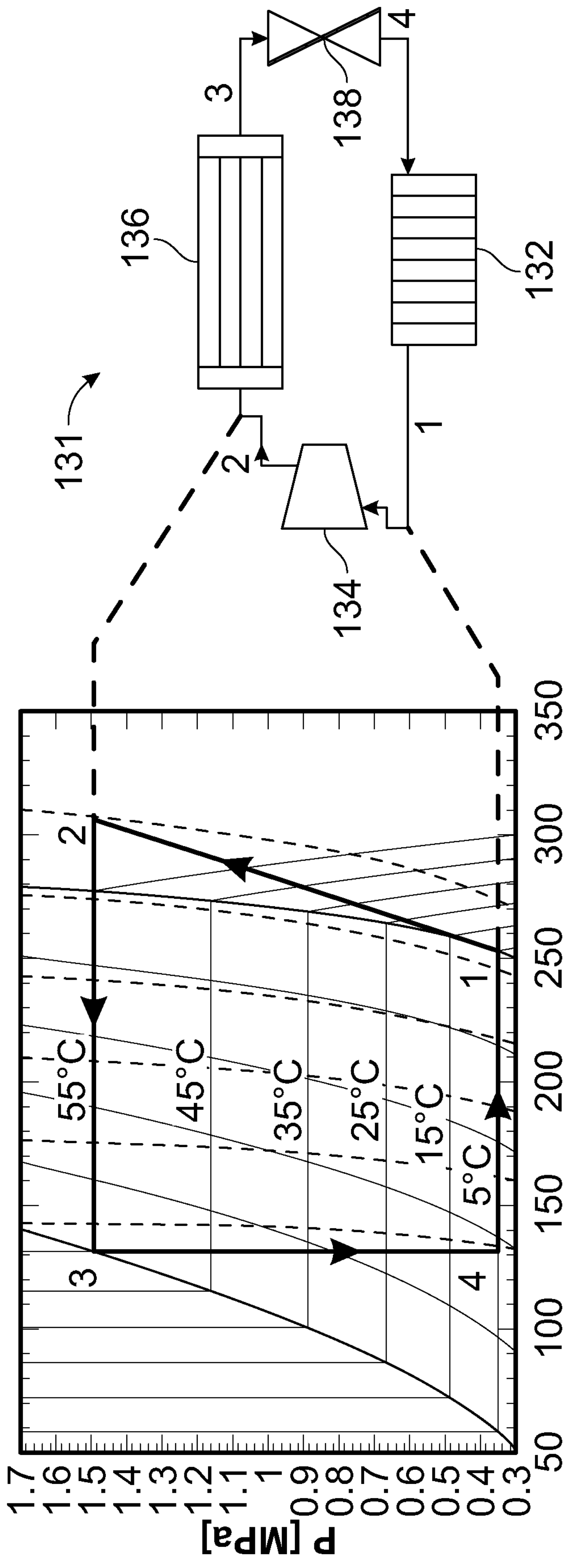
FIG. 5 illustrates operation of a refrigeration circuit of a water generation system, according to an embodiment.

FIG. 5 illustrates operation of refrigeration circuit 131 with a corresponding enthalpy-pressure diagram. The refrigerant circulated in the refrigeration circuit of the water generation system can be selected for high operational coefficient-of-performance (COP) and/or to drive water condensation from the regeneration gas based on the difference between the saturated refrigerant vapor enthalpy (enthalpy H1 at state 1 in FIG. 5) and the enthalpy of the compressed refrigerant gas (enthalpy H2 at state 2 in FIG. 5) provides a temperature lift or difference of 50-80° C. (e.g., at around 55° C. in FIG. 5) as determined from a enthalpy-pressure diagram for a particular refrigerant. In one implementation, the refrigerant condenser temperature can be in the range of 40-80° C. to drive water vapor from sorption layer (e.g., via direct and/or indirect heating of the regeneration gas and/or material of the sorption layer) and/or to facilitate ambient cooling capability downstream of the sorption layer. The corresponding refrigerant evaporator temperature can be in the range of 5-10° C. (e.g., at around 5° C. in FIG. 5), to drive water condensation from regeneration gas. Furthermore, a refrigerant can be selected to not require high operational pressures, for example to maintain a high side pressure under 500 psig. The refrigerant can also be selected to reduce complexity in the vapor-compression cycle in terms of avoiding complexity in superheating or subcooling the refrigerant.

Figure 6:
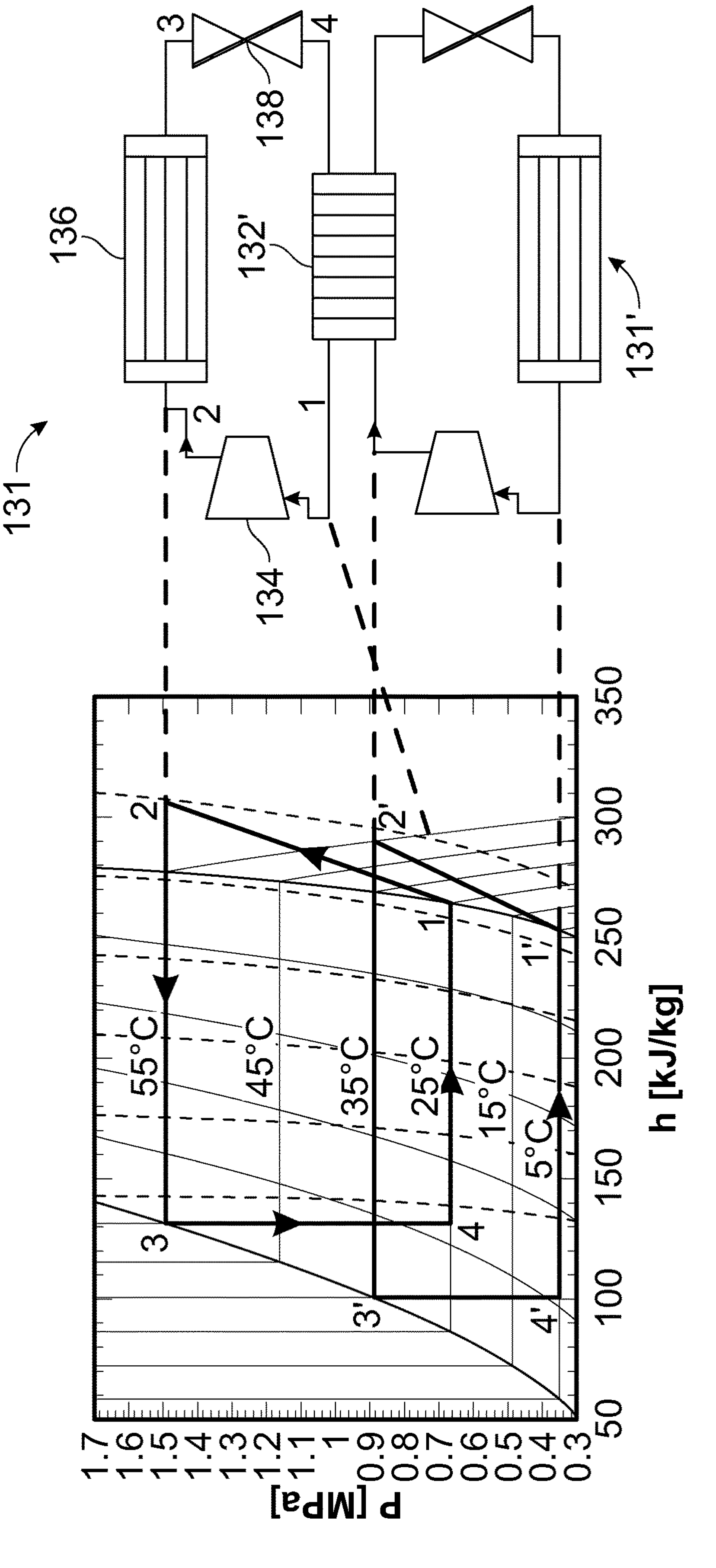
FIG. 6 illustrates operation of multiple refrigeration circuits of a water generation system, according to an embodiment.

In some embodiments, a water generation system can include multiple refrigeration cycles or units. For example, FIG. 6 illustrates operation of multiple refrigeration circuits, i.e., refrigeration circuit 131 and refrigeration circuit 131', with a corresponding enthalpy-pressure diagram. By operating the water generation system with multiple refrigeration cycles, an greater overall temperature lift can be realized than operation with fewer refrigeration cycles (e.g., 50° C. overall temperature rather than 30° C. temperature lift provided individually). In this way, a low evaporator temperature and high refrigerant condenser temperature can be achieved while splitting the work or load into two compressors. In this manner one cycle (e.g., 131) operates hot, and the other cycle (e.g., 131') operates cold with an integrated refrigerant heat exchanger 132' between acting as both condenser (for lower cold cycle 131') and evaporator (for the upper hot cycle 131). In some embodiments, each refrigerant cycle can comprise the same refrigerant, however in other embodiments, different refrigerants can be used. For example, a first refrigerant type can operate in the refrigerant cycle 131 and a second refrigerant type can operate in the refrigerant cycle 131'. The second refrigerant of the "cold" cycle 131' can be a refrigerant that, under reasonable high pressure sides of 1-1.5 MPa has condenser temperatures of 35-45° C. (e.g. R134a, R410a, their derivatives or combinations thereof). The first refrigerant of the "hot" cycle 131 can achieve condenser temperatures in the range of 60-70° C. under reasonable pressure requirements (e.g., R245fa, R365mfc, their derivatives or combinations thereof).

Various refrigerants may be used in the refrigeration circuit(s), including but not limited to chlorofluorocarbon (CFC), hydrochlorfluorocarbon (HCFC), hydrofluorocarbon (HFC), hydrocarbon (HC), ammonia, carbon dioxide, water and their derivatives and combinations thereof. More particular examples of refrigerants, for example high temperature heat pump refrigerants, include but are not limited to: R410A, R407C, R22, R744, R1336mzz(Z), R718, R245fa, R1233zd(E), R1234ze(Z), and R600.

In one exemplary embodiment depicted in FIG. 4A, the heat exchange assembly 130 comprises refrigeration circuit 131 integrated with sorption unit 118 such that the refrigerant condenser 136 transfers heat, i.e., acts as a thermal source, to the sorption layer 118 during the desorption cycle. Furthermore, the refrigerant evaporator of refrigeration circuit 131 can be configured as part of or integrated with liquid water condenser 132, i.e., act as a heat exchanger transferring heat from the regeneration gas (and/or latent heat form condensation of water vapor from regeneration gas) to refrigerant circulating through refrigerant evaporator of refrigeration circuit 131. In the example depicted in FIG. 4A and FIG. 4B, the refrigerant condenser 136 of refrigeration circuit 131 is configured as a thermal source for sorption layer 118 such that heat from condensation of refrigerant vapor is transferred to the sorption layer; and, the refrigerant evaporator is configured as or coupled to liquid water condenser 132 such that heat from condensation of water vapor in the regeneration gas is transferred to the refrigerant. However, in other embodiments, partial components of the refrigeration circuit can be integrated with the components of the water generation system. For example, the refrigerant evaporator of the refrigeration circuit can be integrated with the liquid water condenser, but the refrigerant condenser of refrigeration circuit 131 can be separate from the system.

The refrigerant compressor 134 can be configured to compress low temperature, low pressure refrigerant vapor into a high pressure refrigerant vapor, causing an increase in temperature to a high temperature gas (e.g., from states 1→2 in FIG. 4A and FIG. 5). The refrigerant condenser 136 can be configured to release heat from condensation of high temperature, high pressure refrigerant vapor (e.g., from states 2→3 in FIG. 4A and FIG. 5). The latent heat of refrigerant evaporation is transferred the surroundings (e.g., the regeneration gas flowing across or through the sorption layer 118). The high pressure refrigerant liquid from the refrigerant condenser 136 travels through the expansion device 138, which acts as a pressure differential valve (high pressure one side, low pressure the other), turning it into a low pressure, and hence low temperature liquid near its boiling point (e.g., from states 3→4 in FIG. 4A and FIG. 5). The refrigerant evaporator (e.g., in combination with or part of the liquid water condenser 132) can be configured as a heat exchanger that transfers low temperature heat out of a source (e.g., the regeneration air downstream of the sorption unit 118) to the circulating refrigerant (e.g., from states 4→1 in FIG. 4A and FIG. 5). The refrigerant can be forced by the refrigerant expansion device 138 and a suction effect of the refrigerant compressor 134 to change phase from a liquid to a gas within the refrigerant evaporator. Due to the latent heat requirement, the refrigerant evaporator cools and removes heat from its surroundings (e.g., thereby cooling regeneration air downstream of the sorption layer 118 to drive condensation of water vapor therefrom).

In the example depicted in FIG. 4B, refrigerant evaporator 132 is configured in a generally flat plate such that regeneration gas flows along a top surface of refrigerant evaporator 132 and then along a bottom surface of refrigerant evaporator 132 such that heat from condensation of water vapor in the regeneration gas is transferred to refrigerant in refrigerant evaporator 132. However, other configurations are also possible. For example, the refrigerant evaporator can comprise an array of generally flat rectangular plates, pipes or conduits between which the regeneration gas flows and through which the refrigerant flows. Additionally, the refrigerant evaporator can comprise a plurality of fins or heat dissipating features to improve heat exchange between the refrigerant and the regeneration gas. The path of the regeneration fluid across heat transfer surfaces of the refrigerant evaporator is not especially limited, expect to provide a high surface area to reject heat from regeneration fluid and to condense water vapor therefrom.

Referring again to FIG. 4B, the regeneration flow path (dashed lines) includes an intervening gap or open channel directing regeneration fluid between the refrigerant condenser and the refrigerant evaporator which may be a preferable configuration over other refrigeration circuits having a greater separation between nodes of a vapor-compression or refrigeration cycle.

The efficiency and power usage of water generation systems of the present disclosure can depend on the ambient conditions (solar insolation or irradiance, ambient relative humidity and/or the like), it can be desirable to dynamically operate, via a system controller (e.g., 170), the water generation system and its components dynamically over a sorption or desorption cycle or between each sorption or desorption cycle, so as to improve the water production over the course of the operational lifetime. In various embodiments, process and/or regeneration fluid flow paths and/or flow rates through or across system components may vary based on system operational state(s) (e.g., system power state, system water content, user setpoints, programmatically, water production targets, relative to other water production systems, and/or the like), variations in system operational conditions (e.g., system water content, system power state, system power availability, system heat content, system configuration and/or the like) and/or environmental variations (e.g., season, time of day, weather, solar irradiation and/or the like) to improve water production characteristics, for example to increase a water generation efficiency or production amount, balance or reduce a pressure drop within the system, balance water sorption and desorption operations and so on.

System 100 includes controller 170 configured to maintain a water content in sorption layer 118 (e.g., via water capture from ambient air) and/or a net flux of water vapor from the sorption layer 118 to a condenser (e.g., 132) via the regeneration gas so as to maximize the production of liquid water by system 100. Controller 170 can maximize the production of liquid water by adjusting the flow rate of the process gas in the process fluid flow path (e.g., via fan 104), adjusting the flow rate of the working or regeneration fluid in the regeneration fluid flow path (e.g., via fan 106), adjusting the power (e.g., from PV layer 114, battery 172) to components of heat exchange assembly 130, refrigeration circuit 131 (e.g., compressor 134), or a combination thereof.

The control system can dynamically maximize the production of liquid water over the diurnal cycle based on current or forecast ambient conditions (e.g., solar insolation or solar irradiance, ambient temperature, ambient humidity), current or forecast system properties (e.g., working fluid temperature, working fluid humidity, water content of hygroscopic materials of the system, PV power production, battery electrical charge status). The control system can use a set of sensors including but not limited to temperature sensors, moisture sensors, current sensors, Hall Effect sensors, anemometry and/or manometry, an onboard deterministic and/or machine learning algorithm, information regarding the thermodynamics of water vapor, information regarding the properties of the hygroscopic materials, information regarding the amount of liquid water produced, information regarding the amount of water vapor retained by sorption layer, and/or other factors that can be synthesized in the controller to improve, maximize and/or optimize water production at the condenser.

Various approaches can be employed to control or maximize the production of water by system 100 by driving the water vapor captured by hygroscopic material in the sorption layer 118 during the sorption cycle towards vapor pressure saturation in the regeneration gas during the regeneration or release cycle. For example, the power to the refrigeration cycle (e.g., compressor 134) can be varied based on an ambient solar flux or irradiance, an ambient temperature, an ambient relative humidity, a temperature and/or relative humidity of the working fluid (at any respective node in the system), an amount of water present in hygroscopic material in the sorption layer 118, an elapsed time, an electrical charge accumulated in the battery (e.g., battery 172), a user input and so on.

Controller 170 can operate the system 100 based on: a user selection, data received from one or more sensors, forecast conditions, programmatic control, and/or by any other desirable bases. Controller 170 can be associated with peripheral devices (including sensors) for sensing data information, data collection components for storing data information, communication components for communicating data information relating to the operation of the system, or combinations thereof. Inputs to controller 170 may be measured in that they are indicated in data captured by one or more sensors. In one example, the controller 170 can set process gas flow rates, regeneration gas flow rates, regeneration gas recycling portions or rates, transitions between sorption and desorption times based on a look up table of parameters stored onboard the controller 170. In yet another example, the controller can self-adjust system operational setpoints and monitor operational states (e.g., water production) in an effort to self-teach or learn optimum setpoints.

Controller 170 can be programmed or configured to improve, maximize or optimize liquid water production based on measurements of one or more inputs (e.g., such that controller 170 may improve liquid water production based on current or expected environmental and system conditions) including but not limited to external conditions like ambient air temperature, ambient pressure, ambient air relative humidity, solar insolation, solar irradiance, solar flux, weather forecast, time of day, and so on. Furthermore, controller 170 can be programmed or configured to improve liquid water production based on inputs relating to system operational parameters like regeneration fluid temperature, regeneration fluid pressure, regeneration fluid relative humidity, regeneration fluid water vapor partial pressure, liquid water production rate, liquid water production volume, liquid water usage rate, liquid water quality, and so on.

During a loading or sorption cycle, the flow rate of the process gas (e.g., ambient air) through sorption layer 118 can be varied by controller 170 in wired or wireless communication with fan 104 to adjust the flow rate of the process gas during the sorption mode or cycle. During a release or desorption cycle, the flow rate of the regeneration fluid can be varied by controller 170 in wired or wireless communication with fan 106 based on ambient solar irradiance, ambient temperature, ambient relative humidity, temperature of the regeneration fluid, relative humidity of the regeneration fluid, amount of water present in the hygroscopic material of the sorption layer 118, an elapsed time, a system power availability, or a combination thereof. For example, the controller can activate some or all system fans depending on the system state including flowing ambient air through sorption layer 118 during the sorption operational mode and flowing ambient air across a heat dissipating portion of the heat exchange assembly 130 during the desorption operational mode.

During a release mode, the heat load of the refrigeration circuit 131 can be varied by controller 170 in wired or wireless communication with refrigeration circuit 131 based on input variables including but not limited to: ambient solar irradiance, ambient temperature, ambient relative humidity, temperature of the regeneration fluid, relative humidity of the regeneration fluid, amount of water present in the hygroscopic material of the sorption layer 118, an amount of water produced, an elapsed time, a system power availability, or a combination thereof. In one particular implementation, the power input or work to the refrigerant compressor 134 can be varied based on the amount of power produced by the PV panel 114, the state-of-charge (SOC) of onboard battery 172, or a combination thereof. In one example, controller 170 can adjust the refrigerant evaporator temperature and/or the refrigerant condenser temperature based on one or more input variables.

System 100 can comprise a telematics unit (e.g., a transmitter, receiver, transponder, transverter, repeater, transceiver, and/or the like) to communicate operational parameters and/or data to and/or from system 100 (e.g., via controller 170) through a wired and/or wireless interface. In one example, wireless communications can conform to standardized communications protocols, such as, for example, GSM, SMS components operating at relatively low rates (e.g., operating every few minutes), protocols that may be geographically specified, and/or the like).

System 100 can comprise indicators (e.g., lights, such as, for example, LEDs), which may be configured to provide information regarding system operation. For example, in some embodiments, indicator lights may be configured to provide information (e.g., visually, for example, to a user) that the system is running, that solar power or energy is available, that maintenance is recommended, or a component has failed and/or is failing, and/or the like. Any desirable information (including the information described above with reference to indicators) may be transmitted over a communications network (e.g., alone and/or in addition to operation of any indicators).

In various implementations, system 100 can include or be associated with one or more energy generation or energy storage systems (e.g. solar power unit or photovoltaic panel, energy storage unit or battery and so on). For example, system 100 can include a battery system (e.g., 172) for energy storage during daylight hours (e.g., generated via PV panel 114) and utilization during off solar hours. Any desirable energy source for auxiliary components or otherwise can be employed including but not limited to solar, auxiliary AC/DC, etc. Furthermore, controller 170 can balance or adjust the amount of power input to system fans, pumps, heat exchangers, condensers, compressors, valves and so on, for example based on present or forecast system power availability from solar power unit or PV panel 114, battery 172, or a combination thereof.

In one example, the electrical energy generated by the photovoltaic layer (e.g., 114) and/or energy stored by the onboard battery (e.g., 172) entirely powers the water generation system and its components (e.g., fan(s), refrigeration circuit, refrigerant compressor, and so on). Furthermore, the controller (e.g., 170) can determine a current or forecast system power availability and/or if a system power state is above a predetermined threshold. For example, if a system battery state-of-charge (SOC) is above a predetermined threshold, if PV power generation is above a predetermined threshold, if a forecast solar insolation or irradiance is above a predetermined threshold and/or the like, the controller (e.g., 170) can adjust an operational setpoint of the system (e.g., fan power, compressor power). In on one example, in response to determining the system power state is above the predetermined threshold, the controller can adjust (e.g., increase) power to fan(s) 106 and/or compressor 134 to increase the amount of water vapor condensed from the regeneration gas. In another example, in response to determining the system power state is above the predetermined threshold, the controller can adjust (e.g., increase) power to fan 104 to increase water uptake by the hygroscopic material of the sorption layer 118.

Water generation systems of the present disclosure can be implemented in a variety of form factors, and it can be preferable to configure to water generation system in portable, compact and/or low-profile arrangements that can be easily oriented and installed on a surface to receive incoming solar radiation. System 100 can be installed or mounted above a ground surface or rooftop via a mounting assembly. In some embodiments, water generation system 100 can be mounted on a tracking assembly (e.g., single axis solar tracker, multi axis solar tracker and the like) configured to track movement of the sun to improve solar radiation capture. In other embodiments, system 100 can be installed in a fixed tilt configuration i.e., at a slight angle relative to the ground surface or rooftop, for example toward the southern sky for an installation in the Northern Hemisphere, or toward the northern sky for an installation in the Southern Hemisphere. The descriptive terms used herein such as front, rear, above, below, top, bottom, over, under, etc. are used to aid understanding of the invention are not used in a limiting sense. Furthermore, the directions north, south, east and west may be used herein assuming the installation site is in the Northern Hemisphere, however opposite directions can be used for installations in the Southern Hemisphere without departing from the spirit and scope of the present disclosure.

FIG. 4A and FIG. 4B depict water generation system 100 configured to direct process gas in a direction (e.g., generally east-west (E-W) direction) that is substantially orthogonal to the direction of regeneration gas flow (e.g., in a generally north-south (N-S) direction). One or more separators or flow-directing elements (indicated at 117 for clarity) can define process and regeneration flow paths and can also provide structure or space for integration of other system components (e.g., compressor 134, expansion device 138) to facilitate a compact, low-profile configuration. System 100 can be installed in a fixed tilt configuration such that system 100 is inclined along an east-west (E-W) longitudinal axis, and the regeneration flow path directs the regeneration gas through the system in a generally north-south (N-S) direction that is generally perpendicular to the east-west (E-W) longitudinal axis. Furthermore, liquid water condensed from regeneration gas (e.g., via condenser 132) can collect in a reservoir 180 at bottom of system 100 via gravity. However, other system configurations and arrangements are also possible to enable portable, compact and/or low-profile water generation systems operating with high efficiency.

Water generation systems of the present disclosure can include any desirable or suitable number of baffles, flow diverters or flow-directing elements to define the process and regeneration fluid flow paths in the system for both sorption/loading and desorption/release operations. Various flow approaches for improving fluid interaction with the system layers and components can be employed including flow-through implementations, flow-over or flat plate implementations, as well as their combinations or derivatives. In addition, the system layers and components can be configured in various ways relative to the flow directing means, structures or distributors, for example but not limited to hierarchically structured pore matrices, lattice structures, porous plates, porous bodies, porous membranes or films, closed-cell foams, open cell foams, inter-corrugated fluidic channels, woven meshes, and/or fiber meshes to sustain back pressure and distribute the flow.

In some embodiments, system 100 is coupled to (e.g., via tubing or plumbing) a water tank or storage reservoir for receiving produced liquid water from system 100, for example via liquid water dispensing outlet 182. Water output from system 100 can be pure and lack minerals, similar to “distilled” water or can be similar to “mineral water” i.e., purified water with additive minerals, for example added to the water after condensation. In various embodiments, system 100 comprises additional peripheral components to facilitate self-sufficient, compact and/or self-contained deployment including but not limited to components for onboard water treatment, water mineralization, water sanitation and/or the like.

Figure 8:
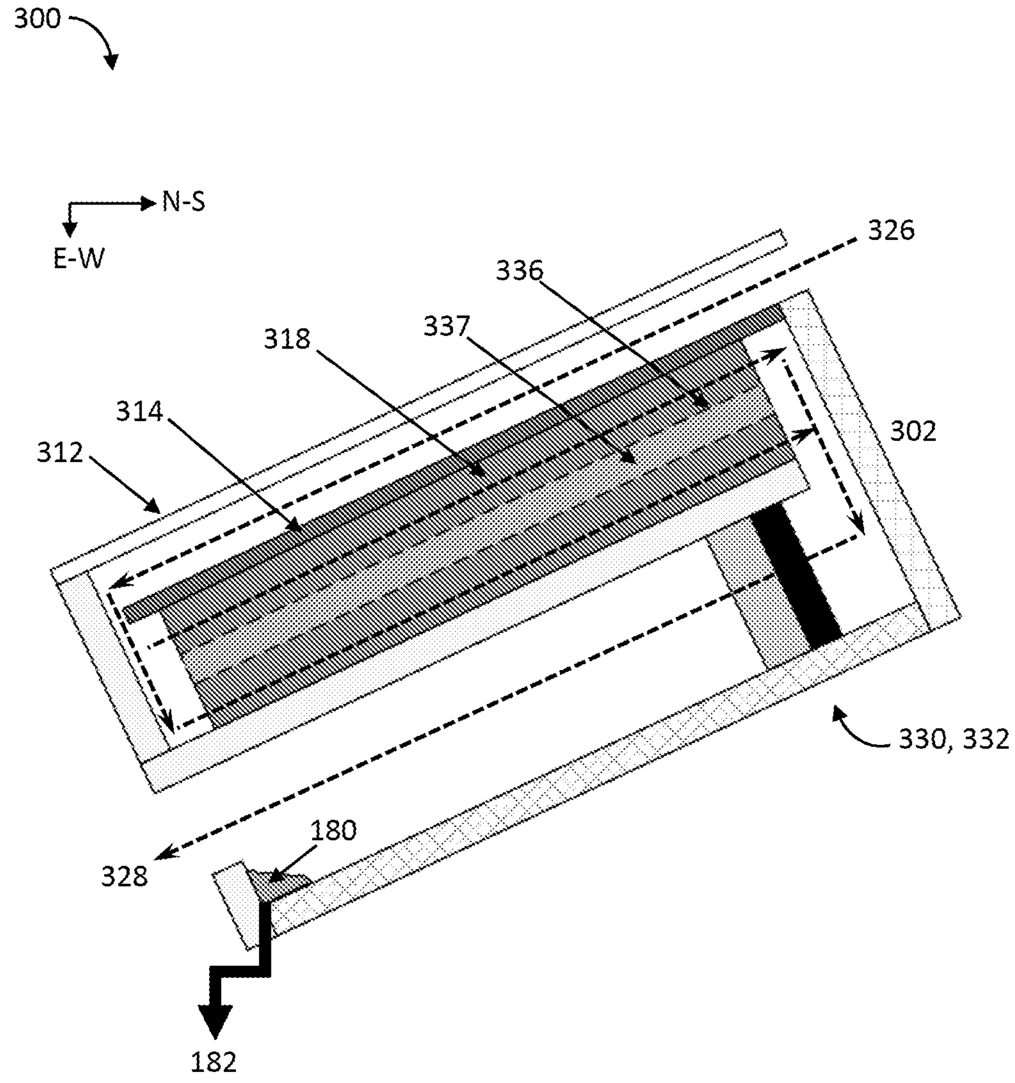
FIG. 8 illustrates a side cross-sectional view of a water generation system, according to an embodiment.
Figure 9:
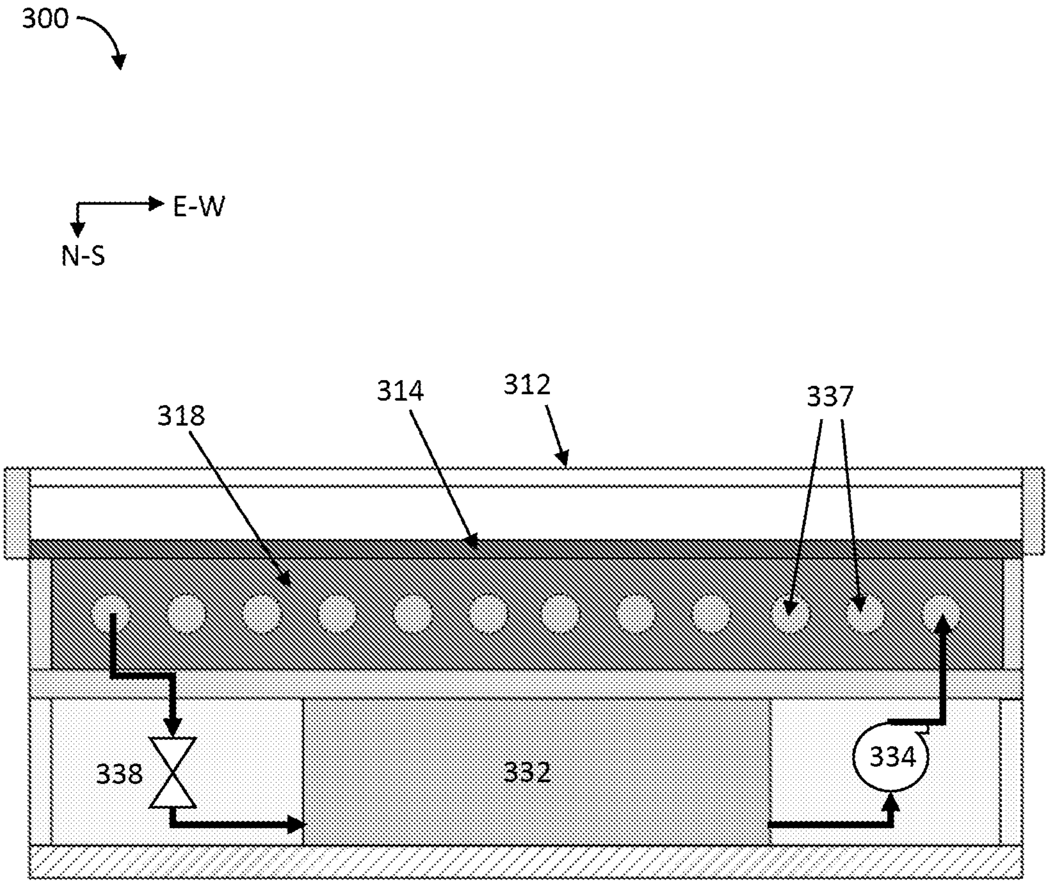
FIG. 9 illustrates a side cross-sectional view of a water generation system, according to an embodiment.

Systems depicted in FIGS. 1-4 and FIG. 7 depict sorption layer 118, 218 positioned below and spaced apart from photovoltaic layer 114, 214 (and interstitial layer 116 when present) such that the regeneration gas flows along the top surface of the photovoltaic layer and along the bottom surface of the photovoltaic layer in advance of flowing through the sorption layer. However other configurations to improve system efficiency and/or form factor are also possible. For example, FIG. 8 and FIG. 9 depict cross-sectional views of water generation system 300 comprising sorption layer 314 integrated with or coupled to a rear surface of photovoltaic layer 314 (and/or an interstitial glass layer, if present) such that the regeneration gas flows in regeneration flow path (indicated by dashed arrows) along the top surface of photovoltaic layer 314, and through sorption layer 318 at rear surface of photovoltaic layer 314. In some implementations, photovoltaic layer 314 and sorption layer 318 can be thermally bonded or coupled (e.g., via casting, polymerizing or foaming material of sorption layer directly onto rear surface of photovoltaic cell(s)) such that as flow through sorption layer 318 proceeds (possibly at a higher back pressure than in the configurations of FIG. 1-4), heat is transferred from photovoltaic layer 314 to sorption layer 318 via both conduction and convection. Furthermore, the regeneration gas can be exchange heat with the ambient environment (e.g., via housing sidewall 302) before flowing through heat exchange assembly 330 and/or liquid water condenser 332.

Compact or modular water generation system 300 includes sorption layer 318, for example provided as a hygroscopic material, hygroscopic composite or hygroscopic composite assembly, adjacent to rear surface of photovoltaic (PV) layer or panel 314 and/or an interstitial layer (e.g., transparent glass panel), if present. In some embodiments, the PV panel 314 can span the entirety of the top portion of the hygroscopic sorption layer 318. In an embodiment, the sorption layer or assembly 318 can be configured to be fully or at least partially in physical contact with a rear surface of PV panel 314. In an embodiment, the sorption layer 318 can comprise a hygroscopic material, composite or composite assembly on or at the rear surface of a PV panel and/or interstitial glazing layer resulting in a heat transfer network wherein solar irradiation on the PV panel(s) and/or interstitial layer(s) is conducted as heat into a hygroscopic absorber matrix of the sorption layer 318 to efficiently evaporate water vapor to the regeneration gas flowing in the regeneration flow path. In this approach, the PV panel and/or interstitial glass surfaces can be evaporatively cooled during the desorption or unloading operation. In various embodiments, the properties of the hygroscopic material, composite or assembly (e.g., hygroscopic salt content, porosity and the like) of the sorption layer 318 and/or the operational set-points (e.g., rate of regeneration gas flow, power to fan, power to compressor and/or the like) can be controlled to improve the efficiency of the water generation system for water production.

In some embodiments, the sorption layer can be integrated with or integrally formed with a component of a refrigeration circuit. For example, the refrigerant condenser (e.g., 336) of the refrigeration circuit can be integrated or embedded in the sorption layer (e.g., 318) such that heat from condensation of refrigerant vapor is transferred to the sorption layer 318 during a desorption cycle. As such, the refrigerant condenser 336 can act as a thermal source to heat hygroscopic material of sorption layer 318, thereby releasing water vapor to the regeneration gas. FIG. 8 and FIG. 9 depict an example of sorption layer 318 integrated with refrigerant condenser 336 that comprises a set of generally parallel pipes or conduits 350 through which refrigerant circulates. Each conduit directs refrigerant through conduit (s) 350 extending through sorption layer 318 such that heat is transferred, via heat transfer surfaces 352, efficiently to throughout sorption layer 318.

The particular configuration and number of refrigerant pipes or conduits shown in FIG. 8 and FIG. 9 are purely illustrative. Generally, the configuration, number, dimensions of channels and pores through the sorption layer can be selected according to various factors including but not limited to type or chemistry of hygroscopic material (e.g., deliquescent salt, porous solid, molecular sieve, and so on), morphology of hygroscopic material (pore size, tortuosity of the pores, support structure, and so on), water uptake kinetics of hygroscopic material, water uptake capacity of hygroscopic material, range in flow rates of process gas through sorption layer, range in flow rates of regeneration gas through sorption layer, porosity of sorption layer, pressure drop through sorption layer, thermal conductivity of sorption layer and/or the like.

The sorption layer may withstand high temperature (e.g., 120-150° C.) cycling between sorption/loading and desorption/unloading cycles of the water generation system. Durable water generation systems of the present disclosure can provide continuous water sorption/desorption cycling over thousands of cycles, e.g., continuous diurnal cycling over a 20-year lifetime can represent over 7,000 cycles of diurnal loading at nighttime hours and water release during daytime hours. As such, the sorption layer and its hygroscopic material, hygroscopic composite and/or hygroscopic composite assembly may be configured for long-term cycling stability without loss of mechanical stability or sorption capacity. Furthermore, the hygroscopic materials or components may remain in solid phase and/or maintain full retention of liquid phase within the sorption layer throughout continuous sorption/desorption cycling. In addition, constituents or components of the sorption layer may be selected for and configured to be chemically stable with other system components or to constituents of the process or regeneration gas (e.g., oxygen from air).

The sorption layer can also be configured to have a low density, high water sorption capacity and an open pore structure with pore sizes on the order of microns to millimeters for facile sorption and/or without closed throats or pores. The sorption kinetics of the hygroscopic sorption layer may leverage a diurnal water vapor loading cycle without compromising total water storage capacity. The sorption capacities of the hygroscopic sorption layer may be configured to maintain a high water storage capacity across global average nighttime atmospheric air conditions. Furthermore, the desorption kinetics of the hygroscopic sorption layer may be selected for the global average of solar insolation or irradiance magnitude and exposure time (e.g. 6 $kWh/m^2$, 1 $kW/m^2$ peak solar radiation for 8 sun hours). In one example, a hygroscopic material, composite or assembly of the sorption layer is selected to uptake 30-300% of its own mass as water vapor.

Various flow approaches for improving fluid interaction with the hygroscopic material in the sorption layer can be employed including flow-through implementations, flow-over or flat plate implementations, as well as their combinations or derivatives. In addition, the sorption layer, the hygroscopic material(s), hygroscopic composite(s) and/or hygroscopic composite assembly(s) can be configured in various ways relative to flow directing means, structures or distributors of the system, for example but not limited to hierarchically structured pore matrices, lattice structures, porous plates, porous bodies, porous layers, porous membranes or films, closed-cell foams, open cell foams, inter-corrugated fluidic channels, woven meshes, and/or fiber meshes to sustain back pressure and distribute the flow. The sorption layer can include or be integrated with any desirable or suitable number of baffles, flow diverters or flow-directing elements to define the process and regeneration fluid flow paths through the sorption layer for both sorption/loading and desorption/unloading operations.

In various embodiments, a split-flow or segmented architecture including multiple distinct sorption layers, bodies or layers can improve interaction or water transfer between the regeneration fluid and the hygroscopic material while also allowing for flow through other layers (e.g., planar glazing layers) for heat scavenging. Furthermore, the flow architecture of the water generation system can be configured to improve interaction of the process or regeneration fluid with the hygroscopic material via serial exposure of the subdivided areas. Any desirable or suitable number and configuration of separators or other flow directing structures or devices can be employed to improve interaction of the process or regeneration gas with the hygroscopic material at a high process or regeneration gas flux. For example, various configurations of the water generation system can be provided to maintain a process gas flux through the sorption layer or body preferably greater than 50 cubic feet per minute (CFM)/$m^2$, greater than 100 CFM/$m^2$, greater than 200 CFM/$m^2$, greater than 300 CFM/$m^2$ or greater than 400 CFM/$m^2$. Furthermore, hygroscopic materials, composites, or composite assemblies in the water generation system can be configured around and/or within flow separators, distributors, sectioned layers or segments according to favored flow paths for both loading (i.e., water uptake) and regeneration (i.e., water release) operations, thereby maximizing water generation or production.

In some embodiments, the sorption layer can comprise a porous matrix including dispersed hygroscopic material and one or more flow channels to distribute the process and/or regeneration gas through the sorption layer. Furthermore, some implementations of the sorption layer, for example depicted in FIG. 10, can include one or more embedded refrigerant conduits to distribute refrigerant through the sorption layer such that heat from condensation of refrigerant vapor is transferred to the sorption layer, or more particularly to the hygroscopic material of the sorption layer.

Figure 10:
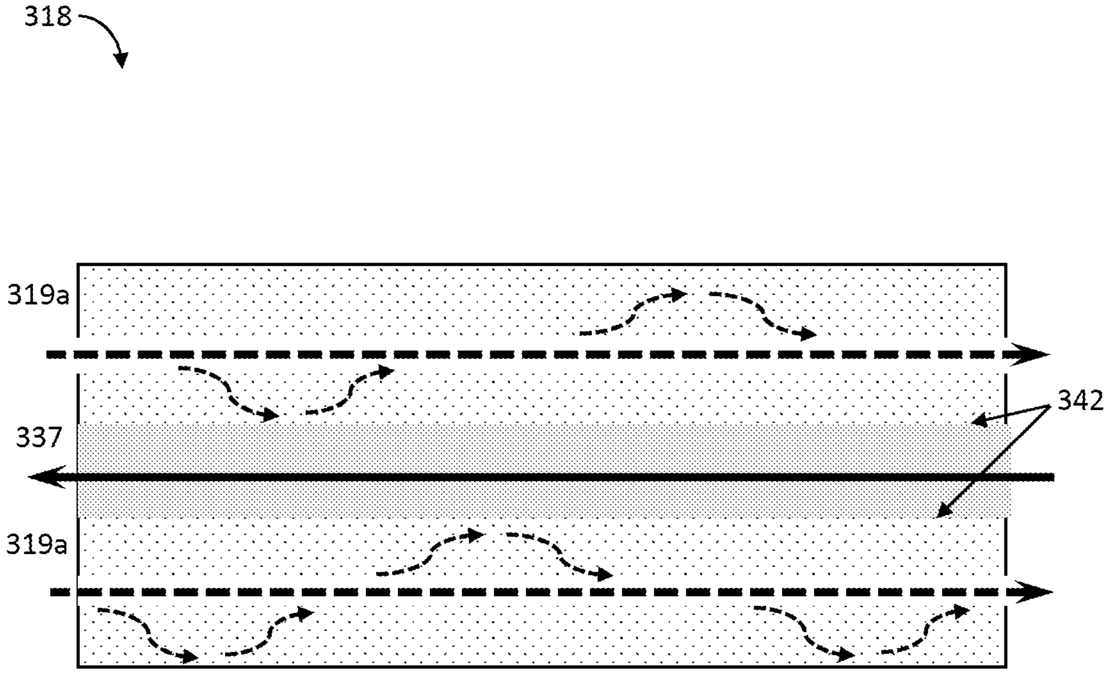
FIG. 10 illustrates a side cross-sectional view of a portion of a sorption layer, according to an embodiment.

FIG. 10 depicts an enlarged portion of sorption layer 318 comprising integrated refrigerant piping, depicted as refrigerant conduit 350, in addition to flow channels 340*a-b* through which process or regeneration gas (indicated by dashed lines in FIG. 8) can be distributed throughout porous sorption layer 318 comprising hygroscopic material(s) or hygroscopic composite(s). Each channel 340*a-b* directs process or regeneration fluid generally in a first direction through sorption layer 318 such that process or regeneration gas is distributed efficiently through full sorption layer 318. During the desorption/unloading process, refrigerant flows through conduit(s) 350 of refrigerant condenser 336 distributed through sorption layer 318 such that the refrigerant condenser 336 transfers heat via conduit(s) 350 extending through sorption layer 318.

The particular configuration and number of channels shown in FIG. 10 is purely illustrative for ease of description. Generally, the configuration, number, dimensions and branching structure of channels and pores through the sorption layer can be selected according to various factors including but not limited to the chemistry of hygroscopic material (e.g., deliquescent salt, porous solid, molecular sieve, and so on), morphology of hygroscopic material (pore size, support structure, and so on), water uptake kinetics of hygroscopic material, water uptake capacity of hygroscopic material, range in flow rates of process gas through sorption layer, range in flow rates of regeneration gas through sorption layer, porosity of sorption layer, pressure drop through sorption layer, thermal conductivity of sorption layer and/or the like.

In some embodiments, at least a portion of a refrigerant condenser (e.g., 336) is integrated with or embedded in sorption layer or body (e.g., 318) via one or more conduits for circulating refrigerant. Generally, it is preferred for refrigerant conduits to have a large relative surface area for thermal transfer throughout the sorption layer or body. Referring to FIG. 10, a cross-sectional view of sorption layer 318 shows includes a refrigerant conduit 350 for refrigerant flow in a direction opposite from process or reaeration gas flow (depicted in dashed lines) through sorption sections 340*a-b*. For ease of description, FIG. 10 depicts the sorption channels 340*a-b* and refrigerant conduit 350 are stacked in two dimensions, however sorption layer(s) can include channels and/or conduits arrayed in three dimensions. Furthermore, while FIG. 10 depicts refrigerant flow and process or regeneration flow generally in opposite directions, which may be preferable for heat transfer efficiency, refrigerant flow path(s) and process or regeneration flow path(s) can be configured for flow, at least partially, in the same and/or orthogonal directions. In some embodiments, the regeneration flow path can be configured for flow in an orthogonal direction relative to the refrigerant conduit(s).

Figure 11A:
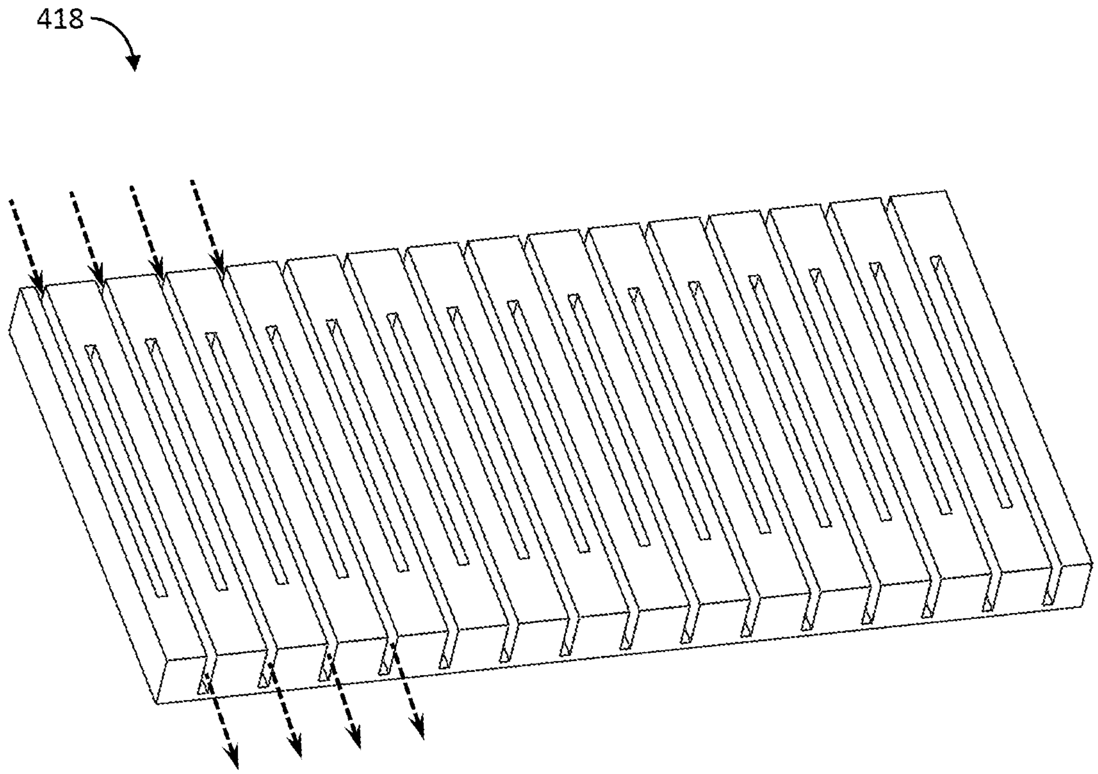
FIG. 11A illustrates a top-down perspective view of a sorption layer with an interdigitated flow configuration, according to an embodiment.
Figure 11B:
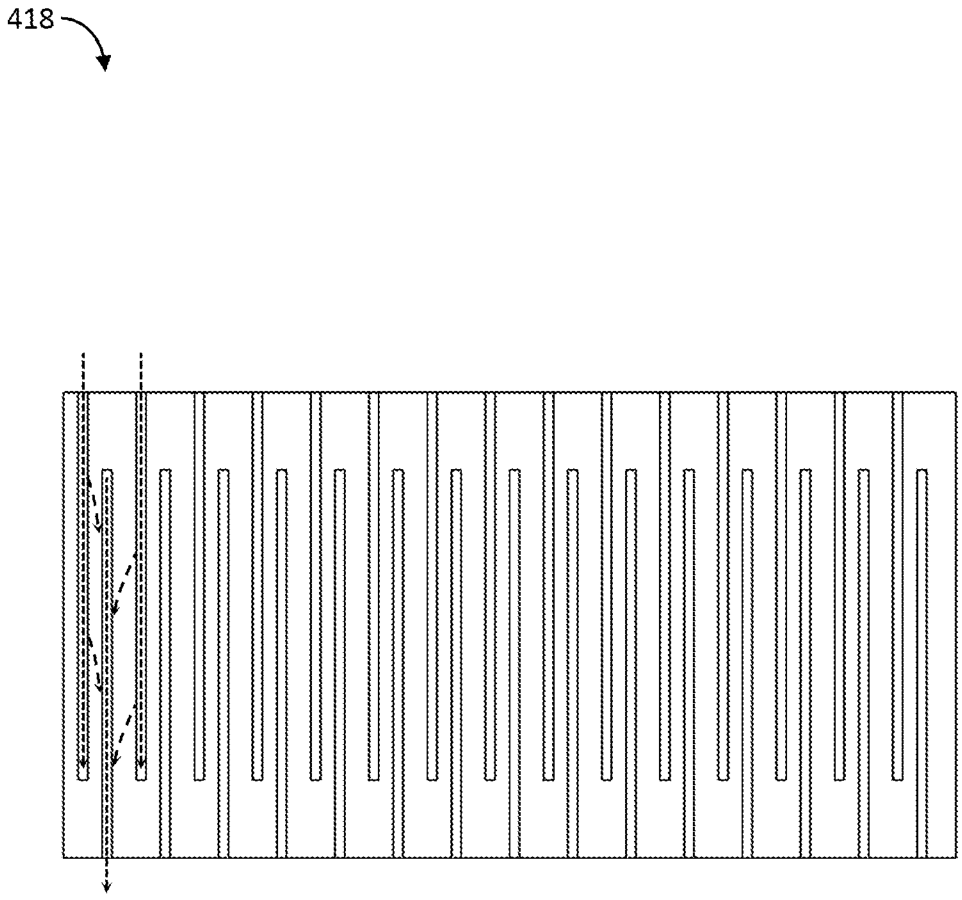
FIG. 11B illustrates a top-down view of a sorption layer with an interdigitated flow configuration, according to an embodiment.
Figure 11C:
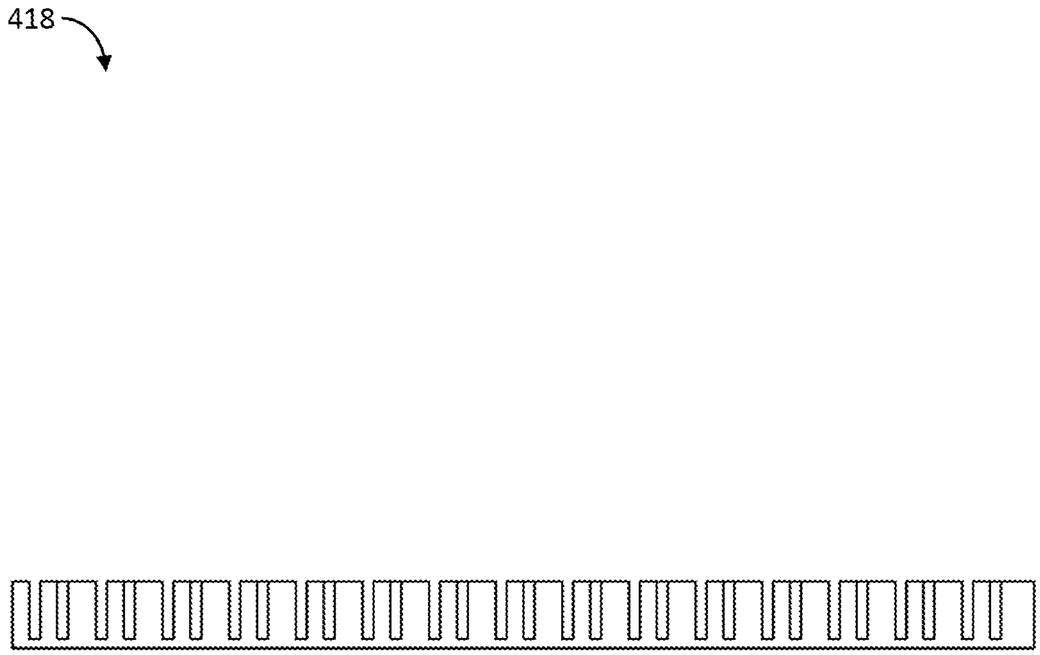
FIG. 11C illustrates a side view of a sorption layer with an interdigitated flow configuration, according to an embodiment.

FIG. 11A-C illustrate a water generation system 400 including a sorption layer 418 with an interdigitated flow configuration from a top-down side perspective view (FIG. 11A), a direct top-down view (FIG. 11B) and a direct side view (FIG. 11C). The sorption layer 418 comprises interdigitated flow channels through which process or regeneration gas (indicated by dashed lines) flows into absorber first through inlet channels 440*a-n*, through portions of porous sorption layer between channels (e.g., in a direction at least partially orthogonal to flow channels), and then through outlet flow channels 442*a-n*. Each channel 440*a-n* and 442*a-n* directs process or regeneration fluid generally in a first direction through sorption layer 418 such that process or regeneration gas is distributed efficiently through full sorption layer 418.

In some implementations, integrated refrigerant piping or conduits (not shown for ease of description) can be distributed across or throughout porous sorption layer 418 within flow channels and/or embedded into porous material of sorption layer. During a desorption/unloading process, refrigerant can flow through conduit(s) of a refrigerant condenser distributed through sorption layer 418 such that a refrigerant condenser transfers heat to the regeneration gas and/or porous sorption material via conduit(s) extending therethrough. Upon exiting sorption layer 418 via channels 442*a-n*, water vapor in regeneration fluid can be condensed via liquid water condenser 432 (which is some embodiments is integrated with a refrigerant evaporator).

FIG. 11A-C illustrate a water generation system including a sorption layer 618 with vertically-offset interdigitated flow configuration, from a top-down perspective view (FIG. 11A), a bottom-up perspective view (FIG. 11B) and a side view (FIG. 11C). In this example, sorption layer 618 comprises interdigitated flow channels that are vertically offset such that process or regeneration gas (indicated by dashed lines) flows into absorber first through upper channels 540*a-n*, through portions of porous sorption layer between channels (e.g., in a generally downward direction at least partially orthogonal to flow channels), and then through lower flow channels 542*a-n*. In some implementations, integrated refrigerant piping or conduits (not shown for ease of description) can be distributed through porous sorption layer 618, for example, within upper flow channels such that the refrigerant condenser transfers heat to the regeneration gas and/or porous sorption material flowing in the upper portion of the sorption layer via conduit(s) extending therethrough.

The sorption layer or body shown in the examples of FIG. 11A-C, FIG. 12 and FIG. 13A-C include embedded flow channels in generally rectangular shapes, however other shapes are also possible to maximize interaction with hygroscopic media of the sorption layer or body with minimal pressure drop. For example, flow channels can taper along interior walls to define a minimum wall thickness portion at the outlet side and a maximum wall thickness portion at the opposite inlet side, wherein the thinner wall thickness portion providing less resistance to flow than the opposite thicker portion. Tapering of flow-through portions of the sorption layer and/or internal flow channels can maintain a consistent pressure drop (e.g., a consistent dP/L ratio wherein dP is the pressure drop and L is in the direction of the taper) through the flow channel. A consistent pressure drops serves to maintain a consistent fluid velocity and distribution from the tapered channel to the porous sorption media. In this way, the reduced pressure drop through the system can improve interaction of the gas with the full sorption layer and/or reduce the amount of power required to pump the regeneration fluid through the system at a desired flow rate.

The efficiency and power usage of water generation systems of the present technology can be affected by the flow of the regeneration fluid through the regeneration fluid path and the associated pressure drop Furthermore, uniformity of the air flow may be controlled by careful tolerance of the thickness of components (e.g., flow-through portions of the sorption layer) and the space (e.g., flow channel dimensions) between the components to control the pressure drop. In one example, the volume of the fluid delivery or inlet manifold(s) into the sorption layer can be configured to be 2-3× greater than the volume of the fluid distribution channels in the sorption layer to sustain or maintain the flow pressure therethrough. In another example, an aspect ratio of the flow channel geometry can be less than a value of two to minimize or avoid fluid velocity and/or thermal gradients.

In some embodiments, a sorption layer can be provided as one or more layered structures, a packed bed including hygroscopic components, particles or beads, or a substantially continuous or monolithic porous composite structure. Additionally, the sorption layer doesn't necessarily itself need to be a composite in the traditional sense, rather it can be provided as a loose pack or packed bed assembly with a supporting frame. Furthermore, sorption layer(s) can comprise a porous hygroscopic body or layer having one or more light absorbing or light activated materials. In one example, a sorption layer can include hygroscopic particles agglomerated via a binder and/or dispersed in a high surface area matrix, support medium or substrate. The hygroscopic material, support substrate, composite and/or assembly can be selected to minimize reflection of solar radiation and improve absorption and conduction of thermal energy. For example, the hygroscopic material, support substrate, composite and/or assembly of the sorption layer can be dark or black in color. In some embodiments, the hygroscopic material, support substrate, composite and/or assembly can be mixed, combined and/or embedded with materials or structures to efficiently absorb and/or transfer heat. For example, the sorption layer can comprise hygroscopic material(s) and/or composite(s) dispersed around a metallic structure with a thermal conductivity greater than 50 W/mK. In other embodiments, the sorption layer is a self-supporting structure housed within the water generation system.

Figure 12:
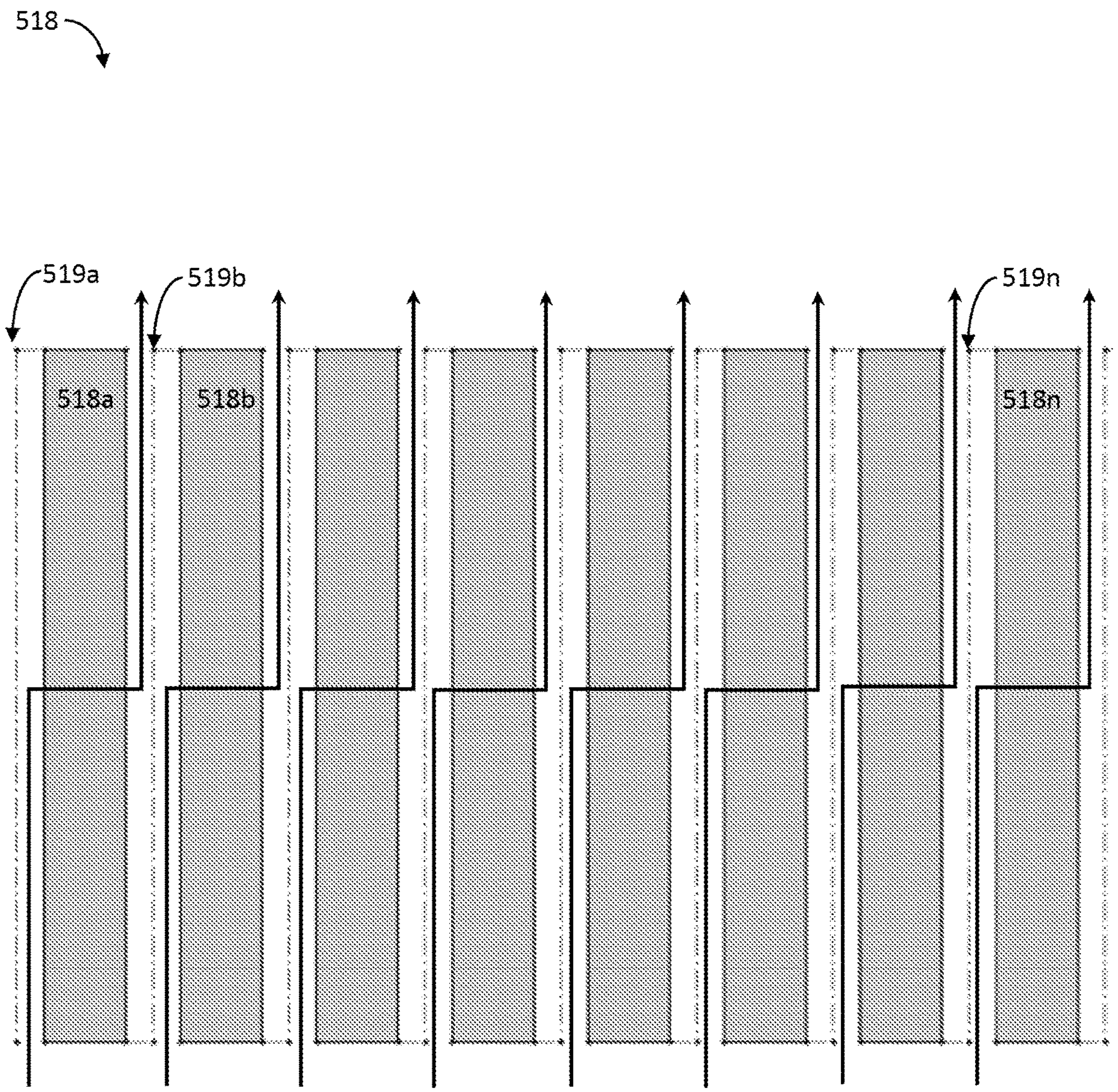
FIG. 12 illustrates a top-down view of a sorption layer with an interdigitated heat exchange flow configuration, according to an embodiment.
Figure 13A:
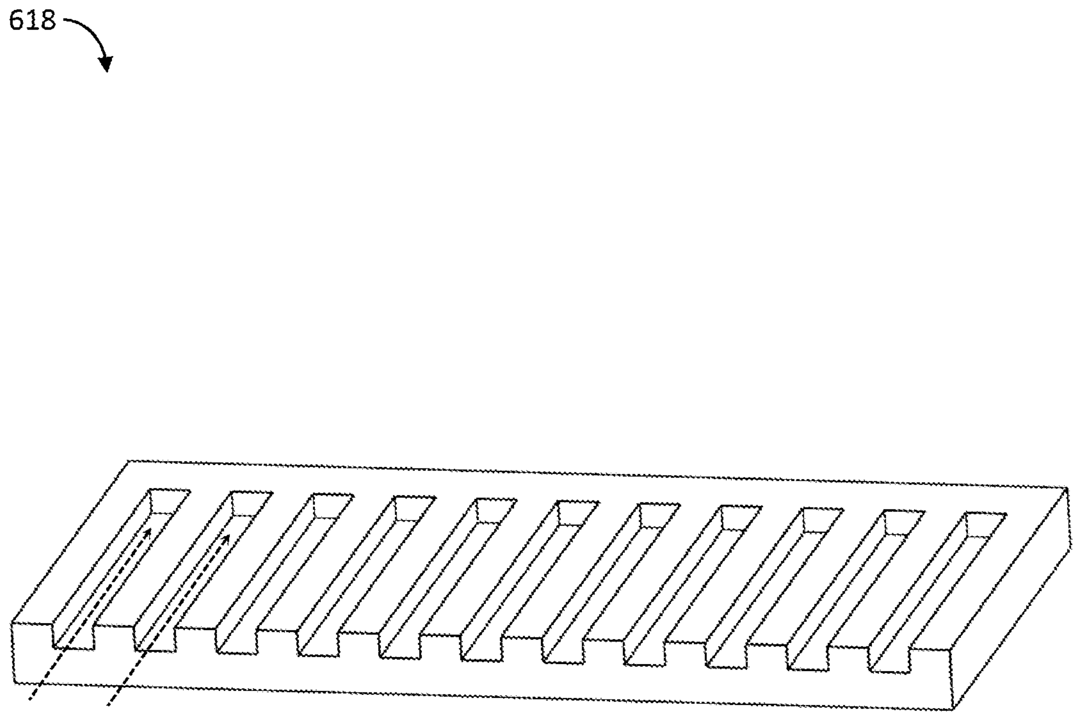
FIG. 13A illustrates a top-down perspective view of a water generation system including a sorption layer with a vertically offset interdigitated flow configuration, according to an embodiment.
Figure 13B:
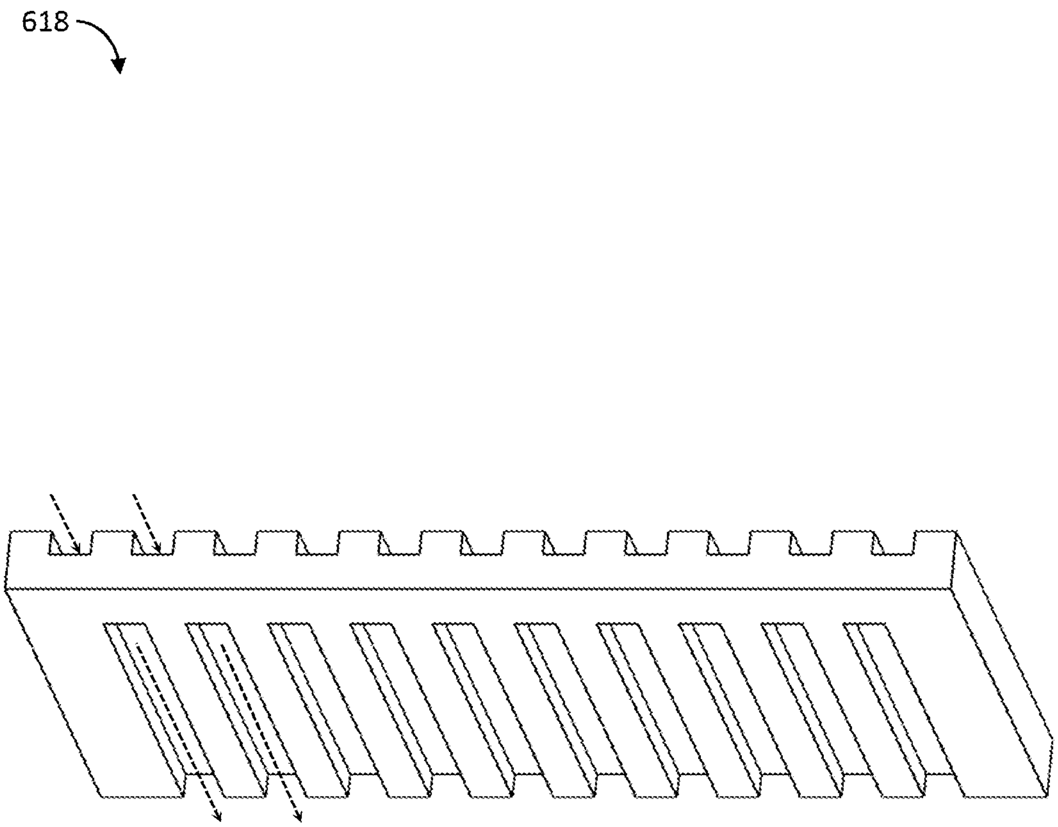
FIG. 13B illustrates a bottom-up perspective view of a water generation system including a sorption layer with a vertically-offset interdigitated flow configuration, according to an embodiment.
Figure 13C:
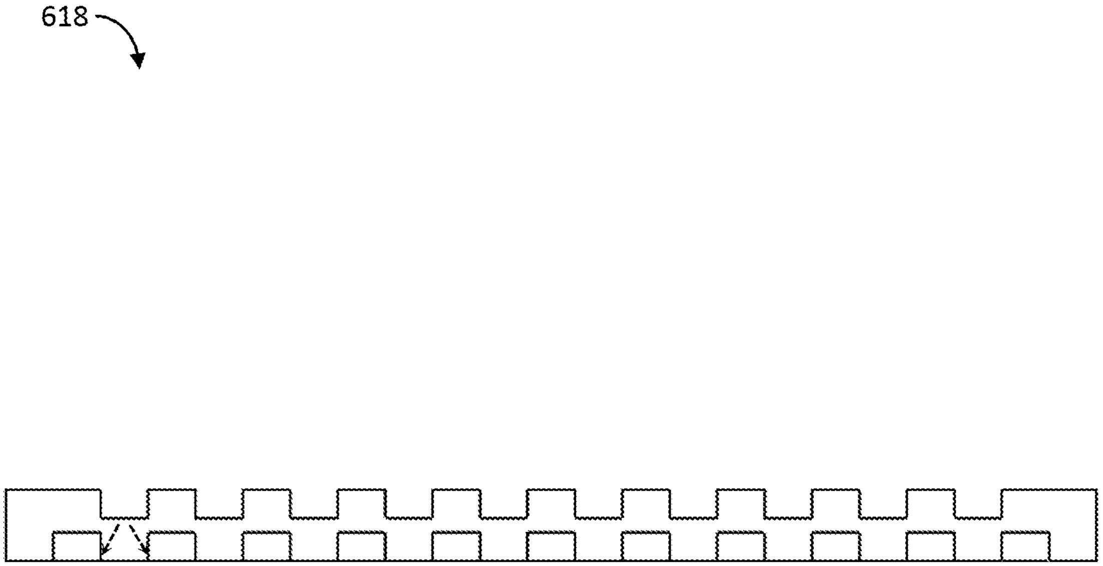
FIG. 13C illustrates a side view of a water generation system including a sorption layer with a vertically-offset interdigitated flow configuration, according to an embodiment.

FIG. 12 illustrates a top-down view of a sorption layer with an interdigitated heat exchange flow configuration. The sorption layer 518 comprises interdigitated flow channels through which process or regeneration gas (indicated by solid lines) flows into absorber through intervening inlet channels between discrete portions of porous sorption layer 518*a-n* (e.g., in a direction at least partially orthogonal to flow channels). Each channel includes a partition, divider or heat exchange surface 519*a-n* configured to allow heat transfer between an inlet channel portion (i.e., in advance of gas flow through a first absorber of absorber 518*a-n*) and an outlet channel portion (i.e., downstream of gas flow through a second absorber adjacent to the first absorber) such that process or regeneration gas is distributed efficiently through full sorption layer with minimal pressure drop.

In some implementations, integrated refrigerant piping or conduits (not shown for ease of description) can be distributed across or throughout porous sorption layer 518 within flow channels and/or embedded into porous material of sorption layer. During a desorption/unloading process, refrigerant can flow through conduit(s) of a refrigerant condenser distributed through sorption layer 518 such that a refrigerant condenser transfers heat to the regeneration gas and/or porous sorption material via conduit(s) extending therethrough. Upon exiting sorption layer 518, water vapor in regeneration fluid can be condensed via a liquid water condenser (which is some embodiments is integrated with a refrigerant evaporator).

Sorption layer(s) or body(s) of the present disclosure can comprise or be formed of a hygroscopic material, hygroscopic body, hygroscopic composite and/or hygroscopic assembly that comprise various components or constituents in a number of varied configurations (e.g., such that the hygroscopic composite is capable of continuous adsorption and desorption of water vapor). In some implementations, a sorption layer is capable of sorption at a first temperature, relative humidity and/or pressure and desorption at a second temperature, relative humidity and/or pressure. The components of the sorption layer can be provided as a liquid, solid, and/or combinations thereof. The sorption layer can be provided as a porous solid substrate impregnated with hygroscopic materials. For example, the hygroscopic material may comprise one or more materials selected from the group consisting of: silica, silica gel, alumina, alumina gel, montmorillonite clay, zeolites, molecular sieves, metal-organic frameworks, activated carbon, metal oxides, lithium salts, calcium salts, potassium salts, sodium salts, magnesium salts, phosphoric salts, organic salts, metal salts, ionic liquids, carbon, glycerin, glycols, hydrophilic polymers, polyols, polypropylene fibers, cellulosic fibers, derivatives thereof, and combinations of thereof. In some embodiments, the hygroscopic composite comprises a metal organic framework (MOF), for example UiO-66(Zr), CAU-1(Al), MIL-101(Cr), MIL-101(Al), MIL-53(Al), MIL-53(Cr), Al fumarate, derivatives thereof or combinations thereof. In some embodiments, the hygroscopic material can be selected and/or configured to avoid sorption of certain molecules (e.g., those molecules that may be poisonous when consumed by a human). The term "sorption," as used herein, refers to absorption, adsorption or a combination thereof.

In various embodiments, the sorption layer can include liquid or deliquescent components combined with retention or support substrates in a ratio determined by a maximum water uptake after a diurnal loading cycle in high relative humidity ambient air conditions (e.g. >40% RH, >60% RH, >80% RH). In various implementations, the sorption layer comprises a hygroscopic salt, for example a deliquescent salt. Hygroscopic salts of the present disclosure can be selected from the group of potassium carbonate, calcium chloride, sodium chloride, lithium chloride, sodium carbonate, magnesium chloride, magnesium sulfate, potassium bromide, sodium sulfate, derivatives thereof or combinations thereof. In some embodiments, a combination of deliquescent salts can be dispersed on a support substrate. For example, a combination of calcium chloride and sodium chloride can be dispersed on a support substrate, with calcium chloride acting as a vapor uptake reservoir at low relative humidities and sodium chloride acting as a differential vapor pressure buffer at mid-range relative humidities. In some embodiments, the sorption layer comprises a hygroscopic salt dispersed on a support substrate. For example, the sorption layer can include a hygroscopic or deliquescent salt in an amount greater than 10% and less than 50% by weight of the total weight of the first hygroscopic composite. The amount of hygroscopic or deliquescent salt dispersed on a substrate can be selected based on its sorption/desorption kinetics for a diurnal water vapor loading/unloading cycle to facilitate water production and avoid weeping, swelling or other stability losses and/or improve system water production. It can be preferable to decrease or minimize the weight of the sorption layer, so the hygroscopic material or salt content can be increased to an upper limit set by weeping, swelling or other stability concerns and/or water production. A weeping, swelling or instability condition or state can occur when a sorption layer absorbs a high enough amount of water to begin forming an aqueous solution and can irreversibly drive migration of a hygroscopic material from the pores or retaining surface features of a support substrate. Furthermore, a weeping, swelling or instability condition or state can increase the pressure drop through the sorption layer and present a degradation or failure mode for the water generation system. In some embodiments, an operational or cycling safety limit can be determined and/or managed (e.g., by system controller 170) before the onset of weeping, swelling or other instability to avoid system degradation or failure and/or improve the efficiency of water production. In some preferred implementations, the sorption layer can include a hygroscopic salt in an amount greater that 20% and less than 30% by weight, or greater that 24% and less than 28% by weight, of the total weight of the hygroscopic composite such that the hygroscopic composite or body maintains a high water storage and release capacity or capability across global average diurnal atmospheric air conditions.

In some embodiments, water generation systems of the present disclosure are configured to flow process and regeneration gas in an open loop and can include or be coupled to one or more components for compression, condensation, expansion, and evaporation of the process and/or regeneration gas itself (rather than or in addition to circulation of a separate refrigerant fluid), as will be described in more detail below. In some embodiments, the process and regeneration gas are the same gas, for example ambient air.

Figure 14:
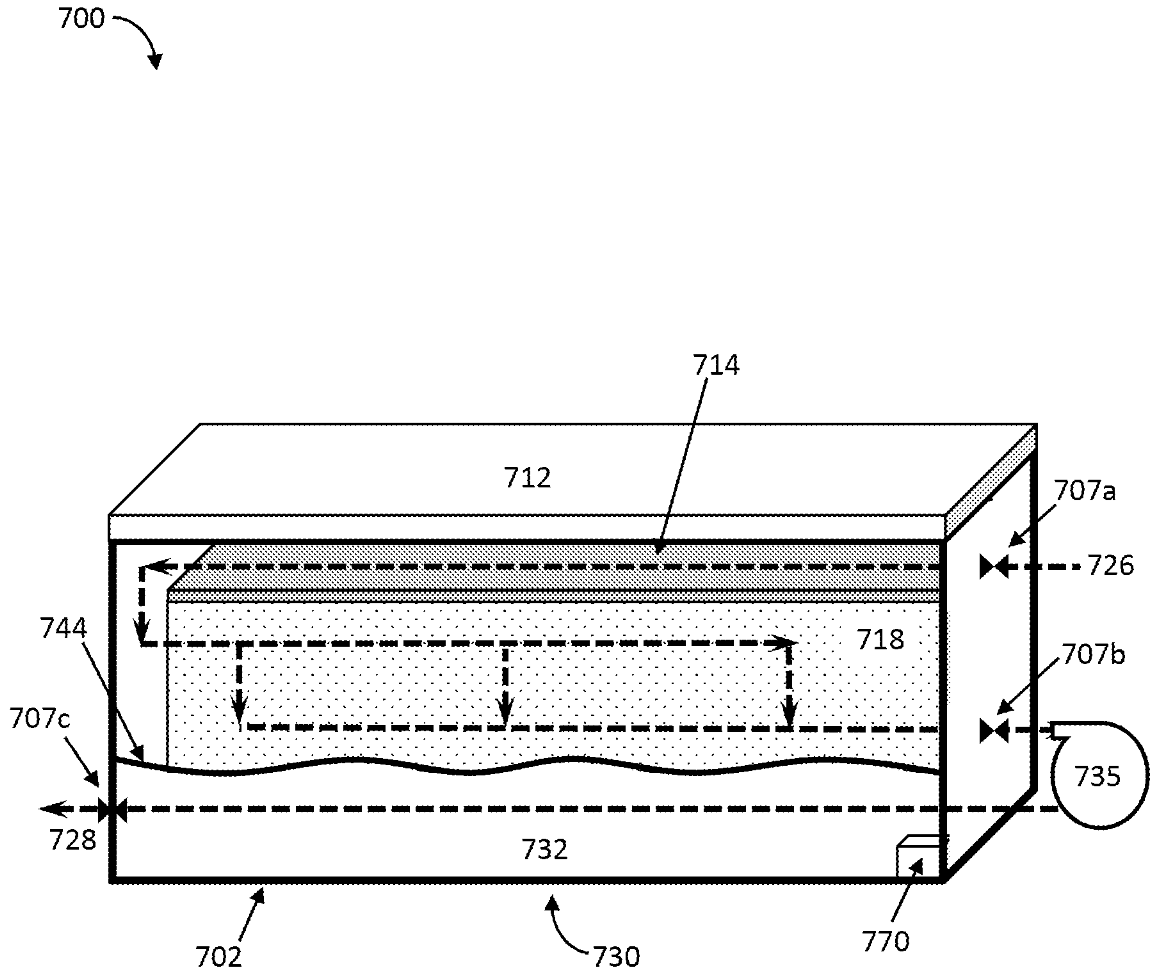
FIG. 14 illustrates a side perspective cross-sectional view of a water generation system including a compressor, according to an embodiment.

FIG. 14 depicts a water generation system 700 comprising heat exchange assembly 730 configured as a liquid water condenser 732 to reduce the temperature of the regeneration fluid by rejecting heat to both the sorption layer 718, via heat transfer surface 744, and to the ambient environment, via outer housing 702. The liquid water condenser 732 can be configured to provide a high surface area for heat transfer to condense water vapor from the regeneration fluid with minimal pressure drop upon flow across or therethrough. As depicted in FIG. 14, liquid water condenser 732 forms an outer portion of the housing 702 so as reject heat to the ambient environment and includes an internal heat transfer surface 744 to reject heat into sorption layer 718.

The heat exchange assembly 730 can be configured as a single sub-unit system 700, such as depicted in FIG. 14, or in other embodiments, be a component of a larger refrigeration or heat transfer cycle (e.g., including some components of a refrigeration circuit, a heat exchanger and/or the like).

Water generation system 700 comprises a pump or compressor 735 (e.g., vacuum pump, positive displacement, centrifugal, axial-flow, rotary screw, rotary vane, reciprocating and/or the like) for compressing regeneration gas in advance of flow through the liquid water condenser 732. Compressor 735 can be configured to reduce a pressure of the regeneration gas within the open loop regeneration flow path, or more particularly produce a low or reduced pressure condition within the sorption layer 718, thereby driving desorption of water vapor from the sorption layer into the regeneration gas during the desorption cycle. The reduced pressure condition in the sorption layer can be characterized by a reduction in a partial pressure of water vapor within the sorption layer to below a vapor pressure of water captured by the hygroscopic material during a prior sorption, uptake or loading cycle.

During the desorption cycle, desorbed water vapor from the sorption layer 718 is carried by the regeneration gas to the liquid water condenser 732 for cooling the regeneration gas, thereby condensing water vapor from the regeneration gas output from the compressor 735. The system can be further configured to transfer heat from condensation of water vapor in the regeneration gas downstream of the regeneration gas compressor 735 to the sorption layer 715 via heat transfer surface 744 during the desorption cycle.

While a single heat transfer surface 744 is depicted in FIG. 14 for ease of description, other configurations are also possible to improve heat transfer from regeneration gas output from compressor to the sorption layer. For example, some configurations of the sorption layer can include one or more integrated or embedded heat exchange flow channels extending through the sorption layer for flowing the compressed regeneration gas therethrough such that heat from condensation of water vapor in the regeneration gas is transferred to the sorption layer during the desorption cycle.

In various embodiments, the regeneration gas compressor 735 can be configured to reduce the pressure of the regeneration gas in the sorption layer 718 and/or flow channel(s) upstream of compressor 735 (e.g., portion of regeneration flow path between top glazing layer 712 and PV panel 714) to about 0.8 atm, about 0.7 atm, or about 0.6 atm (wherein about means +/−0.05 atm). Regeneration gas compressed by compressor 735 can be output or exhausted to a pressure at or above atmospheric pressure, for example to greater than 1.5 atm. In one example, regeneration gas output from compressor 735 can comprise steam from which liquid water is condensed and collected by condenser 732.

Water generation system 700 can include one or more adjustable valve(s) (e.g., 707*a-c*) configured to control an amount of regeneration gas (e.g., ambient air) into one or more portions of the process or regeneration gas flow path (indicated by dashed lines in FIG. 14). A controller (e.g., 770), in communication with the one or more adjustable inlet valve(s) and the regeneration gas compressor (e.g., 735), can be configured to adjust the flow of gas into system 700 in response to: a pressure of gas in the regeneration flow path, a temperature of regeneration gas within the regeneration flow path, an ambient temperature, a time of day, a weather forecast, a solar flux, a humidity of the regeneration gas, a humidity of the process gas during the previous sorption cycle, a water production rate, a water production volume, or a combination thereof.

Water generation system of the present disclosure and related methods of operation can include forming or maintaining a low or reduced pressure in the portions of the flow path upstream of the compressor (e.g., 735) below the ambient atmospheric pressure such that ambient air flows into system (e.g., via inlet 726) by a vacuum or suction effect. This may be preferable in some applications to minimize complexity, maintenance, and/or cost, by eliminating the need for fans, blowers, circulators and other fluidic routing devices with moving parts.

Furthermore, water generation system of the present disclosure and related methods of operation can include forming or maintaining a low or reduced pressure in the sorption layer (e.g., 718) such that the water vapor captured by hygroscopic material therein during a prior sorption, uptake or loading cycle approaches vapor pressure saturation. In various embodiments, a reduced pressure condition is formed within the sorption layer (e.g., 718) such that the reduced pressure condition increases a ratio of the vapor pressure of water captured by hygroscopic material contained therein is greater than the water vapor partial pressure in regeneration gas flowing therethrough.

In various embodiments, methods for operating a water generating system can comprise adjusting the reduced pressure condition by adjusting the compression or pump rate and/or adjusting the flow rate of gas into sorption layer to continuously drive efficient water vapor release and capture from the hygroscopic material. In various embodiments, forming, optimizing, and/or tuning the reduced pressure condition within the sorption layer includes controlling the compression or pump rate to increase the ratio of partial pressure of water vapor on or above the hygroscopic material to the partial pressure of water vapor disposed in the regeneration gas flow through the sorption layer. Such an increased ratio may increase the water vapor and/or liquid flow output from the sorption layer for condensation at the liquid water condenser.

In various embodiments, the rate of regeneration gas (e.g., ambient air) input into sorption layer (e.g., 718) is adjusted with conditions that drive variations in partial pressures of water vapor in the sorption layer (e.g., high humidity regeneration gas, high temperature regeneration gas and/or high thermal power input into sorption layer). As an illustrative example, the flow rate of regeneration gas into system 700 during a first portion of the day can be greater when solar insolation or irradiance is higher so as to optimize water vapor partial pressure and/or decrease relative humidity within the sorption layer. Similarly, the flow rate of regeneration gas input into sorption layer can be adjusted to decrease with conditions that inhibit saturation of water vapor in the sorption layer (e.g., low humidity regeneration gas, low temperature of regeneration gas and/or low thermal power input).

In various embodiments, water generation system (e.g., 700) is configured to maximize or improve liquid water production by adjusting the reduced pressure condition within the sorption layer, for example by determining an operational setpoint of regeneration gas into sorption layer 718. For a set of conditions (e.g., solar flux, ambient pressure, ambient temperature, ambient relative humidity, and amount of water captured by hygroscopic material during a previous sorption or loading time), a maximum amount of water production at an operational setpoint of regeneration gas input to sorption layer can be determined. Below a regeneration flow rate threshold, an insufficient removal rate of water vapor from the sorption layer may occur; whereas, above a regeneration flow rate threshold, dilution of the air-water mixture may occur and, by extension, decrease the ability to condense the water vapor at the condenser. In various embodiments, the controller (e.g., 170, 770) may impose a lower limit for the regeneration flow rate so as to prevent or minimize an operational drop-off for water production. Similarly, the controller may impose an upper limit for the regeneration flow rate so as to prevent or minimize an operational drop-off of in water production. Controller (e.g., 170, 770) can be configured to determine an operational setpoint for both regeneration gas flow rate and compressor power leak rate based on: thermal power (via solar thermal heating or other heating mechanism), heat transfer rate to hygroscopic material of sorption layer, water content of sorption layer (possibly related to available water and less binding energy), ambient relative humidity, (possibly related to a greater flow required to avoid air saturation) or a combination thereof.

Figure 15A:
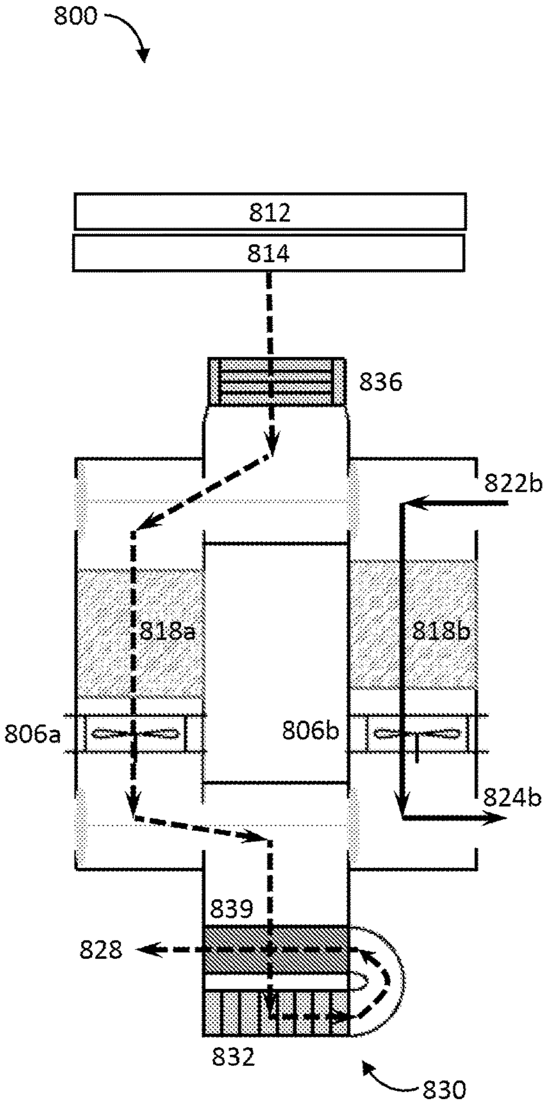
FIG. 15A illustrates a water generation system including a plurality of sorption units alternating between a sorption cycle and a desorption cycle.
Figure 15B:
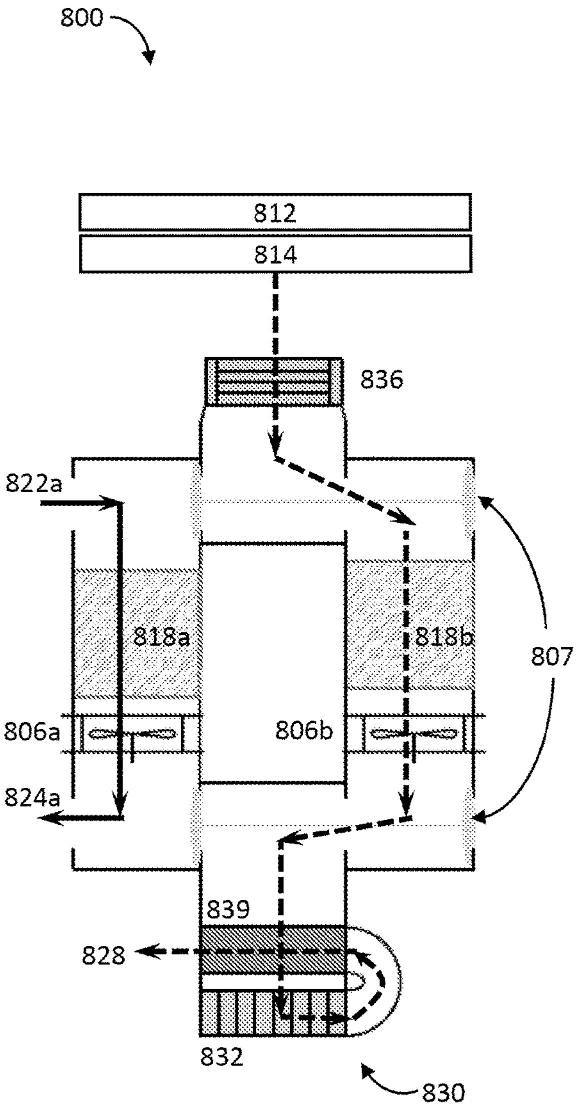
FIG. 15B illustrates a water generation system including a plurality of sorption units alternating between a sorption cycle and a desorption cycle.

Some water generation systems of the present disclosure can include a plurality of distinct or separate sorption layers, bodies or units. Furthermore, water generation systems of the present disclosure can be operated such that some or a portion of the sorption unit(s) of the system are in a desorption mode or cycle while other sorption unit(s) of the system are in a sorption mode or cycle, for example to improve the amount of water generated by the system. In on illustrative example, FIG. 15A and FIG. 15B depict water generation system 800 comprising a first sorption unit 818*a* and a second sorption unit 818*b*, each comprising a hygroscopic material configured to capture water vapor from a process gas when in a sorption mode and release water vapor to a regeneration gas when in a desorption mode. During a first time period depicted in FIG. 15A, sorption unit 818*b* is operated in a sorption mode wherein valve assembly is in a first position such that ambient air flows through a process flow path (depicted in solid arrows) through sorption layer 818*b* via inlet 822*b* and outlet 824*b*. During the first time period, a regeneration gas flows through a regeneration flow path (depicted in dashed arrows) from an upper solar layer (e.g., glazing layer 812 and PV layer 814) to accumulate heat therefrom, through sorption unit 818*a* to accumulate water vapor therefrom, and, through heat exchange assembly 830. As depicted in FIG. 15A-B, heat exchange assembly 830 comprises liquid water condenser 832 configured to condense water vapor from the regeneration gas output from the sorption unit when in the desorption mode.

System 800 can include an adjustable or switching element configured to transition or cycle the sorption units 818*a*, 818*b* between a sorption mode including the process flow path and a desorption mode including the regeneration flow path. For example, system 800 includes movable or dynamic valve assembly 807, in particular upper and lower adjustable valves 807*a-b* than can be actuatable via a system controller, for example based on a water content of sorption unit(s).

In various embodiments, a system controller can adjust the transition time or schedule between each mode, for example in response to an environmental condition (e.g., solar radiation, ambient humidity, time of day) and/or a system operational state (e.g., water content of sorption unit(s), system power availability). The switching element or feature can compromise one or more active or passive flow directing elements or diverters configured to adjust the process and/or regeneration flow paths through the sorption units, and can be programmatically, automatically, or selectively controlled (e.g., by signals sent from a controller).

Upon placing or repositioning valve assembly 807 into a second position depicted in FIG. 15B, sorption unit 818*a* is operated in a sorption mode wherein ambient air flows through a process flow path (depicted in solid arrows) through sorption layer 818*a* via inlet 822*a* and outlet 824*a*. During a second time period depicted in FIG. 15B, a regeneration gas flows through a regeneration flow path (depicted in dashed arrows) from an upper solar layer (e.g., glazing layer 812 and PV layer 814) to accumulate heat therefrom, through sorption unit 818*b* to accumulate water vapor therefrom, and, through heat exchange assembly 830 configured to increase the partial pressure of water vapor in the regeneration gas and/or condense water vapor from the regeneration gas to produce liquid water.

System 800 comprises a refrigerant condenser 836 of a refrigeration circuit that can be configured to transfer heat to the sorption units 818*a*, 818*b* via the regeneration gas when in a desorption mode. In some embodiments, a refrigerant evaporator of the refrigeration circuit can be configured as part of or integrated with liquid water condenser 832 to cool the regeneration gas such that heat from condensation of water vapor in the regeneration gas is transferred to the refrigerant, thereby condensing water vapor from the regeneration gas. Furthermore, a waste heat recuperator (e.g., 839) can reject further heat via counter-flow or cross-flow heat exchange between regeneration gas input to liquid water condenser 832 and regeneration gas output from liquid water condenser 832.

Figure 16A:
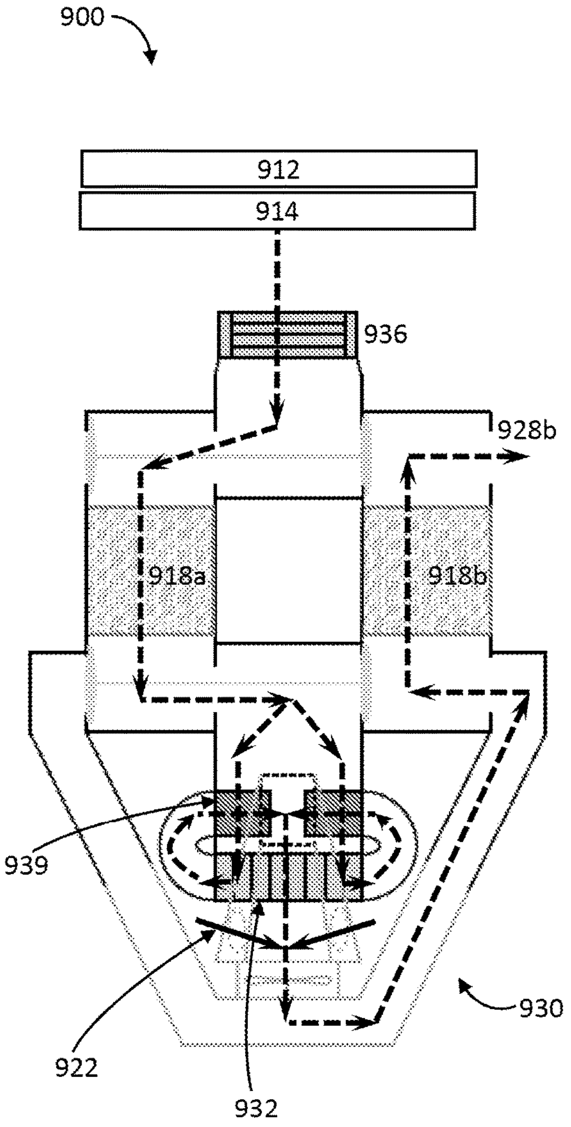
FIG. 16A illustrates a water generation system including a plurality of sorption units alternating between a sorption cycle and a desorption cycle.
Figure 16B:
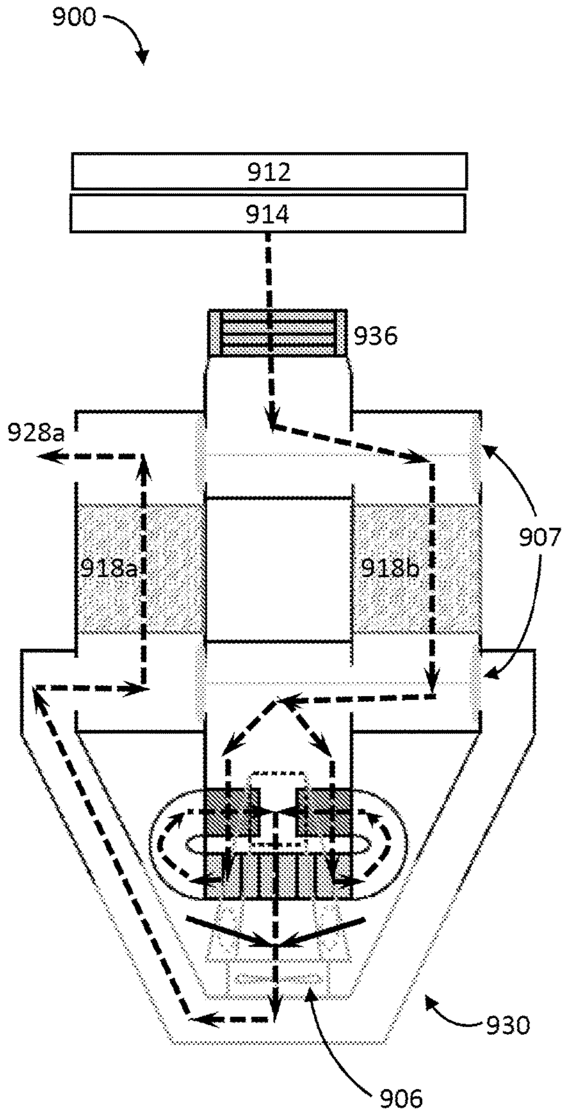
FIG. 16B illustrates a water generation system including a plurality of sorption units alternating between a sorption cycle and a desorption cycle.

System 800 of FIG. 15A-B includes two fans 806*a*, 806*b* associated with each sorption unit 818*a*, 818*b* to flow process gas and regeneration gas in distinct flow paths, however other configurations and flow patterns are also possible, for example to minimize complexity, maintenance, leakage and/or cost. As another illustrative example, system 900 comprises a single fan assembly 906 configured to transport both regeneration gas through the regeneration flow path (indicated by dashed arrows) and transport external ambient air (indicated by solid arrows) into the regeneration flow path downstream of the heat exchange assembly 930. The regeneration flow path (depicted in dashed arrows) is configured to flow regeneration gas in an open loop such that the regeneration gas is exhausted to the ambient environment after flowing through the heat exchange assembly 830 and then through another sorption unit configured to collect any residual water before leaving system 900. As depicted in FIG. 16A-B, a portion of the regeneration flow path comprises a portion of the process flow path such that ambient air is input to regeneration flow path via inlet 922 and directed through a sorption unit in a sorption mode.

During a first time period depicted in FIG. 16A, a regeneration gas flows through a regeneration flow path (depicted in dashed arrows) from an upper solar layer (e.g., glazing layer 912 and PV layer 914) to accumulate heat therefrom, through sorption unit 918*a* in a desorption mode to accumulate water vapor therefrom, and, through heat exchange assembly 930 configured to increase the partial pressure of water vapor in the regeneration gas and/or condense water vapor from the regeneration gas to produce liquid water. As shown in FIG. 16A, when valve assembly 907 is in a first position, sorption unit 918*b* is operated in a sorption mode wherein regeneration gas, which can include a portion of ambient air via inlet 922, is directed through sorption unit 918*b* operating in a sorption mode to collect residual water before being exhausted via outlet 928*b*.

Similarly, during a second time period depicted in FIG. 16B, a regeneration gas flows through a regeneration flow path (depicted in dashed arrows) from an upper solar layer to accumulate heat therefrom, through sorption unit 918*b* operating in a desorption mode to accumulate water vapor therefrom, and, through heat exchange assembly 930 configured to increase the partial pressure of water vapor in the regeneration gas and/or condense water vapor from the regeneration gas to produce liquid water. As shown in FIG. 16B, when valve assembly 907 is in the second position, sorption unit 918*a* is operated in a sorption mode wherein regeneration gas, which can include a portion of ambient air via inlet 922, is directed through sorption unit 918*b* operating in a sorption mode to collect residual water before being exhausted via outlet 928*b*.

Additional valve(s) can be configured to control an amount of ambient air into one or more portions of the process or regeneration gas flow path. A controller in communication with the one or more adjustable valve(s) can be configured to adjust the flow of gas into and through the system in response to: a pressure of gas in the regeneration flow path, a temperature of regeneration gas within the regeneration flow path, an ambient temperature, a time of day, a weather forecast, a solar flux, a humidity of the regeneration gas, a humidity of the process gas during the previous sorption cycle, a water content of sorption unit(s), a water production rate, a water production volume, or a combination thereof.

Water generation systems of the present disclosure can be configured as a lightweight, compact and/or transportable device that can be easily installed on a surface, for example by one or two people. FIG. 17-35 depict various implementations of efficient water generation systems configured as lightweight, compact and/or transportable device. Unless otherwise specified below, the numerical indicators used to refer to components in FIG. 17-35 are similar to those used to refer to components or features in FIG. 1-16 above, except that the index has been incremented by 1000.

Figure 17:
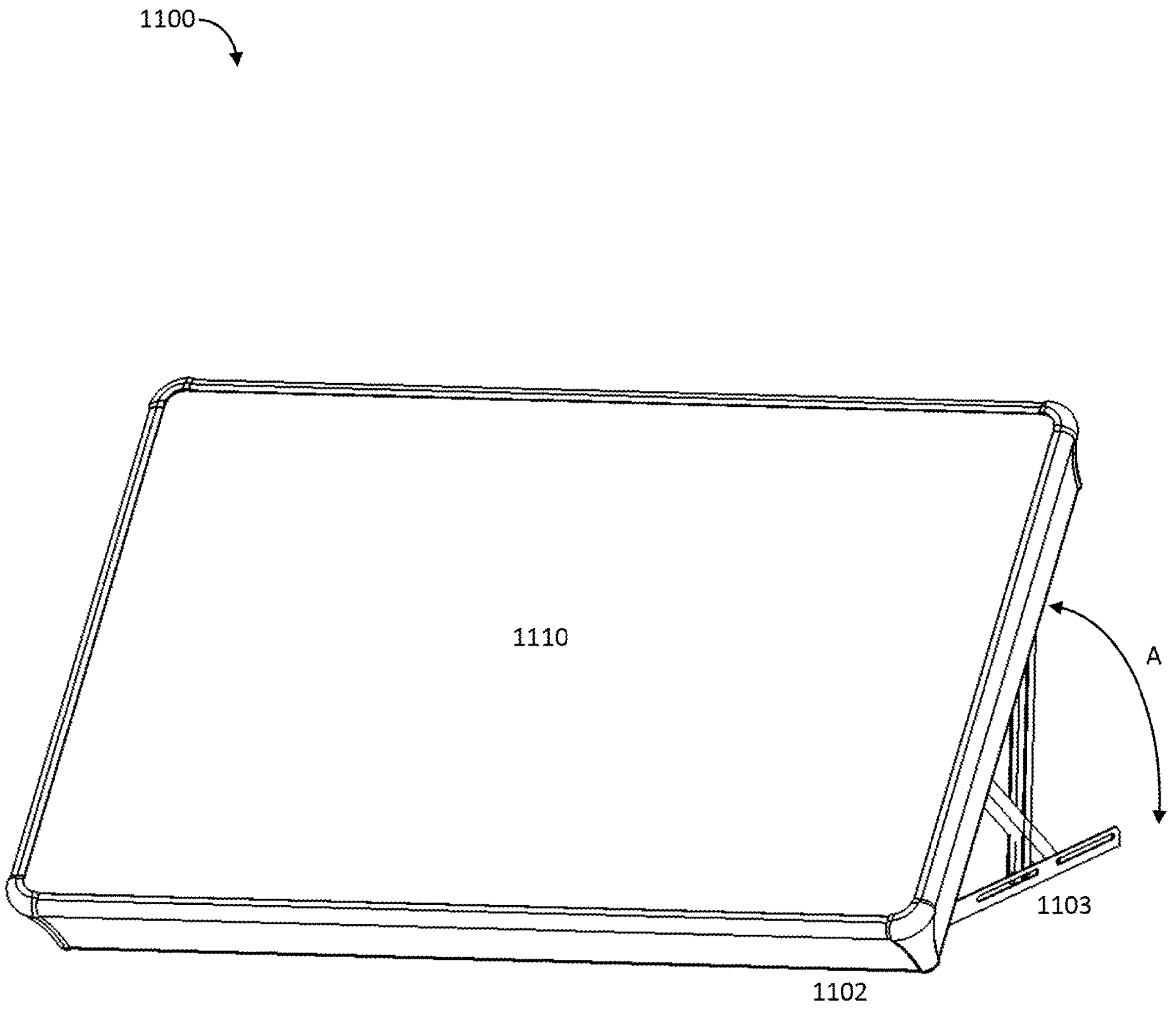
FIG. 17 illustrates a front side perspective view of a water generation system, according to an embodiment.
Figure 18A:
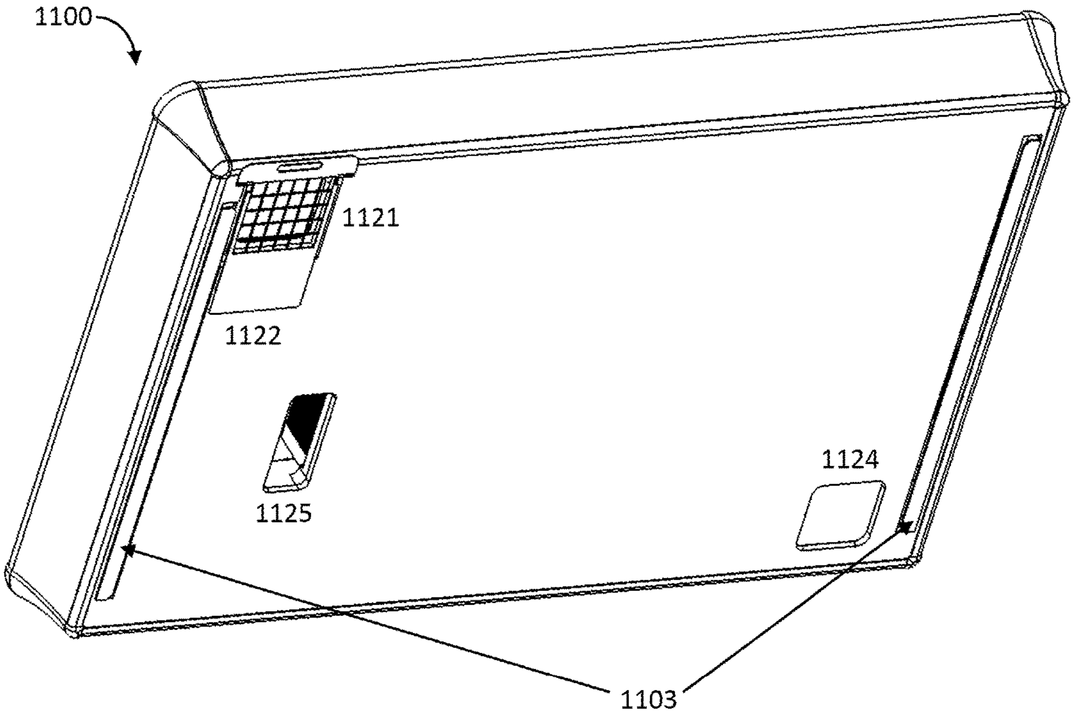
FIG. 18A illustrates a rear side perspective view of a water generation system, according to an embodiment.
Figure 18B:
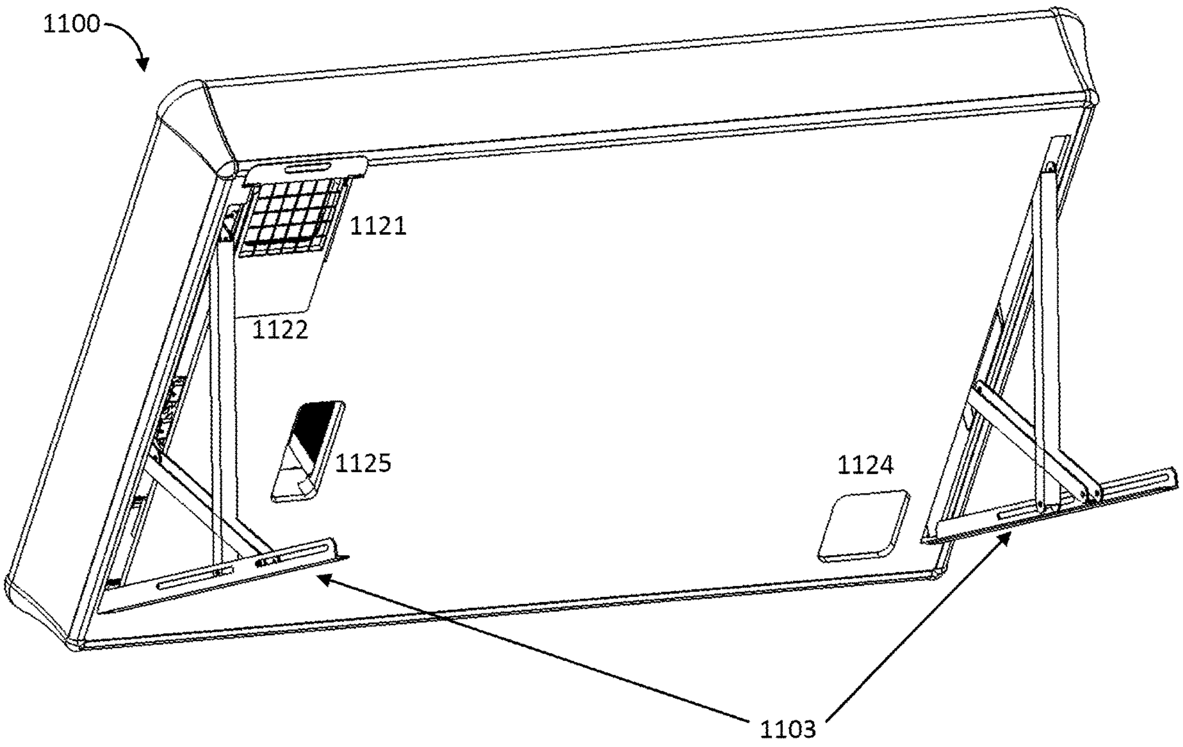
FIG. 18B illustrates a rear side perspective view of a water generation system in an installed state, according to an embodiment.

FIG. 17 depicts a front perspective view of water generation system 1100 configured as a transportable panel that can be easily installed on a surface, for example by one or two people. FIG. 18A and FIG. 18B depict a rear perspective view of water generation system 1100 comprising a mounting assembly 1103 that can be oriented and installed on a surface to receive incoming solar radiation, for example in a fixed tilt configuration. System 1100 can be installed or mounted above a ground surface or rooftop via adjustable mounting assembly 1003 configured to extend from the system housing to position system 1100 in a fixed tilt configuration e.g., at an angle A relative to a generally horizontal ground surface or flat rooftop. System 1100 can be oriented toward the southern sky for an installation in the Northern Hemisphere, or toward the northern sky for an installation in the Southern Hemisphere. The descriptive terms used herein such as front, rear, above, below, top, bottom, over, under, etc. are used to aid understanding of the invention are not used in a limiting sense. Furthermore, the directions north, south, east and west may be used herein assuming the installation site is in the Northern Hemisphere, however opposite directions can be used for installations in the Southern Hemisphere without departing from the spirit and scope of the present disclosure.

As depicted in FIG. 18A and FIG. 18B, support assembly 1103 comprises a plurality of adjustable or collapsible mounting arms that can support the water generation system at fixed angle above the mounting surface (e.g., ground surface or rooftop). As depicted in FIG. 18A, support assembly 1103 comprises a plurality of mounting arms configured to retract or fold into housing 1102, for example during transport or storage. As shown in FIG. 18B, mounting arms of support assembly 1103 can extend from the housing 1102 and engage or interlock into a fixed position to securely orient the front surface of system 1100 (e.g., front surface glass layer 1112 of solar layer 1110) at fixed tilt angle to face a southern direction, for example when installed on a flat or horizontal mounting surface. When in an installed state, the system 1100 can be supported at angle A relative to the mounting surface and also allow for ambient air intake and/or exhaust from a rear panel of the housing 1102 as depicted in FIG. 18B.

In various embodiments, one or more filters can be provided to filter process gas (e.g., remove contaminants like dust and the like from ambient air) in advance of input to the water generation system. For example, a replaceable or serviceable filter tray 1121 can be configured to mate (e.g., slide) into a housing receptacle to cover process or ambient air inlet 1122. In various embodiments, one or more replaceable air filters can be provided as part of a housing assembly, a system fan assembly and/or a valve assembly, to filter ambient air in advance of ingress into system 1100.

Figure 19:
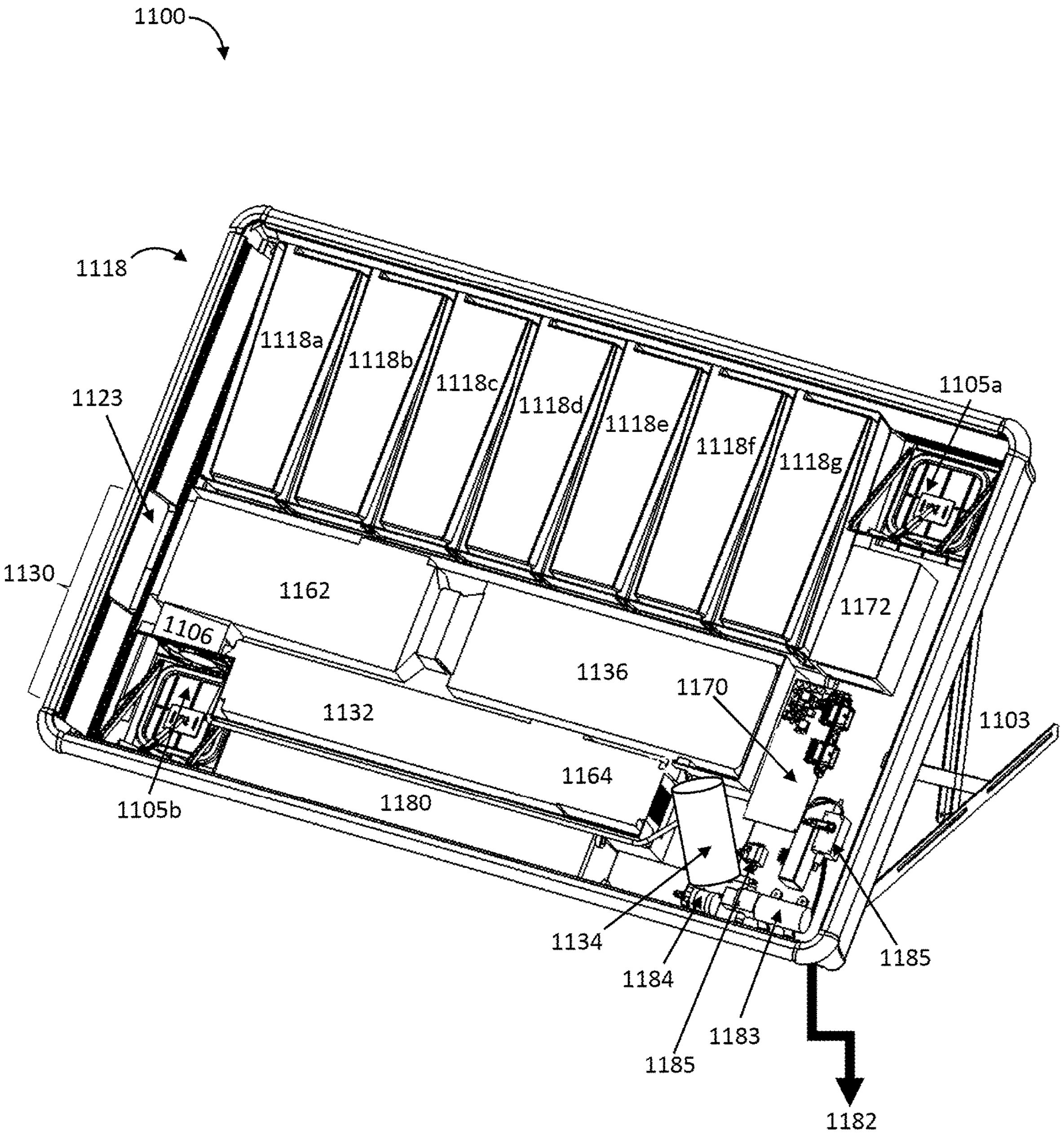
FIG. 19 illustrates a front side perspective cross-sectional view of a water generation system, according to an embodiment.

FIG. 19 illustrates a front perspective cross-sectional view of water generation system 1100 in absence of a top surface glazing layer 1112 and/or photovoltaic panel 1114 for the purposes of description. Additionally, FIG. 20A shows a simplified block diagram of a configuration for water generation system 1100 for the purposes of description.

Figure 20A:
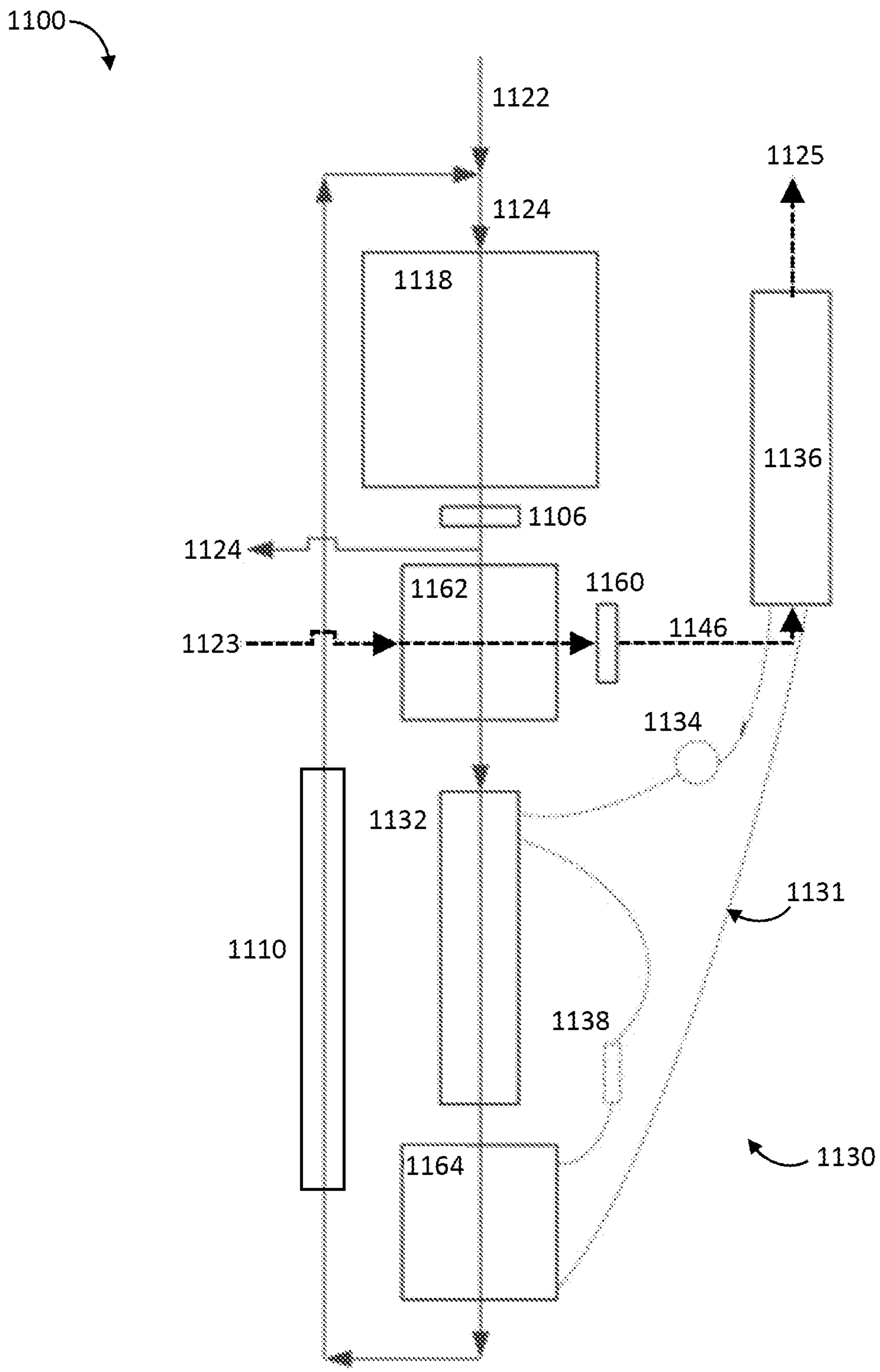
FIG. 20A shows a block diagram of a configuration for compact water generation system, according to an embodiment.

As depicted in FIG. 19 and FIG. 20A, water generation system 1100 comprises a heat exchange assembly 1130 configured to condense water vapor from a regeneration fluid flowing in a regeneration flow path that is at least partially closed loop (depicted as solid arrows in FIG. 20A such that regeneration fluid flows through solar layer 1110, sorption unit 1118, heat exchanger 1162, refrigerant evaporator 1132, heat exchanger 1164, and back to solar layer 1110). Heat exchange assembly 1130 comprises refrigeration circuit 1131 configured to circulate, via refrigerant piping or tubing, a refrigerant in a closed refrigerant loop (indicated by dotted lines in FIG. 20A) including a refrigerant evaporator 1132 (e.g., functioning as or configured as part of a liquid water condenser for condensing water vapor from the regeneration fluid), a refrigerant compressor 1134, a refrigerant condenser 1136, and a refrigerant expansion device 1138.

FIG. 20A depicts regeneration flow path in a closed loop such that regeneration gas is recirculated within water generation system. However other implementations may be configured to flow a regeneration gas in at least partially open loop such that at least a portion of the regeneration gas is exhausted to the ambient environment after condensation of water vapor therefrom.

In many embodiments, a heat exchange assembly (e.g., 1130) comprises a refrigerant evaporator (e.g., 1132) functioning as a liquid water condenser to cool regeneration fluid and condense water vapor from the regeneration fluid to produce liquid water. As such, the portion of the heat exchange assembly configured to condense water vapor from the regeneration fluid can also be referred to as a condenser assembly or a liquid water condenser. In one example, heat exchange assembly 1130 can comprise a condenser assembly including refrigerant evaporator 1132, ambient air heat exchanger 1162 and heat exchanger 1164, wherein the condenser assembly condenses water vapor from the regeneration fluid upon flow therethrough, and optionally collects condensed liquid water, for example via a liquid water collection tray.

In some implementations, a heat exchanger can be provided to function as a second refrigerant condenser so as to sub-cool the refrigerant by rejecting heat to the regeneration fluid downstream of the refrigerant evaporator. In that case, the regeneration fluid can be in a sub-ambient cooled state. By pre-cooling refrigerant before entering expansion device, improved operational efficiency can be realized by directly cooling the refrigerant, and as such, imparting subcooling on a high pressure side of the refrigeration cycle. In the exemplary configuration depicted in FIG. 20A, heat exchanger 1164 can function as a second refrigerant condenser to sub-cool the refrigerant by passing sub-ambient cooled regeneration fluid therethrough. As such, heat exchanger 1164 may not itself function as a liquid water condenser for condensing water vapor from the regeneration fluid. Rather, regeneration fluid flowing in the regeneration fluid path through heat exchanger 1164 may receive heat from the refrigerant flowing in the refrigeration circuit 1131. As such, the regeneration fluid flowing through heat exchanger 1164 may not be saturated and therefore, will not condense additional water vapor downstream of the refrigerant evaporator 1132. In such an implementation, heat exchanger 1164 may function as a second refrigerant condenser in addition to refrigerant condenser 1136. By precooling refrigerant before entering expansion device 1138, improved operational efficiency can be realized by directly cooling the refrigerant, and as such, imparting subcooling on a high pressure side of the refrigeration cycle (i.e., efficiently subcooling the refrigerant over the vapor dome before refrigerant enters expansion device 1138. However, other configurations are also possible wherein a refrigerant evaporator and at least one other heat exchanger each condense water vapor from the regeneration fluid and thereby function as a liquid water condenser. For example, in the configuration depicted in FIG. 20B, refrigerant evaporator 1132' and heat exchanger 1164' are both configured to condense water vapor from the regeneration fluid upon flow therethrough, thereby functioning together as a liquid water condenser for the production of water from a process gas. It is also possible for liquid water to condense at heat exchanger 1162 and/or heat exchanger 1162', if desired.

As shown in the block diagram of FIG. 20A, system 1100 comprises a closed-loop or recirculating regeneration flow path (indicated by solid black arrows) that directs a regeneration fluid from a heating device or layer (e.g., solar thermal layer or solar layer 1110 including glazing layer 1112 and/or PV panel 1114) to collect heat, through sorption layer 1118 to collect water vapor (and in some implementations, additional heat), and across or through heat exchange assembly 1130 for cooling and condensation of water vapor from the regeneration fluid before being redirected back to the solar layer 1110 of system 1100 in at least a partially closed loop manner. In this way, heat and/or moisture can be recycled within system 1100 for efficient water production. System 100 can include one or more blowers or fans (e.g., fan 1106) to increase or adjust the flow rate of the "working" or regeneration fluid in the regeneration flow path.

Figure 22:
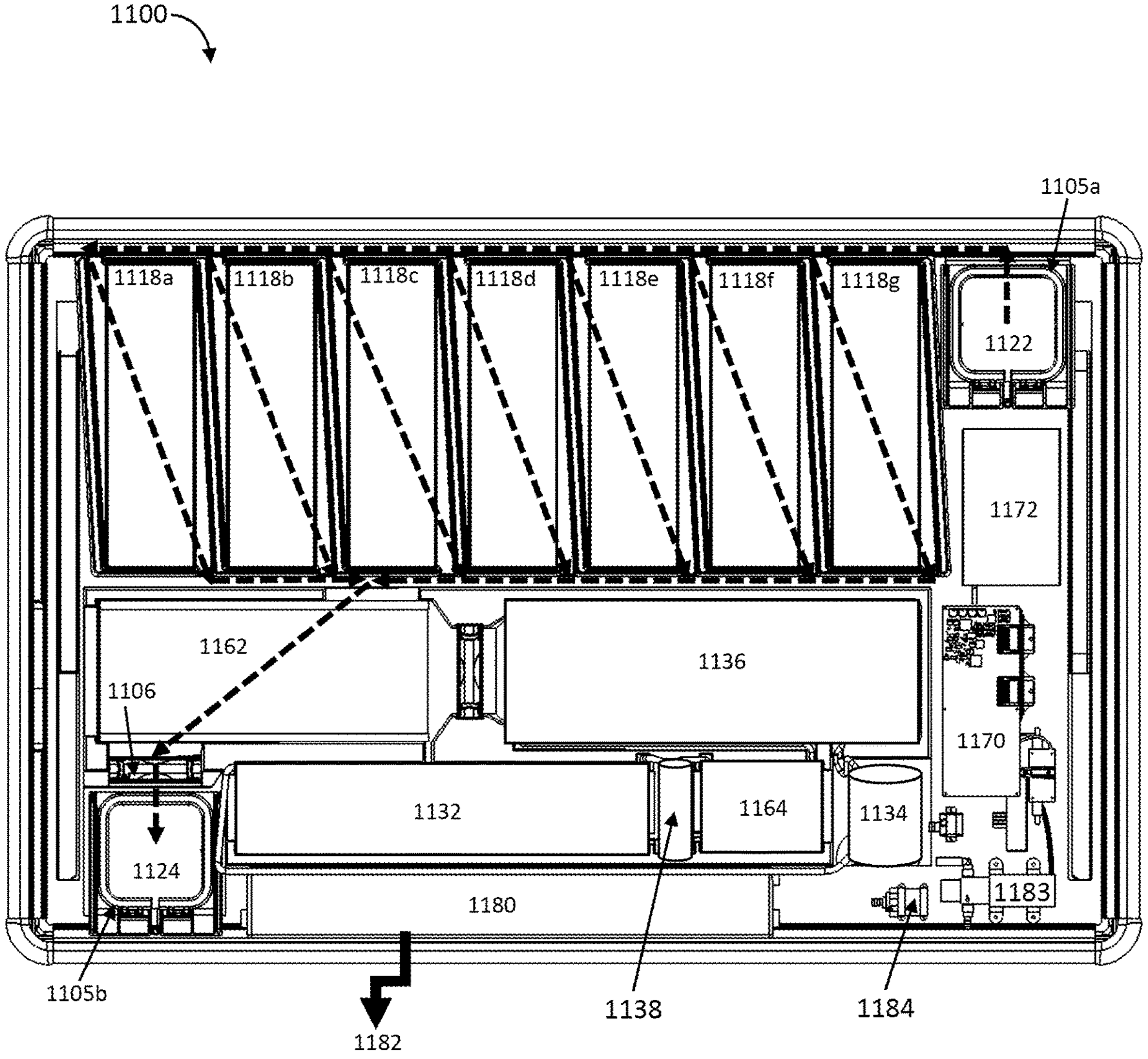
FIG. 22 illustrates a top-down cross-sectional view of a water generation system during an uptake, loading or sorption cycle or mode, according to an embodiment.
Figure 23:
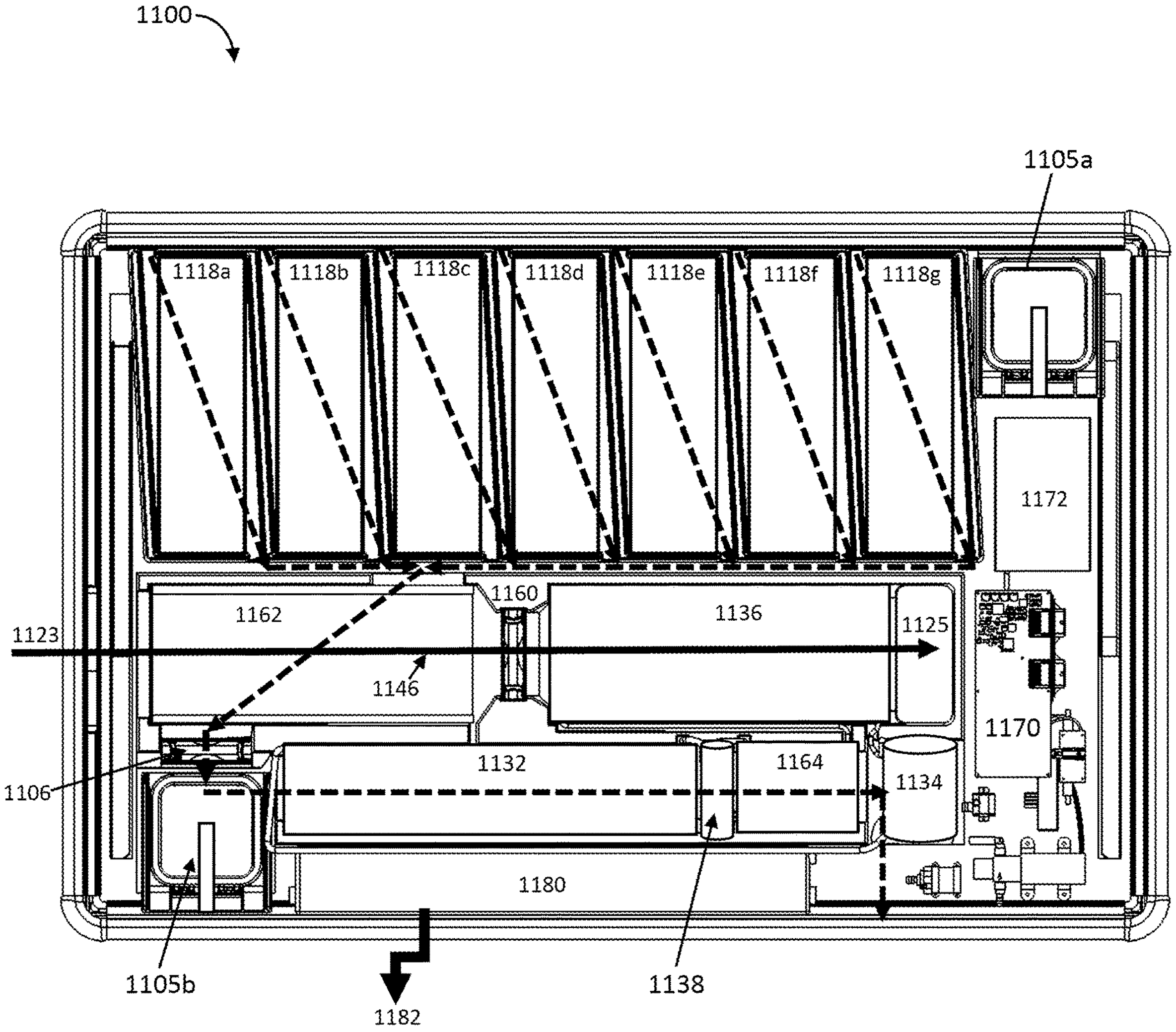
FIG. 23 depicts a top-down cross-sectional view of water generation system 1100 during a release, unloading or desorption cycle or mode, according to an embodiment.

In accordance with FIG. 20A, FIG. 22 illustrates a top-down cross-sectional view of water generation system 1100 during a loading or sorption cycle and FIG. 23 depicts a top-down cross-sectional view of water generation system 1100 during an unloading or desorption cycle. For the purposes of description, solar layer 1110 is removed to make components below the solar layer visible in FIG. 22 and FIG. 23.

During a sorption or loading operational cycle, such as depicted in FIG. 22, a process flow path (indicated by dashed lines) can direct ambient air into process inlet 1122 via a fan assembly 1106 and valves 1105*a-b* in an open state (e.g., via actuation by system controller 1170). Upon entering process inlet port 1122, process gas can be transported through system 1100 along a process flow path through sorption unit 1118 to absorb water vapor therein before exiting through outlet 1124. The example of FIG. 22 depicts one fan assembly and two valves to control flow of process gas, e.g., ambient air, through system 1100, however other configurations are also possible. Any suitable or desirable number or type of fans, blowers, valves, inlets, outlets, separately or in combination, can be used to direct, manage or control flow through system 1100. In some embodiments, various flow management elements can passively or actively seal one or more interior chambers closed. Furthermore, system 1100 can include one or more valves or mechanisms for flow bypass and/or alternative fluid passageway configurations, as well as to provide a system-wide or total ingress protection mode wherein the system 1100 is partially or fully sealed from the outside environment, for example in response to a severe weather event forecast or standby mode. The system can include valves operating under any number of mechanisms including but not limited to actuated valves, inflatable valves, iris valves, butterfly valves, poppet valves, passive valves, active flow directing valves, restricting valves and/or the like.

During an unloading or desorption cycle, for example as depicted in FIG. 20A and FIG. 23, the regeneration fluid can accumulate heat upon flowing along or within the solar layer 1110 (e.g., glazing 1112 and PV panel 1114), accumulate water vapor upon flowing through the sorption unit 1118 and then efficiently release the accumulated water vapor (i.e., generate liquid water via condensation) upon flowing through heat exchange assembly 1130. Heat exchange assembly 1130 comprises refrigerant evaporator 1132, refrigerant condenser 1136, regeneration fluid-to-ambient air heat exchanger 1162, and refrigerant-to-regeneration fluid heat exchanger 1164. Furthermore, a cooling flow path 1146 (indicated by solid line in FIG. 23) directs a cooling fluid, or more particularly ambient air, into heat exchanger 1162 and refrigerant condenser 1136 via ambient cooling inlet 1123, cooling outlet 1125 and fan assembly 1160 to further drive condensation of water vapor from the regeneration fluid.

The heat exchange assembly 1130 can be configured to increase the relative humidity and/or the partial pressure of water vapor in the regeneration fluid to drive condensation of water vapor from the regeneration gas during a desorption cycle or mode. The heat exchange assembly 1130 of system 1100 can be configured to reduce the temperature of the regeneration fluid by rejecting heat to ambient environment and/or another heat absorbing fluid, e.g., a refrigerant in the refrigeration circuit.

As depicted in FIG. 20A, FIG. 22 and FIG. 23, the heat exchange assembly 1130 comprises an assembly of components. Refrigerant evaporator 1132 is configured to function as a liquid water condenser such that heat from condensation of water vapor in the regeneration gas is transferred to the refrigerant circulating in the refrigeration circuit 1131. When the refrigerant evaporator 1132 of refrigeration circuit 1131 is configured as a liquid water condenser, the refrigerant evaporator 1132 can function as a heat exchanger transferring heat from the regeneration gas (and/or latent heat from condensation of water vapor from regeneration gas) in the regeneration flow path to the refrigerant circulating in refrigeration circuit 1131. The refrigerant evaporator 1132 can provide a high surface area for heat transfer to condense water vapor from the regeneration fluid with minimal pressure drop upon flow across or therethrough and as such, function to condense water vapor form the regeneration fluid flowing in the regeneration flow path.

In some embodiments, the refrigeration circuit can be integrated (e.g., in thermal contact, formed as part of, and/or the like) with a sorption layer or unit such that the refrigerant condenser transfers heat, i.e., acts as a thermal source, to the sorption unit during the desorption cycle so as to desorb water from the hygroscopic material. In one example, a water generation system can be configured such that any heat output from refrigerant condenser is routed to the sorption unit or layer by convective heat transfer via a heat absorbing fluid or "air-to-air" heat exchange (e.g., fluid output via outlet 1125 is routed to heat the sorption unit 1118) and/or conductive heat transfer via direct thermal contact between a refrigerant condenser (e.g., 1136) and at least a portion of sorption layer or unit (e.g., 1118). In other embodiments such as depicted in FIG. 20, FIG. 22 and FIG. 23, sorption unit 1118 is not in direct thermal contact with refrigerant condenser 1136, nor is gas output via outlet 1125 routed to heat the sorption unit 1118, however such configurations are also possible.

One or more heat exchangers (e.g., 1162, 1164') can be configured as a recuperative or counter-flow heat exchanger formed as or comprising a monolithic structure having heat transfer walls or surfaces separating flow paths. At least some structural components can be formed or molded together, for example during the same manufacturing and/or assembly operation to form a recuperative heat exchanger from stamped sheet metal, stainless steel, plastic, or other materials and optionally coated with water safe coatings. In one example a recuperative heat exchanger can be formed as a monolithic structure comprising heat exchange surfaces or plates bonded via brazing, gasketing, adhesive, and/or welding. In another example, recuperative heat exchangers can be formed as a monolithic structure thermoformed from thermoplastic materials.

In embodiments where a recuperative heat exchanger is formed as a monolith, one or more benefits and advantages can be provided. For example, a monolithic recuperative heat exchanger can provide a low profile or compact system. Furthermore, a monolithic recuperative heat exchanger can offer a lower manufacturing cost and/or be easily replaced in the field. Additionally, a monolithic configuration can reduce the number of portions or components of the system to simplify the manufacture, maintenance, complexity and/or other aspects associated with making and using the system. Recuperative heat exchangers can increase the relative humidity and/or the partial pressure of water vapor in the regeneration fluid to drive condensation of water vapor from the regeneration gas during the release or desorption operational mode or cycle. Recuperative heat exchangers can be configured to reduce the temperature of at least a portion of the regeneration fluid by rejecting heat to ambient environment, another cooler portion of the regeneration fluid and/or another heat absorbing fluid, e.g., a refrigerant.

Recuperative heat exchange assemblies of the present disclosure can be simple in design and easy to manufacture. Furthermore, low heat transfer performance due to environmental and/or system conditions can limit water production rates of the system. In some implementations, water generation systems can operate in a hybrid or dynamic manner wherein an operational setpoint is adjusted (e.g., power distribution to ambient air cooling fan 1160 and/or regeneration fan 1106 via controller 1170) based on a system operational state (e.g., system power state, system water content) and/or an environmental condition (e.g., ambient relative humidity, ambient temperature) to improve water production performance. Recuperative heat exchangers of the present technology can be configured to increase the relative humidity (% RH) and/or the partial pressure of water vapor in at least a segment of the regeneration fluid flow path downstream of the sorption unit (e.g., 1118) to drive condensation of water vapor therefrom, thereby improving liquid water production during a release operational mode or cycle. As an illustrative example, the system controller can increase power distribution to the refrigerant compressor of the refrigeration circuit if a system power state is greater than a predetermined threshold, if a system water content is above a predetermined threshold and/or if an ambient temperature is above a predetermined threshold. Similarly, system controller can decrease power distribution to the refrigerant compressor of the refrigeration circuit if a system power state is below than a predetermined threshold, if a system water content is below a predetermined threshold and/or if an ambient temperature is below a predetermined threshold.

As depicted in FIG. 20A, heat exchange assembly 1131 comprises heat exchanger 1162 downstream of the sorption unit 1118 and heat exchanger 1164 downstream of the refrigerant evaporator 1132. As such, heat exchanger 1162 is configured to transfer heat from regeneration fluid output from hygroscopic sorption unit 1118 to cooling fluid (e.g., ambient air) entering via inlet 1123 in advance of flow across or through refrigerant condenser 1136. In this way, regeneration fluid is pre-cooled in advance of entering refrigerant evaporator 1132. Heat exchanger 1164 is configured to transfer heat from regeneration fluid output from refrigerant evaporator 1132 to refrigerant flowing in refrigerant circuit 1131.

Unless otherwise specified below, the numerical indicators used to refer to components in FIG. 20A are similar to those used to refer to components or features in FIG. 20B and FIG. 20C, except that an apostrophe has been added to the numerical indicator for ease of description (i.e., numerical indicators of FIG. 20B include a single apostrophe and numerical indicators of FIG. 20C include a double apostrophe).

In FIG. 20A, heat exchange assembly 1131 comprises a heat exchanger 1162 downstream of hygroscopic sorption unit 1118 and heat exchanger 1164 downstream of refrigerant evaporator 1132 functioning to condense water vapor from regeneration fluid. However, other configurations and numbers of heat exchange units for efficient heat exchange are also possible. As another example, FIG. 20B depicts heat exchange assembly 1131' comprising heat exchanger 1162' downstream of the sorption unit 1118' and heat exchanger 1164' downstream of heat exchanger 1162' in advance of regeneration flow through or across refrigerant evaporator 1132'. In another example, FIG. 20C depicts heat exchange assembly 1131" comprising heat exchanger 1140" downstream of solar layer 1110" and upstream of sorption unit 1118" and heat exchanger 1162" and heat exchanger 1164" downstream of sorption unit 1118".

Figure 20B:
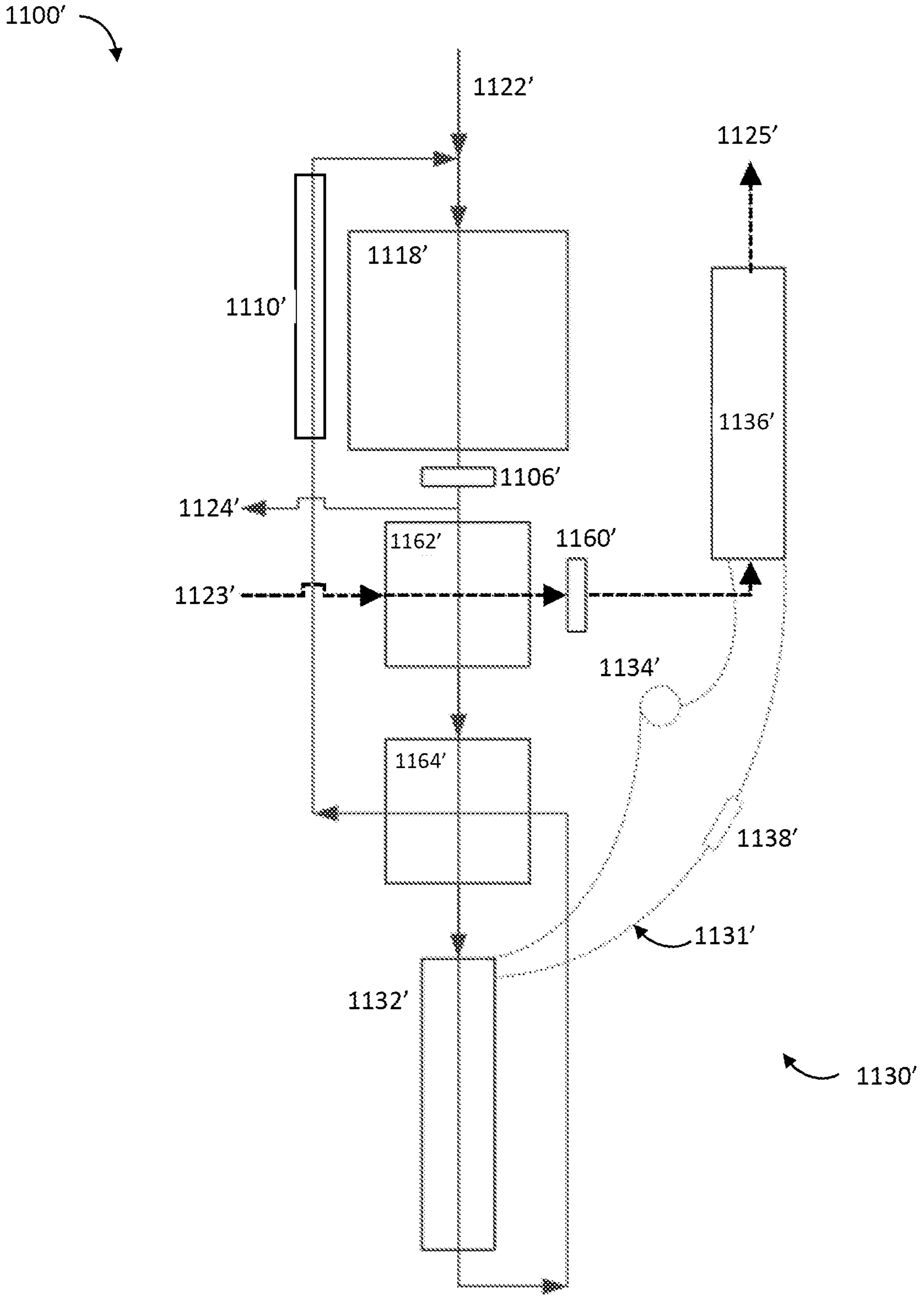
FIG. 20B shows a block diagram of a configuration for compact water generation system, according to an embodiment.
Figure 20C:
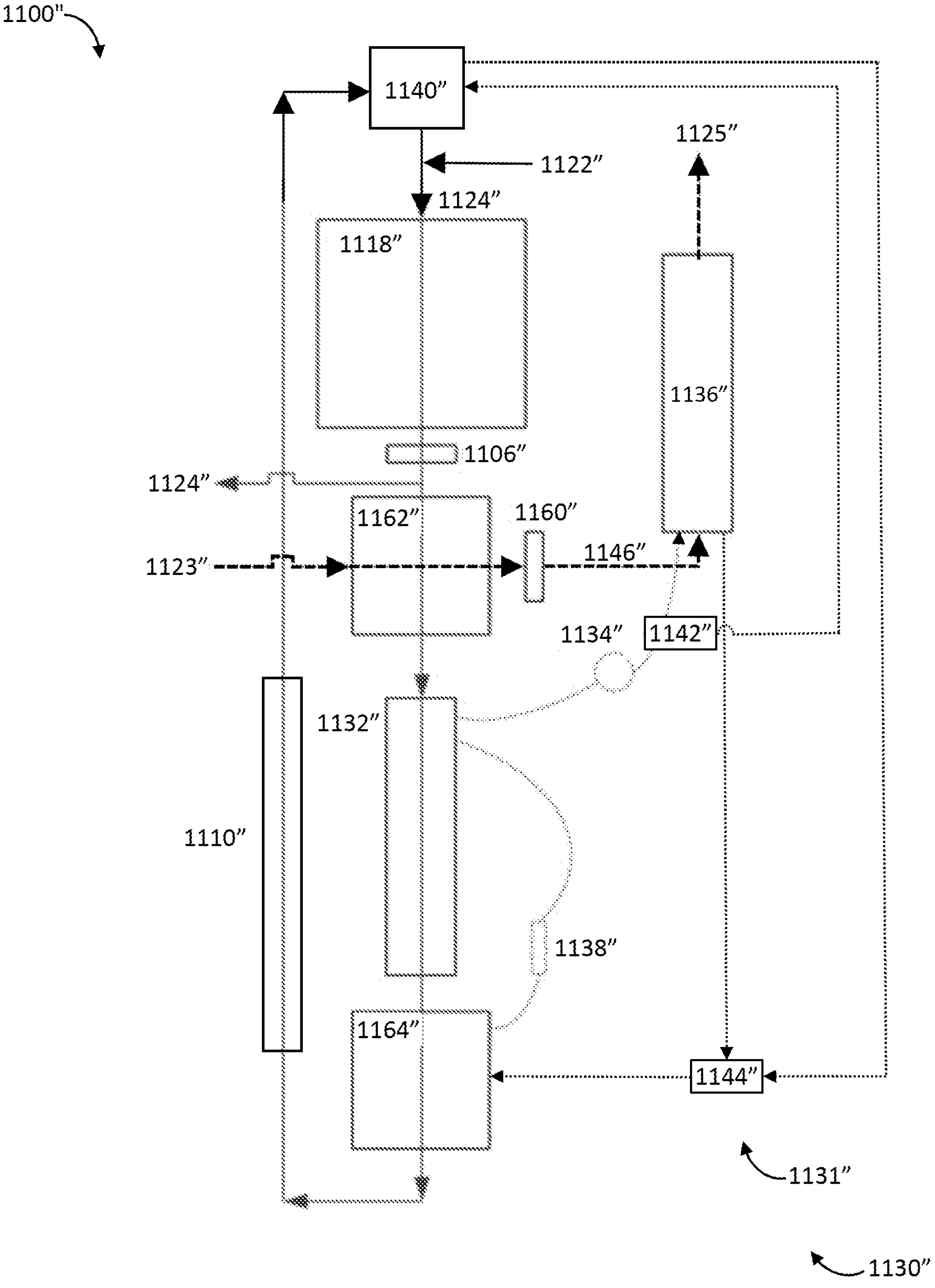
FIG. 20C shows a block diagram of a configuration for compact water generation system, according to an embodiment.

In both configurations depicted in FIG. 20A, FIG. 20B and FIG. 20C, regeneration fluid flowing across or through heat exchanger 1162 can be cooled by ambient air flowing in cooling fluid path 1146 and as such, heat exchanger 1162, heat exchanger 1162' and heat exchanger 1162" can be referred to as an ambient air heat exchanger (e.g., "air-to-air" or "ambient air-to-regeneration gas" heat exchanger). In FIG. 20A, regeneration fluid flowing across or through heat exchanger 1164 pre-cools refrigerant entering refrigerant evaporator 1132 of refrigeration circuit 1131. By pre-cooling refrigerant before entering expansion device 1138, improved operational efficiency can be realized by directly cooling the refrigerant, and as such, imparting subcooling on a high pressure side of the refrigeration cycle (i.e., efficiently subcooling the refrigerant over the vapor dome before refrigerant enters expansion device 1138).

FIG. 20B shows a variation in water generation system configuration to maintain a low refrigerant evaporator 1132' temperature for condensation of water vapor from the regeneration fluid. In FIG. 20B, regeneration fluid leaving refrigerant evaporator 1132' pre-cools regeneration fluid entering refrigerant evaporator 1132'. Heat exchanger 1164 in the architecture of FIG. 20A is configured as a regeneration fluid-to-refrigerant (e.g., "air-to-refrigerant") heat exchanger, whereas heat exchanger 1164' of FIG. 20B is configured as a regeneration fluid-to-regeneration fluid (e.g., air-to-air) heat exchanger. In one example, heat exchanger 1164' of FIG. 20B can be configured as a recuperative heat exchanger wherein regeneration gas flows in a first regeneration flow path segment including hot-side flow layers in a direction at least partially counter to the flow direction of regeneration gas in a second regeneration flow path segment including cold-side layers of the recuperative heat exchanger.

FIG. 20C shows another exemplary configuration of a water generation system 1100" including heat exchanger 1140" configured to "pre-heat" regeneration fluid in advance of sorption unit 1118". In the example of FIG. 20C, system 1100" includes a refrigerant flow diversion architecture which can improve efficiency of water generation by increasing the temperature of regeneration fluid for desorption of water vapor upon flow through sorption unit 1118".

As depicted in FIG. 20C, heat exchange assembly 1130" is configured to condense water vapor from a regeneration fluid flowing in a regeneration flow path that is at least partially closed loop (depicted as solid arrows in FIG. 20C such that regeneration fluid flows through solar layer 1110", heat exchanger 1140", sorption unit 1118", heat exchanger 1162", refrigerant evaporator 1132", heat exchanger 1164", and back to solar layer 1110").

In the example of FIG. 20C, heat exchanger 1140" is provided upstream of sorption unit 1118", however heat exchanger 1140" can be integrated with or embedded in the sorption unit 1118" such that heat from condensation of refrigerant vapor is transferred to the sorption layer 1118" during a desorption cycle. In one example, system 1100" can be configured to divert at least a portion of the refrigerant in refrigerant circuit 1131" to heat exchanger 1140" so as to bypass heat exchanger 1136", then directed to heat exchanger 1164", for example via one or more flow diverters or valves (e.g., three-way supply valve 1142" and three-way return valve 1144" that can be actuated by a controller based on one or more operational and/or environmental conditions). In some embodiments, system 1100" can be configured to direct at least a portion of the refrigerant in the refrigerant circuit 1131" to heat exchanger 1140" for example when a predetermined operational and/or environmental condition is present.

In an illustrative example, if the ambient temperature and/or solar irradiance is below a predetermined threshold (e.g., during a colder portion of the day, during an early morning portion of the day, during a late afternoon portion of the day, during a weather event like a cold front, less than 20° C., less than 25° C., before 9 AM, before 10 AM, after 3 PM, after 4 PM and/or the like), a system controller can actuate valves 1142" and 1144" at least a portion of the refrigerant of refrigerant circuit 1131" to heat exchanger 1140" from heat exchanger 1136" so as to transfer heat from refrigerant condensation into the regeneration fluid flowing in heat exchanger 1140". Once the temperature of the regeneration fluid increases above a threshold (e.g., above the condensation temperature of the refrigerant in heat exchanger 1140", a predetermined temperature of the regeneration fluid in advance of the sorption unit 1118", during a warmer portion of the day, during a midday portion of the day, during a warming weather event, greater than 20° C., greater than 25° C., after 9 AM, after LOAM, before 3 PM, before 4 PM and/or the like), the system controller can swap back to directing refrigerant to refrigerant condenser 1136" so as to shed heat to the ambient environment via cooling flow path 1146".

As another illustrative example, if the difference in temperature of the regeneration fluid at different flow segments in the regeneration flow path is below a predetermined threshold, the system controller can swap back to directing refrigerant to refrigerant condenser 1136" rather than to the heat exchanger 1140" so as to shed heat to the ambient environment via cooling flow path 1146".

For example, if the difference in temperature between the regeneration fluid in the regeneration flow path in advance of or entering solar layer 1110" and the temperature of the regeneration fluid at the heat exchanger 1140" is below a predetermined threshold (e.g., less than 3° C., less than 5° C., less than 10° C.), the system controller can swap back to directing refrigerant to refrigerant condenser 1136" rather than directing refrigerant to heat exchanger 1140" because if the difference is not large enough, the driving force for heat transfer will be too low. As another example, if the difference in temperature between regeneration fluid exiting solar layer 1110" and exiting heat exchanger 1164" is below a predetermined threshold (e.g., less than 3° C., less than 5° C., less than 10° C.), the system controller can swap back to directing refrigerant to refrigerant condenser 1136" rather than directing refrigerant to heat exchanger 1140".

Figure 21:
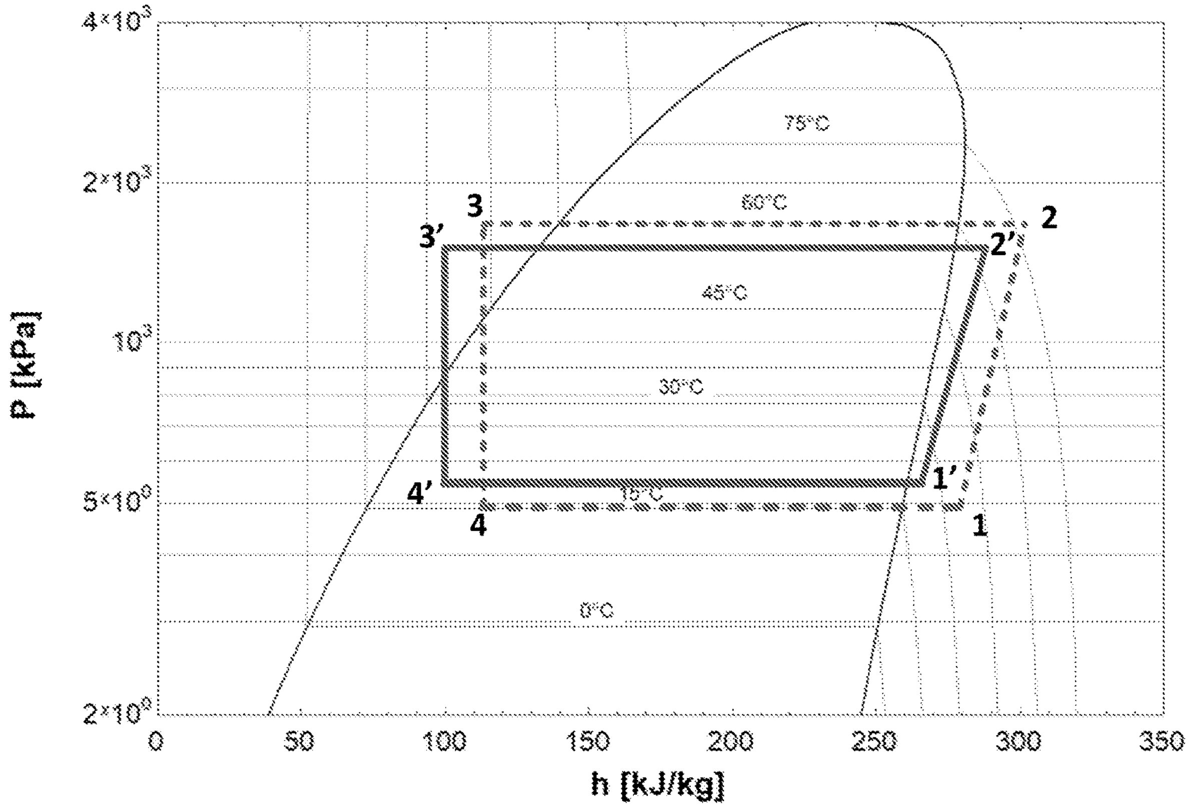
FIG. 21 illustrates operation of a refrigeration circuit of a water generation system, according to an embodiment.

As an illustrative comparison of water generation system configuration, FIG. 21 illustrates operation of refrigeration circuit 1131 of FIG. 20A (indicated by solid lines) and refrigeration circuit 1131' of FIG. 20B (indicated by dashed lines) with a corresponding enthalpy-pressure diagram. The configuration of the refrigeration circuit of the water generation system can be configured to provide high operational coefficient-of-performance (COP) and/or to drive water condensation from the regeneration gas, thereby maximizing water production.

In both configurations depicted in FIG. 20A and FIG. 20B, the refrigerant evaporator 1132 is configured to cool regeneration gas and condense water vapor therefrom to produce liquid water. In the configuration depicted in FIG. 20A, heat exchanger 1164 can function as a second refrigerant condenser rather than functioning to condense water vapor from the regeneration fluid. Accordingly, regeneration fluid flowing in the regeneration fluid path through heat exchanger 1164 may receive heat from the refrigerant flowing in the refrigeration circuit 1131. As such, the regeneration fluid flowing through heat exchanger 1164 may not be saturated and therefore, will not condense additional water vapor downstream of the refrigerant evaporator 1132. In that case, the regeneration fluid flowing through heat exchanger 1164 can be preheated before flow through solar layer 1110. However, other configurations are also possible wherein a refrigerant evaporator and at least one other heat exchanger each condense water vapor from the regeneration fluid and thereby function as a liquid water condenser. In the exemplary configuration depicted in FIG. 20B, refrigerant evaporator 1132' and heat exchanger 1164' are both configured to condense water vapor from the regeneration fluid upon flow therethrough, thereby functioning as a liquid water condenser to produce liquid water. It is also possible for liquid water to condense at heat exchanger 1162 and/or heat exchanger 1162' if desired.

In many embodiments, a heat exchange assembly (e.g., 1130) comprises a refrigerant evaporator (e.g., 1132) functioning as a liquid water condenser to cool regeneration fluid and condense water vapor from the regeneration fluid to produce liquid water. As such, the portion of the heat exchange assembly configured to condense water vapor from the regeneration fluid can also be referred to as a condenser assembly or a liquid water condenser.

In the refrigeration circuit 1131 of FIG. 20A (indicated by dashed lines in FIG. 21), refrigerant is compressed by refrigerant compressor 1134 from state 1 to state 2, refrigerant condenser 1136 transforms refrigerant from vapor to liquid state (and optionally rejects heat to a sorption unit) from state 2 to state 3, refrigerant expansion device 1138 transforms liquid refrigerant at high pressure to refrigerant at low pressure from state 3 to state 4, and refrigerant evaporator 1132 transforms refrigerant liquid to vapor refrigerant (i.e., by receiving heat from the regeneration fluid flow and thereby condensing water vapor in regeneration fluid) from state 4 to state 1.

Similarly, in the refrigeration circuit 1131' of FIG. 20B (indicated by solid lines in FIG. 21), refrigerant is compressed by refrigerant compressor 1134' from state 1' to state 2', refrigerant condenser 1136' transforms refrigerant from vapor to liquid state (and optionally rejects heat to a sorption unit) from state 2' to state 3', refrigerant expansion device 1138' transforms liquid refrigerant at high pressure to refrigerant at low pressure from state 3' to state 4', and refrigerant evaporator 1132' transforms refrigerant liquid to vapor refrigerant (i.e., by receiving heat from the regeneration fluid flow and thereby condensing water vapor in regeneration fluid) from state 4' to state 1'.

While the amount of cooling (i.e., heat removed from the regeneration fluid to produce liquid water) is the same, operation with the refrigeration circuit 1131 has the advantage of providing a lower refrigerant evaporator temperature (temperature at state 4→state 1) compared to operation with refrigeration circuit 1131', thereby providing a greater driving force for condensation of water vapor from the regeneration fluid at the refrigerant evaporator. However, operation with the refrigeration circuit 1131 has the disadvantage of having more superheating of refrigerant that is unusable (i.e., state 1 outside of vapor dome). Operation of a water generation system with the refrigeration circuit 1131' (indicated by solid lines) has advantages of lower discharge temperature at state 2 and greater subcooling with more of the cooling portion of the cycle inside the vapor dome of the enthalpy-pressure diagram. It may be preferable to configure the refrigeration cycle according to FIG. 20B for more arid areas, whereas the configuration of FIG. 20A may be suitable for a wider range of environments. However, various considerations may In FIG. 20A, fan 1106 is positioned downstream of sorption unit 1118 to direct regeneration fluid (e.g., recirculating air) through the closed-loop regeneration flow path (i.e., through sorption unit 1118, heat exchanger 1162, refrigerant evaporator 1132, heat exchanger 1164, solar layer 1110, and return to sorption unit 1118) during an unloading or desorption cycle. Furthermore, fan 1106 can direct process gas (e.g., ambient air) through sorption unit 1118 during a loading or sorption cycle by directing process gas (e.g., ambient air) into sorption unit 1118 via process inlet 1122 and exhaust process gas from system via process outlet 1124.

In an embodiment, one or more valves (e.g., 1105) at process inlet 1122 and/or process outlet 1124 can be placed in an open position, for example via actuation by controller

1170, to allow ambient air to flow through system during a loading or sorption mode. In various embodiments, fan 1106 can provide dual functions to flow both process gas during a loading mode and regeneration gas during an unloading mode, thereby minimizing the number of components. However other configurations are also possible. In another example, a fan can be positioned downstream of refrigerant evaporator 1132 and/or heat exchanger 1164 which can allow for passive valve actuation for transitioning between sorption and desorption modes. In FIG. 20A, fan 1106 is located between sorption layer 1118 and heat exchanger 1162, however in other implementations fan 1106 can be located downstream of heat exchanger 1162 such as depicted in FIG. 23 which can be advantageous when sorption layer 1118 is drier with low water content, and the fan can be protected from higher ambient temperatures.

Heat exchangers 1162, 1162' and 1164' are depicted as cross-flow heat exchangers in the block diagrams of FIG. 20A and FIG. 20B for ease of description, it should be appreciated that heat exchangers can be configured for counter-flow or at least partially counter flow heat exchange. In one example, a "hot-side" regeneration fluid flow layer of a heat exchanger can be at a high temperature (e.g., greater than 40° C., greater than 60° C., greater than 70° C., between 40-80° C.) and direct a first or "hot-side" regeneration fluid flow in a direction at least partially counter to a flow direction of a second or "cold-side" regeneration fluid flow at a lower temperature (e.g., less than 70° C., less than 60° C., less than 40° C., between 20-60° C.) in an adjacent cooling flow layer to establish a counter-flow or at least partial counter-flow heat exchange relation therebetween.

Figure 24:
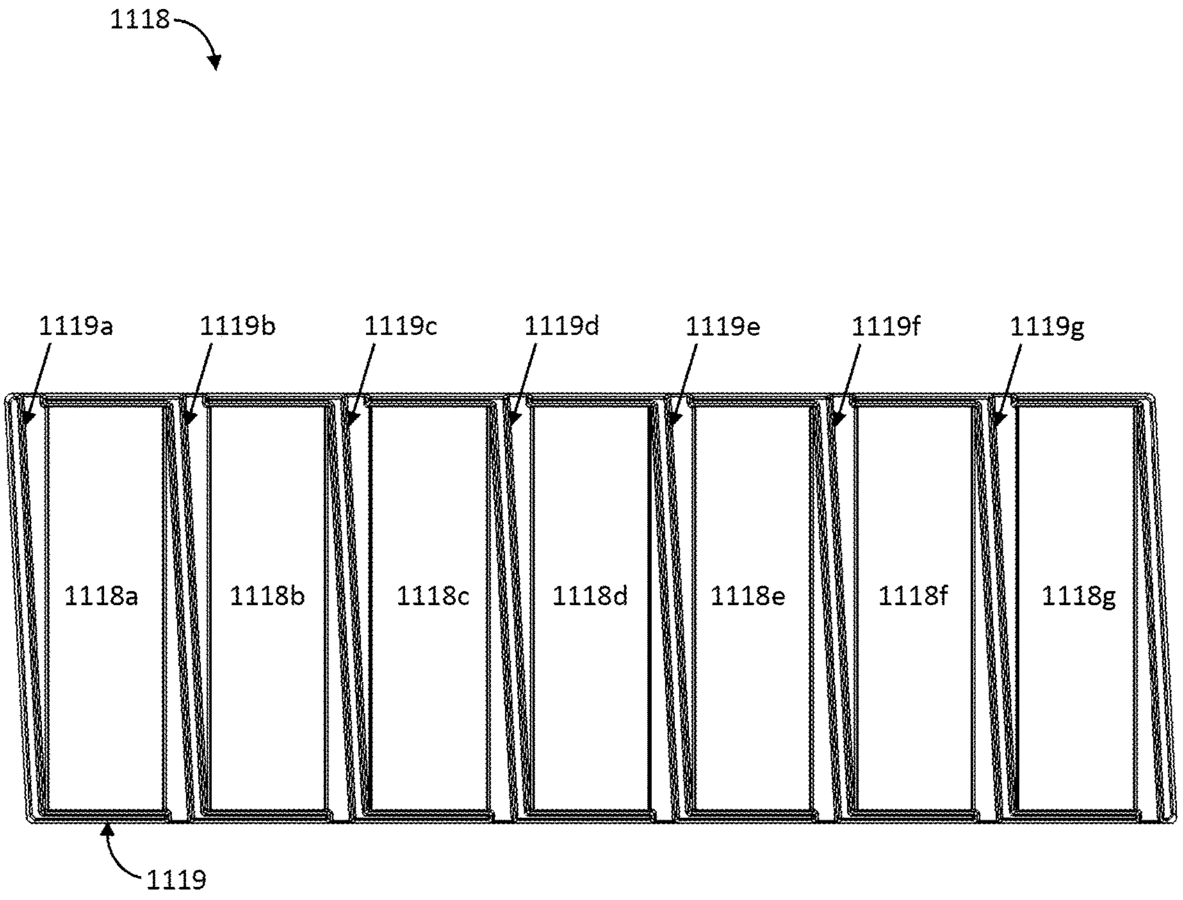
FIG. 24 illustrates a top-down cross-sectional view of sorption unit, according to an embodiment.

FIG. 24 illustrates a top-down cross-sectional view of sorption unit 1118. The process gas (in process flow path depicted in FIG. 22) or regeneration gas (in regeneration flow path depicted in FIG. 23) flows through distinct porous absorbers 1118*a-g* via intervening channels having a tapered configuration. Each channel includes a partition or divider 1119*a-g* configured to direct flow between an inlet channel portion (i.e., in advance of gas flow through each absorber 1118*a-g*) and an outlet channel portion before regeneration flow through each porous absorber body 118*a-g* such that gas flow is distributed efficiently through full sorption layer with minimal pressure drop. In this way, the energy or power requirement of blowers or fan (e.g., fan 1106) can be minimized.

The sorption layer or unit 1118 comprises a plurality of porous sorption bodies or absorbers 1118*a-g* comprising hygroscopic material. As such, porous sorption bodies or absorbers can also be referred to as porous hygroscopic bodies or absorbers. The porous sorption bodies 1118*a-g* are configured in a generally rectangular shape, however other shapes are also possible to maximize interaction with hygroscopic media of the sorption layer or body with minimal pressure drop. Sorption bodies 1118*a-g* are separated by tapering flow channels formed from separators 1119*a-g* positioned at an angle relative to an edge of a nearby sorption body 1118*a-g*. Separators 1119*a-g* and porous sorption bodies 1118*a-g* define process flow path (indicated by dashed lines in FIG. 22) during a sorption cycle and regeneration flow path (indicated by dashed lines in FIG. 23) during a desorption or release cycle.

In various embodiments, the flow architecture of the system can be configured such that there is an even velocity distribution entering and exiting the sorption unit, or more particularly the flow through porous absorbers (e.g., 1118*a-g*). Tapering of flow-through portions of the sorption layer and/or internal flow channels can maintain a consistent pressure drop and/or flow distribution (e.g., a consistent dP/L ratio wherein dP is the pressure drop and L is in the direction of the taper) through the flow channel. A consistent pressure drops serves to maintain a consistent fluid velocity and distribution from the tapered channel to the porous sorption media. In this way, the reduced pressure drop through the system can improve interaction of the gas with the full sorption layer and/or reduce the amount of power required to pump the regeneration fluid through the system at a desired flow rate. As a non-limiting example, a tapering angle from an edge of an absorber (e.g., 1118) to an adjacent divider (e.g., 1119) can from range 1 to 45 degrees, less than 20 degrees, less than 10 degrees or less than 5 degrees to maintain an even distribution of flow through the channel.

Figure 25:
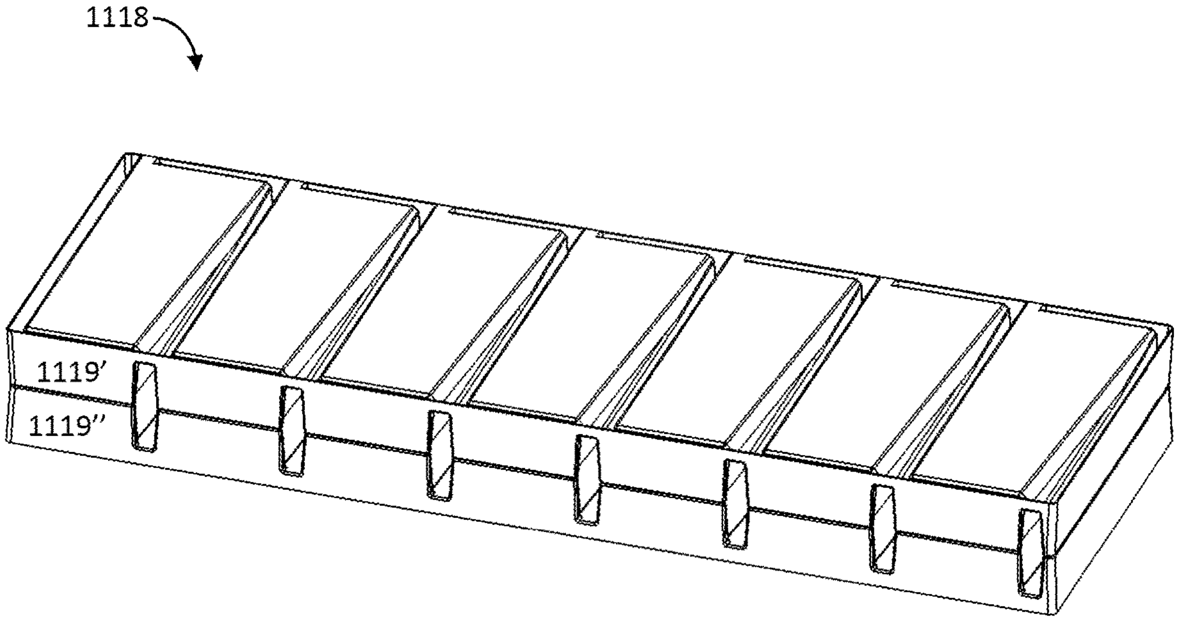
FIG. 25 illustrates a side perspective view of a sorption unit, according to an embodiment.
Figure 26:
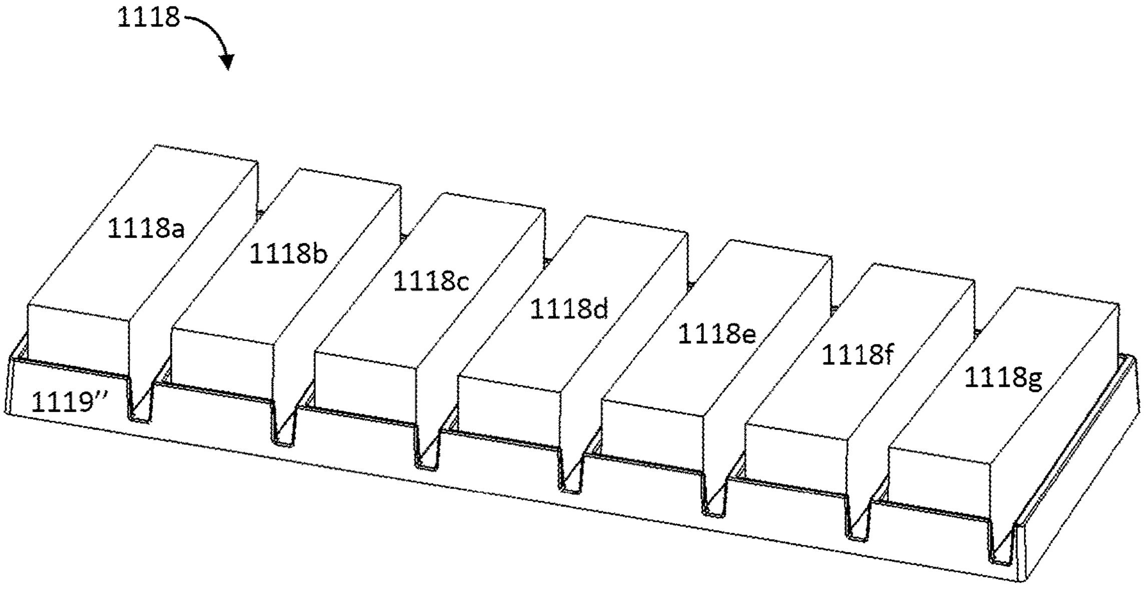
FIG. 26 illustrates a side perspective view of a sorption unit, according to an embodiment.

Sorption units can comprise a sorption unit housing configured to support or hold absorber bodies and/or direct flow of the process gas and regeneration gas through each of the porous sorption bodies. FIG. 25 illustrates a side perspective view of a sorption unit 1118 including sorption unit housing 1119 configured as a clamshell-like assembly (e.g., formed via a thermoplastic molding process) including an upper sorption unit housing 1119' and a lower sorption unit housing 1119" that can be joined to direct flow through individual sorption bodies 1118*a-g*. FIG. 26 illustrates a side perspective view of a sorption unit 1118 including absorbers 1118*a-g* seated in lower sorption unit housing 1119". Sorption unit housing 1119 can comprise heat exchange surfaces 1119*a-g* configured to allow heat transfer between an inlet channel portion (i.e., in advance of gas flow through each absorber 1118*a-g*) and an outlet channel portion such that gas is distributed efficiently through full sorption layer with minimal pressure drop via tapered intervening channels.

As shown in FIG. 26, porous sorption bodies 1118*a-g* are configured in a generally rectangular shape, however other shapes are also possible to maximize interaction with hygroscopic media of the sorption layer or body with minimal pressure drop. Sorption bodies 1118*a-g* are separated by tapering flow channels formed from separator surfaces 1119*a-g* of sorption housing 1119 to form a taper angle relative to an edge of a nearby sorption body 1118*a-g*. Separators 1119*a-g* and porous sorption bodies 1118*a-g* define process flow path (indicated by dashed lines in FIG. 22) through sorption unit 1118 during a sorption cycle and regeneration flow path (indicated by dashed lines in FIG. 23) through sorption unit 1118 during a desorption or release cycle. In some embodiments, additional insulation or filling material(s) can be provided (e.g., sprayed or poured to fill any gaps between sorption unit housing 1119 and absorbers 1118*a-g*) so as to reduce air leaks and/or heat loss.

Figure 27:
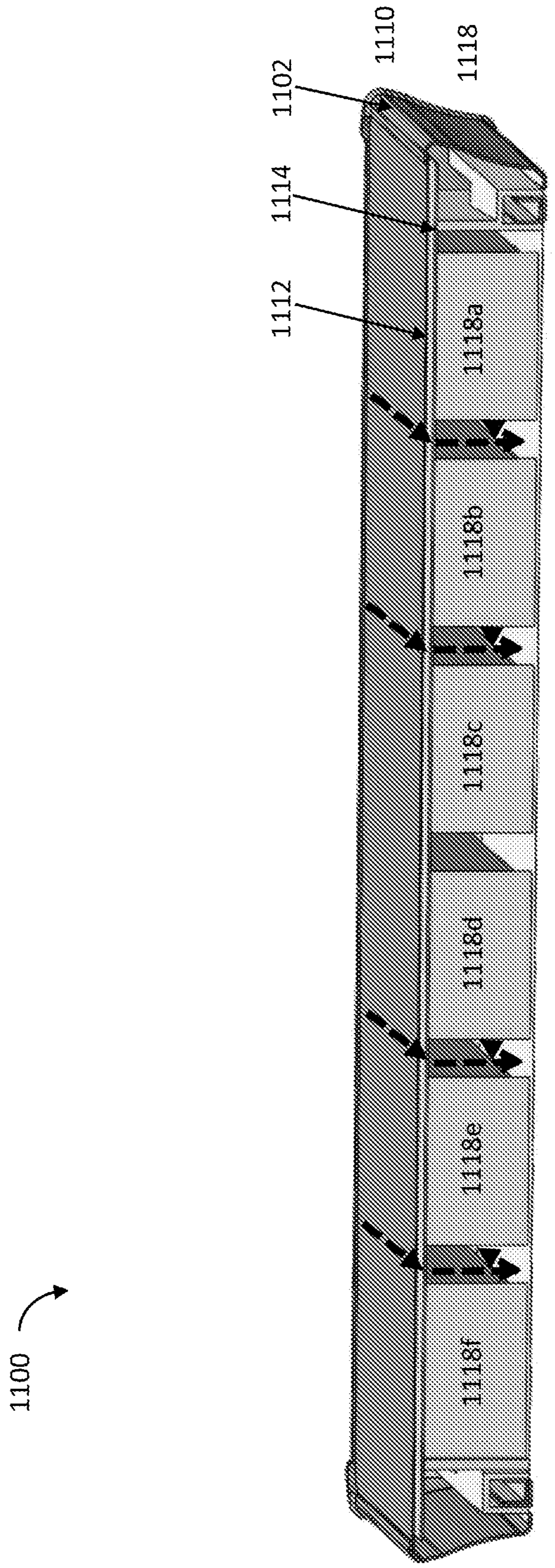
FIG. 27 illustrates a side cross-sectional view of a water generation system, according to an embodiment.
Figure 28:
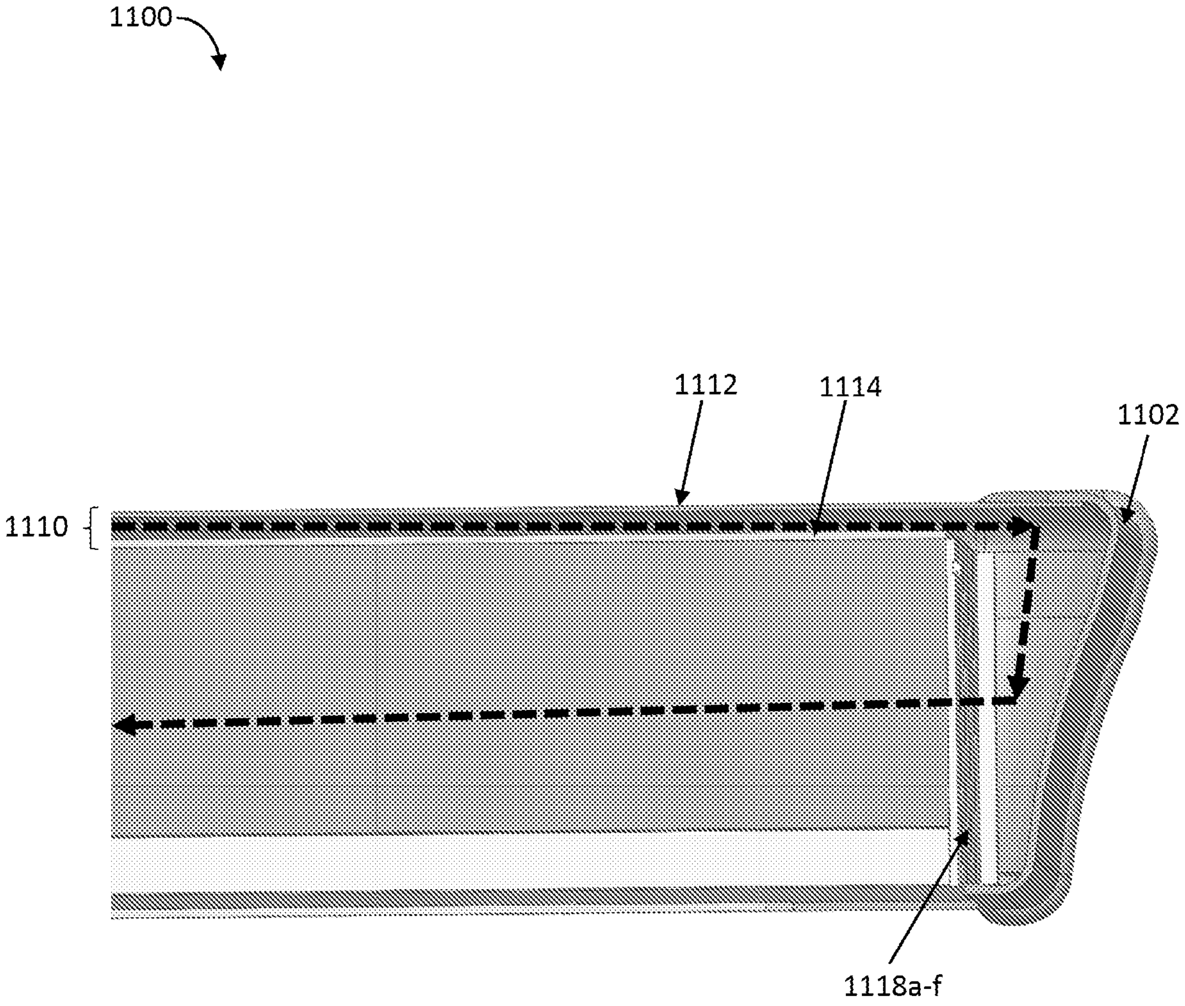
FIG. 28 illustrates a side cross-sectional view of a side portion of water generation system, according to an embodiment.
Figure 29A:
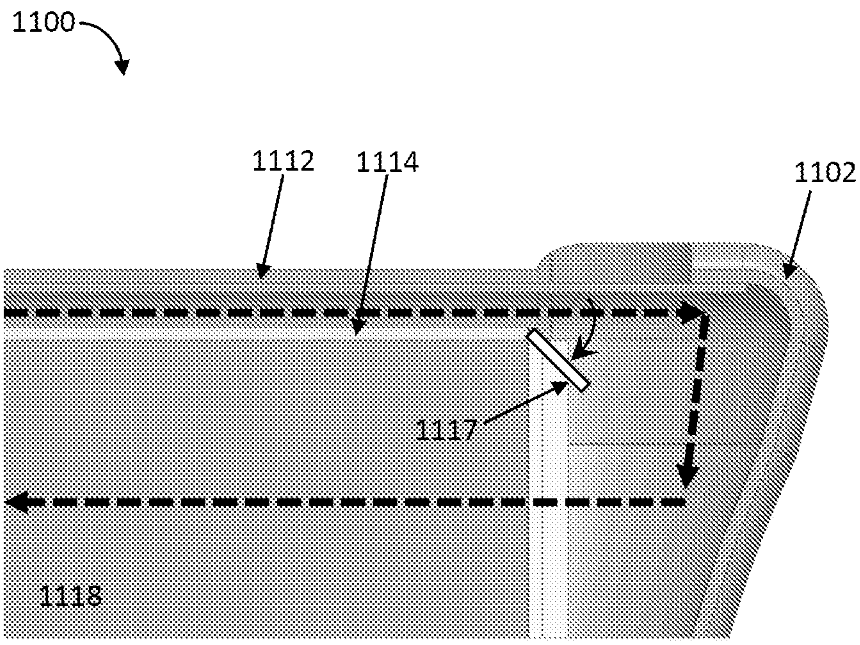
FIG. 29A depicts a baffle in a first position during a desorption, unloading or release cycle to direct regeneration fluid through a water generation system, according to an embodiment.
Figure 29B:
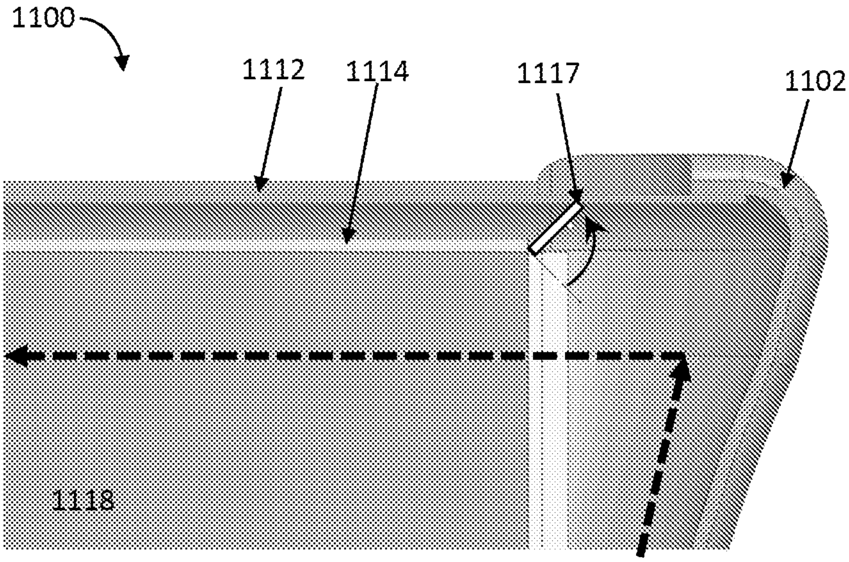
FIG. 29B depicts a baffle in a first position during a sorption, loading or uptake cycle to direct a process fluid through a water generation system, according to an embodiment.

FIG. 27 illustrates a side cross-sectional view of water generation system 1100 including solar layer 1110 including a top cover or glazing layer 1112 exposed to the ambient environment and PV panel 1114. During a desorption cycle, regeneration fluid flow (indicated by dashed lines) is directed between glazing layer 1112 and PV panel 1114 before being directed into intervening flow channels of sorption unit 1118. FIG. 28 illustrates a cross-sectional view of a side portion of water generation system 1100 including solar layer 1110 with regeneration fluid flow (indicated by dashed lines) during a desorption or unloading cycle. Top cover layer 1112 is coupled to housing 1102 above photovoltaic (PV) layer 1114. As shown in FIG. 27 and FIG. 28, regeneration flow path (indicated by dashed black arrows) directs a regeneration fluid between glazing layer 1112 and PV panel 1114) to collect heat, and then directed downward through sorption layer 1118 via edge of housing 1102 to collect additional heat and water vapor form sorption layer 1118.

The top cover layer 1112 comprises an outer surface exposed to ambient air and an inner surface opposite from the outer surface. The top cover layer 1112 can include or be composed of a transparent material (e.g., glass) allowing solar radiation to pass into the interior of the water generation system 1100. In FIG. 27 and FIG. 28, the photovoltaic panel or layer 1114 is located below and spaced apart from top cover layer 1112 without any intervening layer, however other configurations are also possible. In some embodiments, water generation system 1100 can further comprise at least one interstitial layer below top cover layer 1112 for improving solar radiation collection and heating of regeneration fluid.

In FIG. 27 and FIG. 28, housing 1102 defines the regeneration fluid flow path with minimal complexity, however water generation systems of the present disclosure can include any desirable or suitable number of valves, baffles, flow diverters or flow-directing elements to define the process and regeneration fluid flow paths in the system for both sorption/loading and desorption/release operations. In one illustrative example, a pivoting baffle 1117 can move between a first position depicted in FIG. 29A during an unloading or release cycle to direct regeneration fluid through system, for example under force from regeneration fluid flow. During a loading or sorption cycle depicted in FIG. 29B, baffle 1117 can return to a second position to define the process flow path through (indicated by dashed arrows) the system. In this way, pivoting baffle can provide a passive mechanism to reduce backflow or recirculation of process gas through undesirable portions of system when transitioning between loading and unloading operations.

In some embodiments, water generation system can be operated in a hybrid or partial closed loop mode such that a passive or active flow diverter (e.g., actuated by controller 1170) directs or recirculates a first portion of the regeneration fluid within the system and exhausts a second portion of the regeneration fluid to the ambient environment. In this way, at least a portion of heat and/or moisture in the regeneration fluid can be recycled or recirculated back to the condenser and/or sorption layer by regeneration fluid output from condenser with incoming new moisture flux from the ambient environment.

Figure 30A:
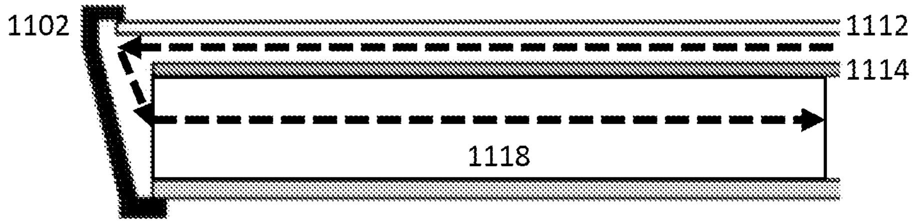
FIG. 30A depicts a cross-sectional side view of a water generation system, according to an embodiment.

As shown in FIG. 27 and FIG. 28, the regeneration flow path (indicated by dashed arrows) directs regeneration gas through upper portion of water generation system 1100, in particular between top cover layer 1112 and PV panel 1114, to collect heat and then through the sorption layer 1118 to collect additional heat and/or water vapor. This can result in heat being substantially extracted or directed away from upper layers, thereby keeping such layers relatively cool. In at least some examples, water generation systems of the present disclosure may be configured such that the temperature gradient increases along the depth of the water generation system, in the direction that a regeneration fluid or gas flows along a regeneration flow path within the water generation system. In FIG. 27, FIG. 28 and FIG. 30A, sorption layer 1118 integrated with or coupled to a rear surface of photovoltaic layer 1114 such that the regeneration gas flows in regeneration flow path (indicated by dashed arrows) between top glazing layer 1112 and a top surface of photovoltaic layer 1114, and then through sorption layer 1118 at rear surface of photovoltaic layer 1114. In some implementations, photovoltaic layer 1114 and sorption layer 1118 can be thermally bonded or coupled (e.g., via casting, polymerizing or foaming material of sorption layer directly onto rear surface of photovoltaic cell(s)) such that as flow through sorption layer 1118 proceeds, heat is transferred from photovoltaic layer 1114 to sorption layer 1118 via both conduction and convection. However other configurations to improve system efficiency and/or form factor are also possible. For example, FIG. 30B and FIG. 30C depict cross-sectional views of alternative configurations of a solar layer or unit and a sorption layer or unit.

Figure 30B:
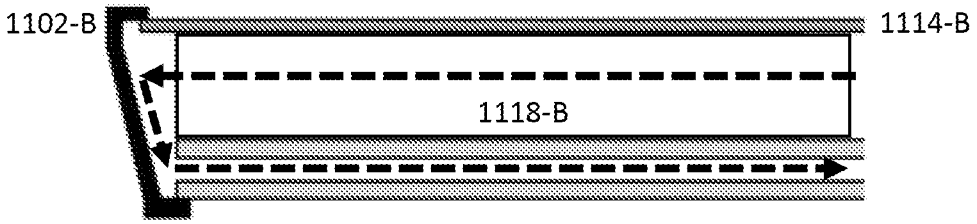
FIG. 30B depicts a cross-sectional side view of a water generation system, according to an embodiment.

In FIG. 30B, photovoltaic panel or layer 1114-B is configured as the outer layer of the water generation system and is thereby configured as the solar layer of the water generation system. Sorption layer 1118-B is integrated with or coupled to a rear surface of photovoltaic layer 1114-B such that the regeneration gas flows in regeneration flow path (indicated by dashed arrows) through sorption layer 1118-B at rear surface of photovoltaic layer 1114-B and heat is transferred directly from photovoltaic layer 1114-B to sorption layer 1118-B via conductive heat transfer.

Figure 30C:
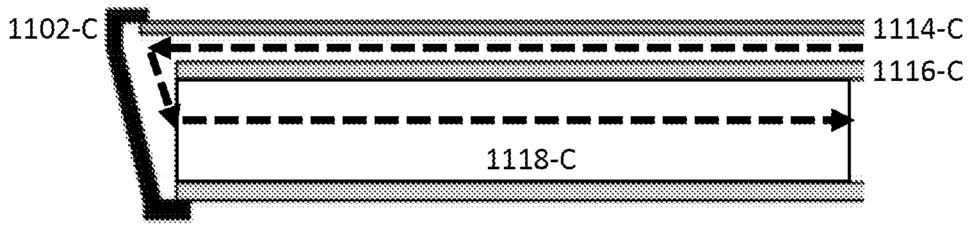
FIG. 30C depicts a cross-sectional side view of a water generation system, according to an embodiment.

FIG. 30C, sorption layer 1118-C is positioned below and spaced apart from photovoltaic layer 1114-C such that the regeneration gas flows along a rear surface of the photovoltaic layer 1114-C in advance of flowing through the sorption layer 1118-C. Sorption layer 1118-C can be configured as a modular sorption layer, for example positioned and/or coupled to one or more interstitial layer(s) 1116-C. As such, a modular sorption layer (e.g., 1118-C) that can be reversibly placed in the water generation system can facilitate transport, installation, service and/or replacement of the sorption layer(s).

Figure 31:
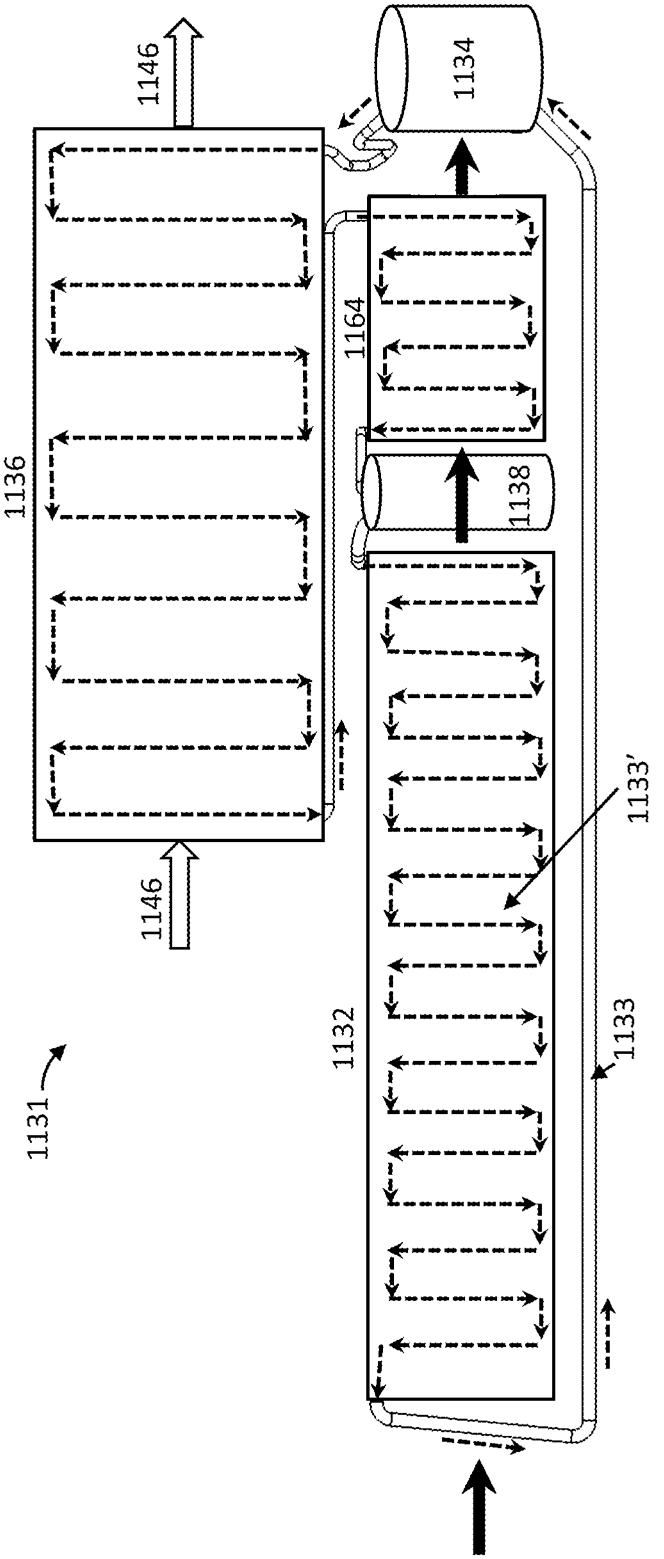
FIG. 31 illustrates a top-down view of a refrigeration circuit, according to an embodiment.

Turning now to implementations of the heat exchange assembly, FIG. 31 illustrates a top-down view of the refrigeration circuit 1131 for circulating a refrigerant in a closed refrigerant loop (as indicated by dashed arrows) including refrigerant evaporator 1132, refrigerant compressor 1134, refrigerant condenser 1136, and refrigerant expansion device 1138 via refrigerant conduits or piping 1133. Additionally, refrigerant is configured to flow through heat exchanger 1164 in accordance with the configuration depicted in FIG. 20A, however other configurations are also possible such as the configuration in FIG. 20B.

The refrigeration circuit can be manufactured as vapor compression cycle (VCC) subassembly formed during the same manufacturing and/or assembly operation from stamped sheet metal, stainless steel, plastic, and/or other materials optionally coated with water safe coatings. Heat exchange conduits, surfaces or plates can be bonded via brazing, gasketing, adhesive, and/or welding. One or more benefits and advantages can be provided in manufacturing a VCC subassembly (e.g., refrigeration circuit 1131 and associated components) for inclusion with a water generation system by providing a low manufacturing cost and/or easy replacement in the field.

Figure 32:
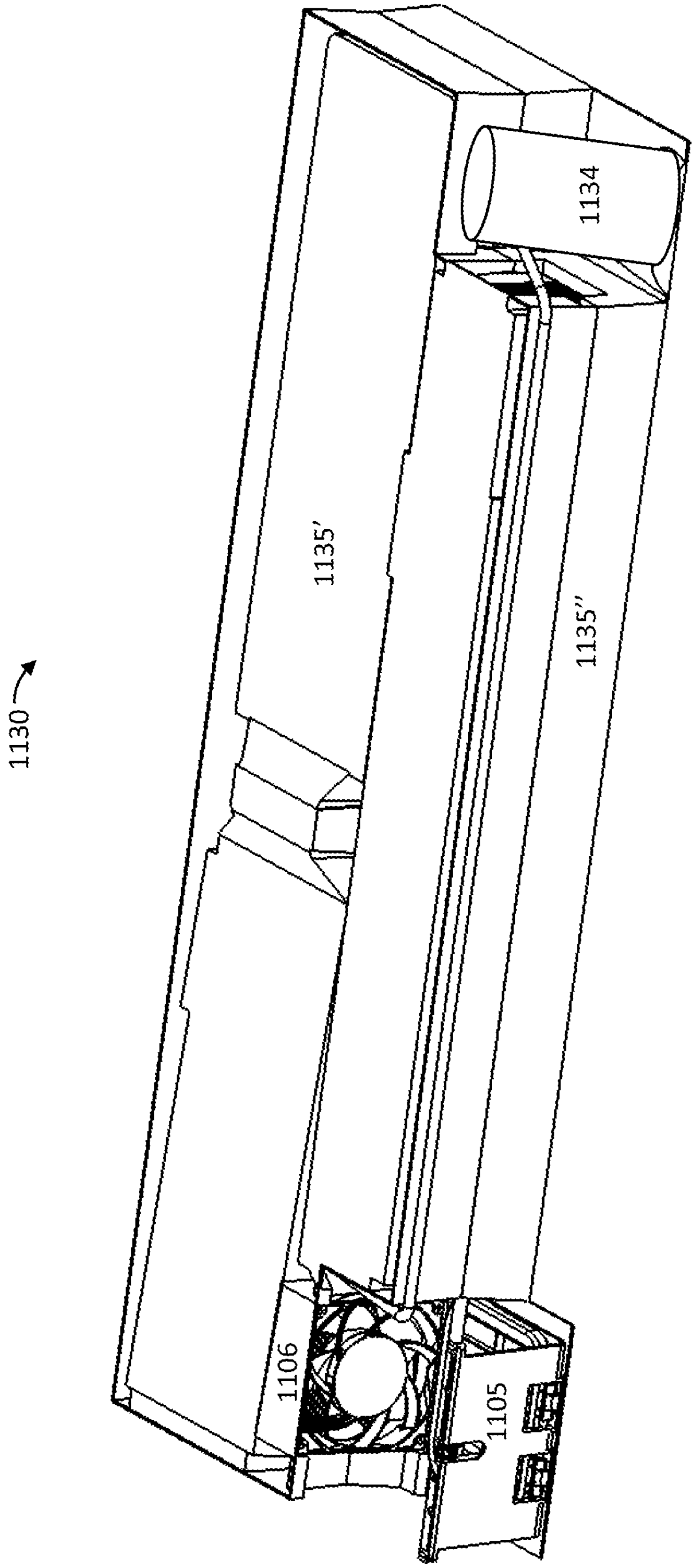
FIG. 32 illustrates a perspective view of a heat exchange assembly, according to an embodiment.

FIG. 32 depicts a portion of heat exchange assembly 1130 including a vapor compression subassembly, or more particularly refrigeration circuit 1131, provided within a heat exchange assembly housing 1135 configured to insulate interior components, direct regeneration gas flow therethrough, direct cooling fluid therethrough and/or collect liquid water condensed from the regeneration fluid, for example before transfer to onboard reservoir 1180. The heat exchange assembly housing 1135 can be configured as a clamshell-like assembly (e.g., formed via a thermoplastic molding process) including an upper housing 1135' and a lower housing 1135" that can be joined to direct flow through refrigeration circuit 1131 and/or collect condensed water. Lower housing 1135" can be at least partially configured as a collection tray for collecting condensed water. In some embodiments, portions of the heat exchange assembly housing (e.g., lower housing tray 1135") and/or heat exchange components (e.g., heat exchanger 1162) can be sloped or angled to allow collection of condensed water in lower portions via gravity. In some embodiments, heat exchange assembly housing 1135 can comprise features to facilitate coupling to, integration with or enclosure of fan(s) (e.g., 1106, 1160), valve(s) (e.g., 1105*b*) and/or an onboard reservoir (e.g., 1180). Furthermore, additional insulation or filling material(s) can be provided (e.g., sprayed or poured to fill any gaps between heat exchange assembly housing 1135 and interior heat exchange components) so as to reduce air leaks and/or heat loss.

In the refrigeration circuit, refrigerant flows through expansion device 1138 configured as a passive capillary tube (e.g., wound metal tube), however other components are also possible (e.g., a thermal expansion valve, constant pressure valve). A passive capillary tube may be preferable to provide an inexpensive and simple fixed device with sufficient efficiency over operating temperature and heat load ranges of the water generation system. In various implementations, other components can be optionally included in refrigeration circuit, for example one or more filter or drying devices, such as an inline filter drier, to remove contaminants and/or moisture from circulating refrigerant. In some implementations, expansion device can comprise a thermal expansion valve with an optional sensing bulb mounted on the refrigerant line that can throttle the thermal expansion valve open or closed based on a temperature of the refrigerant downstream of the refrigerant evaporator.

Water generation systems of the present technology can comprise a heat exchange assembly (e.g., 1130) configured in a substantially counter-flow arrangement wherein flow of refrigerant (depicted as dashed arrows in FIG. 31) is generally in a direction counter or opposite to regeneration fluid flow (depicted as thick solid arrows in FIG. 31) through a heat exchanger (e.g., 1164) and/or a refrigerant evaporator (e.g., 1132). Additionally, flow of refrigerant can be generally in a direction counter or opposite to a cooling fluid flow (e.g., 1146) through a heat exchanger and/or refrigerant condenser (e.g., 1136).

In various embodiments, heat exchange assembly 1130 comprises heat exchanger(s), refrigerant evaporator(s) and/or refrigerant condenser(s) comprising metallic (e.g., Al, Cu, Fe, alloys thereof) finned cooling conduits arranged into one or more cooling circuits. In the example of FIG. 31, refrigeration circuit 1131 comprises a tube-and-fin configuration wherein refrigerant flows through circuitous or serpentine coils 1133' spaced through a plurality of heat dissipating fins (e.g., metal like aluminum or aluminum alloy fins) across which regeneration fluid or cooling fluid flows through or across refrigerant condenser 1136, refrigerant evaporator 1132 and heat exchanger 1164.

Figure 33A:
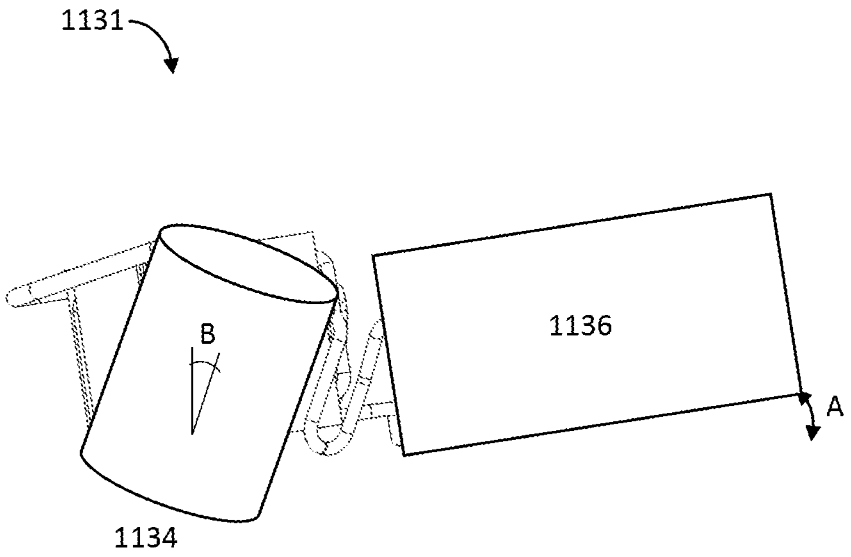
FIG. 33A depicts a refrigeration circuit of a water generation panel installed at a tilt angle of 10 degrees, according to an embodiment.
Figure 33B:
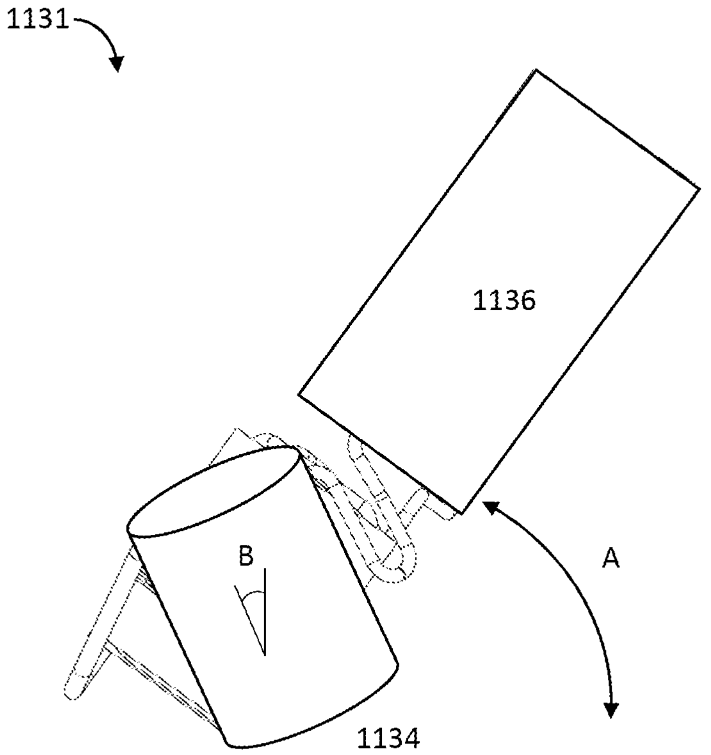
FIG. 33B depicts a refrigeration circuit of a water generation panel installed at a tilt angle of 45 degrees, according to an embodiment.

In an embodiment, refrigerant compressor can be tilted or positioned at an angle to ensure when the water generation panel is installed in a fixed tilt position, the compressor is positioned at least partially vertical regardless of the panel installation angle A. For example, FIG. 33A depicts a refrigeration circuit 1131 in water generation panel 1100 installed at a tilt angle A of 10 degrees, positioning the refrigerant compressor at an angle B of approximately 17 degrees from vertical. As another example, FIG. 33B depicts a refrigeration circuit 1131 in a water generation panel installed at a tilt angle A of 45 degrees positioning the refrigerant compressor at an angle B of approximately 17 degrees from vertical. As such, the set position of the refrigerant compressor 1134 ensures its installed tilt is less than 20 degrees, or less than 18 degrees from a vertical plane regardless of the water generation tilt panel A.

In various embodiments, heat exchangers of the present technology can comprise a plurality of longitudinally extending heat exchange surfaces, elements or plates arranged in a spaced relation (e.g., stacked, horizontally spaced, vertically spaced and/or the like) to at least partially define a plurality of flow channels or layers (e.g., parallel flow layers, alternating hot-side/cold-side flow layers and/or the like). For example, longitudinally extending heat exchange plates can at least partially define "hot-side" regeneration flow layers alternating between cooling flow layers. Heat exchange layers or passes can be stacked both above and below one another in an alternating manner to form multiple parallel flow paths for each fluid flow, with heat exchange surfaces (e.g., heat exchange plates) located between hot and cold flow segments or streams. In some embodiments, the heat exchange plates and/or surfaces can be composed of or comprise a polymeric material (e.g., thin plastic plates). Furthermore, some heat exchange assemblies can be entirely made of plastic or polymeric materials. In other embodiments, the heat exchange surfaces can be composed of or comprise metallic material (e.g., thin aluminum plate). In yet other embodiments, the heat exchange surfaces can be composed of or comprise a combination of polymeric material(s) and metallic material(s). The surface area of the plates and/or heat exchange surfaces can be maximized in order to maximize the heat transfer capability. The orientation of the fluid flows through recuperative heat exchangers can be single or multiple pass counter-flow, partially counter flow, or cross-flow for applications requiring maximum heat exchange effectiveness for a desired system dimension.

Figure 34A:
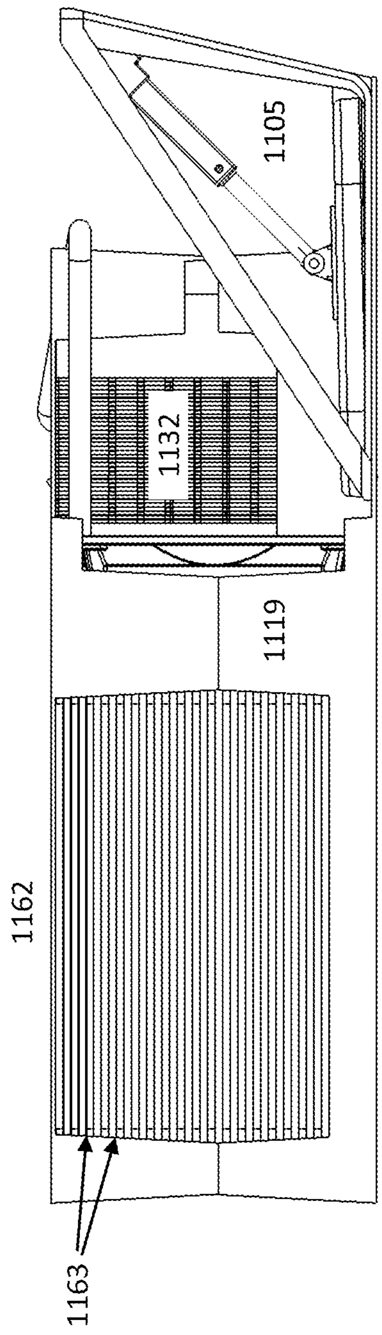
FIG. 34A depicts a side view of a portion of a water generation system, according to an embodiment.
Figure 34B:
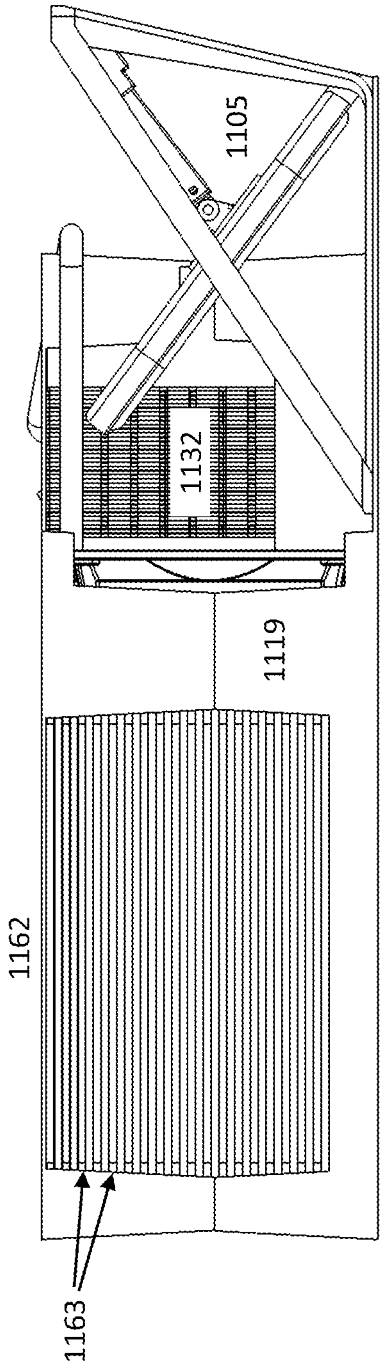
FIG. 34B depicts a side view of a portion of a water generation system, according to an embodiment.

FIG. 34A depicts an interior side view of a portion of water generation system 1100 including heat exchanger 1162 and valve 1105*b* in a closed state. FIG. 34B depicts an interior side view of a portion of water generation system 1100 including heat exchanger 1162 and valve 1105*b* in an open state. In the example depicted in FIG. 34A, heat exchanger 1162 is configured as a recuperative heat exchanger comprising a plurality of longitudinally extending heat exchange surfaces, elements or plates 1163 arranged in a spaced relation (e.g., stacked, vertically spaced and/or the like) to at least partially define a plurality of flow channels or layers (e.g., parallel flow layers, alternating hot-side/cold-side flow layers and/or the like). Longitudinally extending heat exchange plates 1163 can at least partially define "hot-side" regeneration flow layers alternating between "cold-side" cooling flow layers. A "hot-side" regeneration fluid flow layer on a first side of one of the plate 1163 can direct "hot-side" regeneration fluid flow (e.g., output from sorption unit 1118 during a regeneration cycle) at a high temperature (e.g., greater than 40° C., greater than 60° C., greater than 70° C., between 40-80° C.) in a direction at least partially counter to a flow direction of a "cold-side" fluid flow on a second side of the plate 1163 in an adjacent cooling flow layer at a lower temperature (e.g., less than 70° C., less than 60° C., less than 40° C., between 20-60° C.). In this way, heat from regeneration fluid is transferred from regeneration fluid to a cooling fluid in a counter-flow, or at least partially counter-flow, heat exchange manner. In one embodiment, such as depicted in FIG. 20A and FIG. 23, heat from regeneration fluid is transferred from regeneration fluid output from sorption unit 1118 to ambient air flowing in cooling flow path 1146 via heat exchanger 1162. In other embodiment, heat from regeneration fluid can be transferred from regeneration fluid output from sorption unit to a cooler downstream portion of regeneration fluid in a closed-loop regeneration flow path. In yet other embodiments, heat from regeneration fluid can be transferred from regeneration fluid output from sorption unit to both a cooler downstream portion of regeneration fluid in a closed-loop regeneration flow path and ambient air flowing in cooling flow path, for example in a recuperative "tri-flow" heat exchange configuration.

In a recuperative heat exchanger, heat exchange layers or passes can be stacked both above and below one another in an alternating manner to form multiple parallel flow paths for each fluid flow, with heat exchange surfaces (e.g., heat exchange plates 1163 separated by interlayer spacers) located between hot and cold flow segments or streams. In some embodiments, the heat exchange plates and/or surfaces can be composed of or comprise a polymeric material (e.g., thin plastic plates). Furthermore, some heat exchange assemblies can be entirely made of plastic or polymeric materials. In other embodiments, the heat exchange surfaces can be composed of or comprise metallic material (e.g., thin aluminum plate). In yet other embodiments, the heat exchange surfaces can be composed of or comprise a combination of polymeric material(s) and metallic material (s). The surface area of the plates and/or heat exchange surfaces (e.g., 1163) can be maximized in order to maximize the heat transfer capability. The orientation of the fluid flows through the heat exchanger can be single or multiple pass counter-flow, partially counter flow, cross-flow or partially cross-flow for applications requiring maximum heat exchange effectiveness for a desired system dimension and cost.

Any suitable or desirable number or type of valves, fans, blowers, inlets, outlets, separately or in combination, can be used to direct, manage or control flow of process gas and/or regeneration gas through system 1100. In some embodiments, various flow management elements can passively or actively seal one or more interior chambers closed. Furthermore, system 1100 can include one or more valves or mechanisms for flow bypass and/or alternative fluid passageway configurations, as well as to provide a system-wide or total ingress protection mode wherein the system 1100 is partially or fully sealed from the outside environment, for example fully sealing a closed loop regeneration flow path, in response to a severe weather event forecast or when in a standby mode. The system can include valves operating under any number of mechanisms including but not limited to inflatable valves, iris valves, butterfly valves, poppet valves, actuated valves, passive valves, active flow directing valves, restricting valves and/or the like.

FIG. 34A depicts an exemplary valve 1105 that can close or seal process inlet 1122 and process outlet 1124 during a regeneration or desorption cycle. FIG. 34B depicts valve 1105 in an open state for opening process gas (e.g., ambient air) inlet 1122 and process gas outlet 1124 during a sorption cycle. Valve 1105 transitions between open and closed states via a linear actuator coupled to a valve body comprising trusses configured to prevent valve door or closure from flexing open when sealing. In some embodiments, an O-ring and/or a slotted pivot comprising a protrusion configured to fit into an elongated opening in the valve closure can allow valve closure to efficiently seal without leaks and/or in a substantially planar manner relative to the valve body regardless of manufacturing inconsistencies, alignment errors and/or the like.

Valves (e.g., 1105*a-b*) and/or fan(s) (e.g., 1106) can be configured to control an amount of ambient air into one or more portions of the process or regeneration gas flow path. A controller in communication with the valve(s) and/or fans(s) can be configured to adjust the flow of gas into and through the system in response to: a pressure of gas in the regeneration flow path, a temperature of regeneration gas within the regeneration flow path, an ambient temperature, a time of day, a weather forecast, a solar flux, a humidity of the regeneration gas, a humidity of the process gas during the previous sorption cycle, a water content of sorption unit(s), a system water content, a water production rate, a water production volume, or a combination thereof.

System controller (s) (e.g., 1170) can be programmed or configured to improve, maximize or optimize liquid water production based on measurements of one or more inputs (e.g., such that the controller(s) may improve liquid water production based on current or expected environmental and/or system conditions) including but not limited to external or environmental conditions like ambient air temperature, ambient air pressure, ambient air relative humidity, solar insolation, solar irradiance, solar flux, a weather event, a weather forecast, time of day, and so on. Furthermore, a controller (e.g., 1170) can be programmed or configured to improve liquid water production based on inputs relating to system operational parameters like regeneration fluid temperature, regeneration fluid pressure, regeneration fluid relative humidity, regeneration fluid water vapor partial pressure, a humidity of the process gas during a prior sorption cycle, a system water content, a water content of a sorption unit, a liquid water production rate, a liquid water production volume, liquid water usage rate, liquid water quality, a system power state, an amount of power produced by the water generation unit, an amount of power available of an onboard battery and so on. In various embodiments, a controller (e.g., 1170) can be configured to adjust a system operational setpoint, for example the electrical energy or power usage to one or more system components like an electrical input to the refrigerant compressor, system fan(s), water sanitation device(s), water pumping device(s) and so on.

During a loading or sorption cycle, such as depicted in FIG. 22, the flow rate of the process gas (e.g., ambient air) from inlet 1122, through sorption layer 1118 and exhausted through outlet 1124 can be varied by controller 1170 in wired or wireless communication with fan 1106 to adjust the flow rate of the process gas during the sorption mode. During a release or desorption cycle, such as depicted in FIG. 23, the flow rate of the regeneration fluid can be varied by controller 1170 in wired or wireless communication with fan 1106 based on ambient solar irradiance, ambient temperature, ambient relative humidity, temperature of the regeneration fluid, relative humidity of the regeneration fluid, amount of water present in the hygroscopic material of the sorption layer 1118, an elapsed time, a system power availability, and/or the like. As another example, the controller can activate some or all system fans depending on the system state including flowing ambient air through sorption layer 1118 during the sorption operational mode and/or flowing ambient air across a heat dissipating portion of the heat exchange assembly 1130 (e.g., heat exchanger 1162 and refrigerant condenser 1136) during the desorption operational mode. Additionally, the system controller can transition the system between sorption and desorption modes or cycles based on one or more inputs.

During a release mode, such as depicted in FIG. 20A and FIG. 23, the heat load of the refrigeration circuit 1131 can be varied by controller 1170 in wired or wireless communication with refrigeration circuit 1131 based on input variables including but not limited to: ambient solar irradiance, ambient temperature, ambient relative humidity, temperature of the regeneration fluid, relative humidity of the regeneration fluid, amount of water present in the hygroscopic material of the sorption layer 1118, an amount of water produced, an elapsed time, a system power availability, or a combination thereof. In one particular implementation, the power input or work to the refrigerant compressor 1134 can be varied based on the amount of power produced by the PV panel 1114, the state-of-charge (SOC) of onboard battery 1172, ambient condition(s), internal system temperatures (e.g., temperature of regeneration fluid at one or more locations in the regeneration fluid flow path, refrigerant temperature at one or more locations in the refrigeration circuit, and/or the like) or a combination thereof. In one example, controller 1170 can adjust the refrigerant evaporator temperature and/or the refrigerant condenser temperature based on one or more input variables. In an illustrative example, electrical input to the refrigerant compressor (e.g., 1134) can be reduced if an amount of power produced by the PV panel (e.g., 1114) is below a predetermined threshold, if an amount of power available or state-of-charge (SOC) of onboard battery (e.g., 1172) is below a predetermined threshold, if a system water content is below a predetermined threshold, if an ambient temperature or relative humidity is below a predetermined threshold, if a solar insolation or irradiance is below a predetermined threshold, or a combination thereof. Similarly, electrical input to the refrigerant compressor (e.g., 1134) can be increased if an amount of power produced by the PV panel (e.g., 1114) is above a predetermined threshold, if an amount of power available or state-of-charge (SOC) of onboard battery (e.g., 1172) is above a predetermined threshold, if a system water content is above a predetermined threshold, if an ambient temperature or relative humidity is above a predetermined threshold, if a solar insolation or irradiance is above a predetermined threshold, or a combination thereof. In various implementations, the work input to refrigerant compressor 1134 can be in the range of 10-500 Watts, 100-200 Watts, 140-160 Watts, below 300 Watts, below 200 Watts and/or the like.

In various embodiments, the flow architecture of water generation system 1100 is configured for high efficiency heat transfer between adjacent components, layers and/or portions while also allowing for high flow rates with minimal pressure drop. Furthermore, the flow architecture can include any desirable or suitable number and configuration of layers, spacers, dividers, separators or other flow directing structures or devices to improve heat transfer at a high regeneration gas flux and low pressure drop. For example, various configurations of the water generation system can be provided to maintain a gas flux through the system greater than 30 cubic feet per minute (CFM)/$m^2$, greater than 50 CFM/$m^2$, greater than 100 CFM/$m^2$, or greater than 200 CFM/$m^2$. In some embodiments, configurations of the water generation system can be provided to maintain a gas flux through the system between 25-75 CFM/$m^2$, 30-50 CFM/$m^2$, 40-80 CFM/$m^2$ or 50-70 CFM/$m^2$. Furthermore, the recuperative heat exchange assembly can be configured to maintain a regeneration gas flux in the regeneration flow path greater than 30 CFM and a pressure drop less than 0.5 inches water.

As depicted in FIG. 20A and FIG. 23, a cooling fluid (e.g., ambient air) flows in a cooling flow path 1146 including heat exchanger 1162 and refrigerant condenser 1136 via ambient cooling inlet 1123, cooling outlet 1125 and fan 1160. The cooling fluid (e.g., ambient air) flowing in a cooling flow path 1146 can supplement cooling of the hot-side regeneration fluid in the regeneration fluid flow path to drive condensation of water from the regeneration fluid. The cooling flow path 1146 can be configured to direct ambient air in a direction at least partially counter to the flow direction of hot-side regeneration fluid flow in an adjacent channel or layer before being exhausted via cooling fluid outlet(s) 1125, or more particularly, exhausted to outside environment external to system.

In various embodiments, water generation system 1100 is configured as a solar assembly or panel that can be installed on a surface (e.g., ground surface, rooftop) in a fixed tilt configuration. System 1100 can store at least a portion of produced liquid water in an onboard reservoir (e.g., onboard liquid water reservoir 1180 or "contact" tank). Alternatively or additionally, system 1100 can provide the produced water (e.g., distribute, transport and/or direct produced water) to a separate water management system, external reservoir, and/or dispensing system, for example via pumps and/or gravity.

In some embodiments, system 1100 is coupled to (e.g., via tubing or plumbing) a water tank or external storage reservoir for receiving produced liquid water from system 1100, for example via liquid water dispensing outlet 1182. Water output from system 1100 can be pure and lack minerals, similar to "distilled" water or can be similar to "mineral water" i.e., purified water with additive minerals, for example added to the water after condensation. In various embodiments, system 1100 comprises additional peripheral components to facilitate self-sufficient, compact and/or self-contained deployment including but not limited to components for onboard water treatment, water mineralization, water sanitation and/or the like.

In the illustrative example of FIG. 19, system 1100 optionally comprises one or more pumps for water sanitation, management, transport and/or dispensing. For example, system 1100 can comprise an ozone generator 1185 and a recirculation pump 1184, in combination with liquid water conduits or tubes, configured to ozonate produced water in reservoir 1180 for onboard sanitation. In some embodiments, one or more ozone generators can be provided in the process or regeneration flow paths, for example an ozone ion generator can be positioned at a regeneration gas inlet of refrigerant evaporator 1132 to sanitize water vapor condensing from regeneration fluid. The system can also comprise a dispenser pump 1183 configured to move or transport produced water in onboard reservoir 1180 to a dispensing outlet 1182 for use or consumption by a user. Water generation system can comprise one or more pumps to move or transport water within system, for example condenser pump 1186 can be configured to move or transport, via liquid water conduits or tubes, condensed water from refrigerant evaporator 1132 and/or heat exchanger 1164 to onboard reservoir 1180 for treatment and/or storage. Optionally, onboard pump(s), for example condenser pump 1186, can measure flow rate(s) of liquid water so as to provide an indication of water production, and for example be communicated to controller 1170.

In some embodiments, system 1100 can comprise one or more telematics units (e.g., a transmitter, receiver, transponder, transverter, repeater, transceiver, and/or the like, sometimes referred to herein as "transceiver"). For example, a transceiver may be configured to communicate data to and/or from the system (e.g., via controller 1170) via a wired and/or wireless interface (e.g., which may conform to standardized communications protocols, such as, for example, GSM, SMS components operating at relatively low rates (e.g., operating every few minutes), protocols that may be geographically specified, and/or the like).

Figure 35:
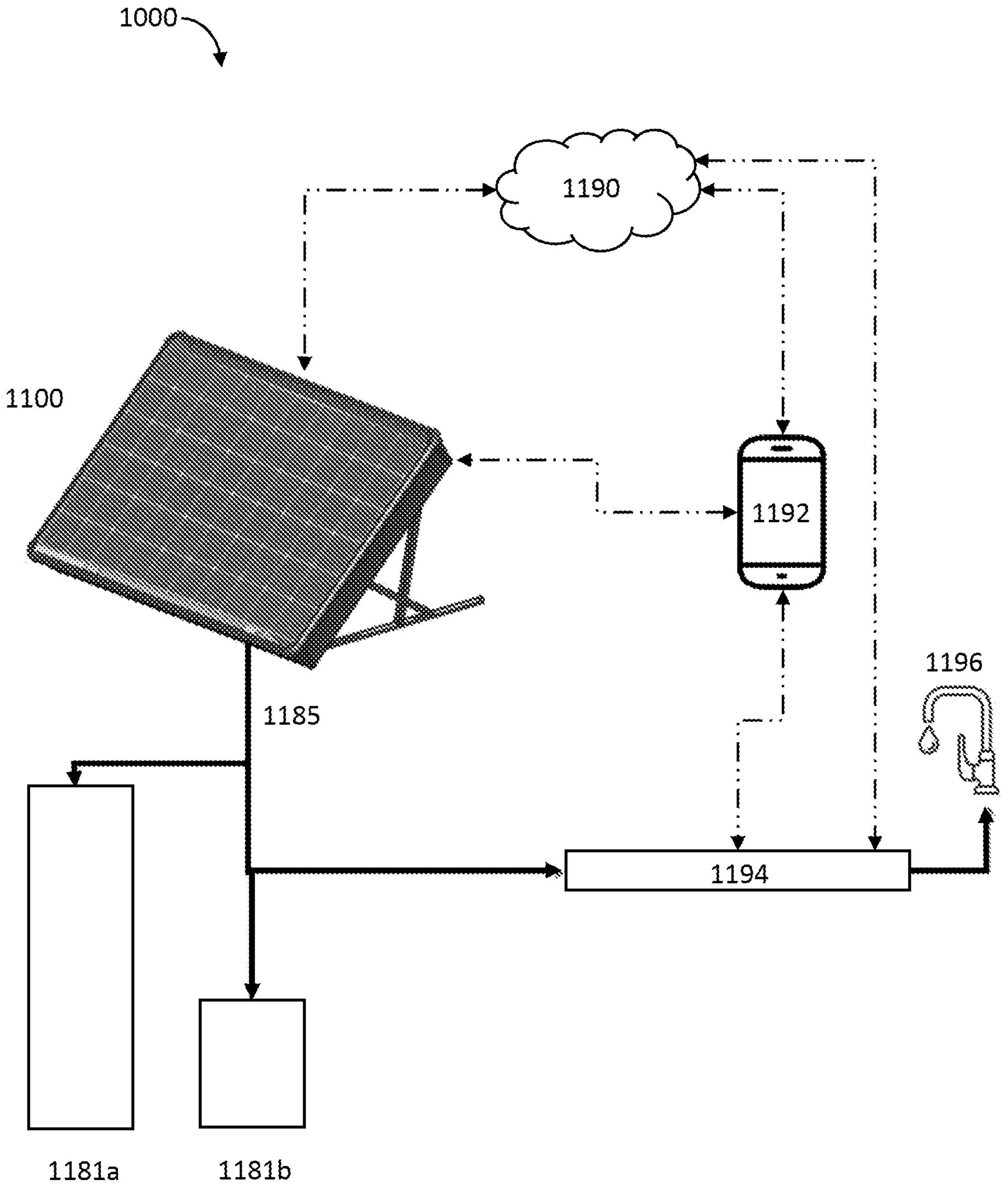
FIG. 35 illustrates a system for providing water to a user, according to an embodiment.

FIG. 35 depicts a system 1000 for providing water to a user that comprises water generation system 1100 coupled to a water management, treatment and/or storage system. One or more transceivers may be associated with a server and a communications network (e.g., 1190) for communicating information between the server and the transceiver (e.g., and thus the system 1100 and/or associated controller(s) thereof). Two-way communication may be facilitated by a cellular tower in cellular range of the system and/or short-range communications like Bluetooth. In some embodiments, a database (e.g., which may be remote from the system) may be configured to store information received from the server over the communications network. A remote server in communication with the system and the user interface, can comprise a memory and a processor comprising various functions including but not limited to: administration functions to retrieving information from the controller relating to characteristics of water production, water usage and water quality; and/or water profile or recipe suggestion functions, wherein the water profile suggestion function causes the processor to compare previously stored data indicative of a water profile setpoint history to previously stored suggested water profiles in the remote server.

As depicted in FIG. 35, water production or generation system 1100 and components of a water management system (e.g., system 1000 comprising external reservoirs 1181*a-b*, water quality adjustment or customization unit(s) 1194 and/or dispenser(s) 1196) can be in communication (as indicated by long dash dot lines) via a network (e.g., 1190, Internet, global network, local area network and/or the like) including one or more servers, data processing resources and/or databases. A user interface (e.g., 1192) can be operable to interact with a user by way of any number of devices, for example a personal computer (PC), a wireless communication device, a wireless data processing device, a wireless phone, a mobile phone and/or the like. In various implementations, a water generation system (e.g., 1100) can be configured to communicate with a water management system and/or a user via one or more of: a cellular network, wireless area network (WAN), Wi-Fi network, satellite network, controller area network (CAN), short-range wireless technologies like Bluetooth and/or the like.

Depending on the installation site and type of networking available, various modes of operation can be employed. For example, a Wi-Fi network can be implemented in a Client mode wherein an onsite wireless router is designated as the access point (AP). In other implementations, an access point mode can be employed wherein a water production system or water management system is designated as an Access Point. In another example, in "dark" installation sites without Wi-Fi or cellular connectivity, a water production system or water management system can act as a local access point, in which case communication to external networks (e.g. 1190) are unavailable and the components of system (e.g., 1000) communicate in an islanded manner.

In an embodiment, one or more users can access network 1190 and/or directly communicate with sub-systems, units or components of system 1000 (e.g., via Wi-Fi, Cellular, I2C, CANBUS and/or the like) through interface 1192. In various embodiments, one or more users can, through network 1190 or via direct communication with sub-systems or units of system 1000 (e.g., water generation panel 1100, external reservoirs 1181*a-b* and/or water quality adjustment or customization unit 1194) to set or configure water preferences or profiles, set or configure system operational modes (e.g. quiet mode, power save mode, hibernation mode, test mode, maintenance mode), access respective accounts, access administrative functions, integrate with other applications, receive scheduled and/or non-scheduled maintenance alerts, receive information relating to system operational status, receive current, historical and/or or forecast operational information and/or receive water-related information including but not limited to: water production, water storage level, water usage, water quality, water recipes and/or the like. Furthermore, users can receive promotions, purchase compatible system components, upgrades or replacement parts, and/or sign up for other types and kinds of opportunities and services as can be required or desired.

One or more external water reservoirs (e.g., 1181*a-b*) can be configured to receive water produced by water generation system 1100 via an inbound water conduit (e.g., dedicated plumb line or tubing insulated to withstand freezing conditions). External water reservoirs (e.g., 1181*a-b*) can be configured to store water produced by water generation system 1100 and optionally can comprise a sanitation unit configured to disinfect or sanitize water produced by water generation system 1100 and/or stored by storage reservoirs 1181*a-b*. A water quality adjustment or customization unit 1194 can customize, adjust or modify the quality of water produced by water generation system 1100. In one example, water customization unit 1194 can add, dissolve or inject additives, agents or other components into water of the storage reservoir 120 in advance of dispensing to a user (e.g., automatically, upon user demand) via dispenser 1196 (e.g., faucet, refrigerator and/or the like). In various implementations, water customization unit 1194 can add one or more additives, agents or components into water entering storage reservoir 1181*a* and/or 1181*b*. In another example, water customization unit 1194 can add additives, agents or components into water stored in storage reservoir 1181*a-b* (e.g., in a recirculating manner). In some embodiments, water customization unit 1194 can add additives, agents or components into produced water in various ways and under various operation conditions. That is, a combination of automatic, programmatic and/or on-demand approaches can be applied to adjust inbound water and/or recirculating water based on the desired operational approach.

Figure 36:
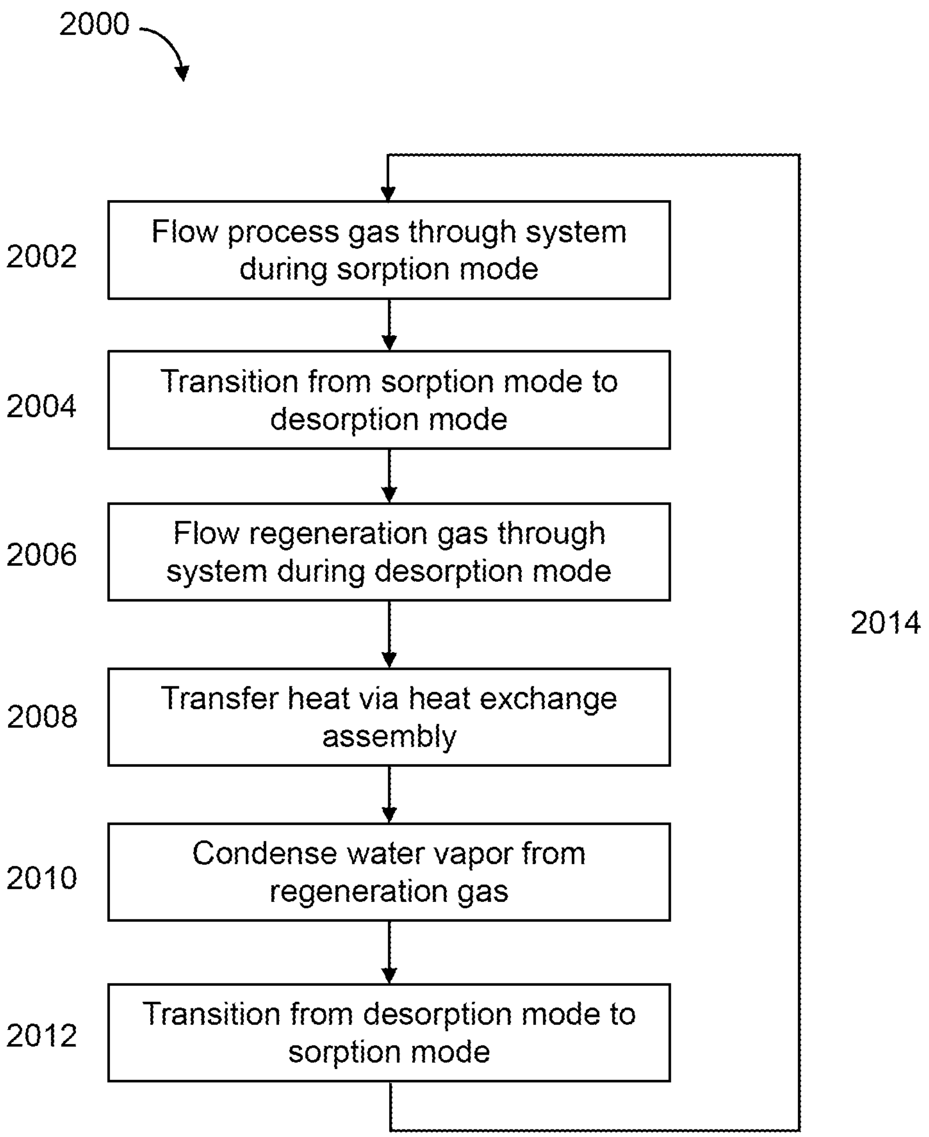
FIG. 36 illustrates a method of operating a water generation system, according to an embodiment.

The present disclosure further provides methods or processes operating a system for generating liquid water from air. Referring to FIG. 36, a flowchart 2000 of a method of operating a water generation system is shown in accordance with an embodiment of the present disclosure.

At operation 2002, a process gas (e.g., ambient air) flows through a sorption unit or layer that can comprise a porous hygroscopic material, for example during a sorption or loading operational mode or cycle (e.g., nighttime). At operation 2002, porous hygroscopic material in the sorption layer can capture water vapor from the process gas. In an illustrative example, controller 1170 can actuate fan 1106 and set valves 1105*a-b* in an open state to flow ambient air through sorption unit 1118 during a time of day between midnight and 7 AM and/or if onboard battery 1172 has a state-of-charge greater than a predetermined threshold.

At operation 2004, the method includes transitioning from the sorption or loading mode to a desorption or regeneration mode (e.g., daytime or morning). In one example, the method comprises monitoring ambient conditions (e.g., solar irradiance, relative humidity, temperature), an actual or estimated system power availability, and/or actual or estimated amount of water in the water generation system (e.g. loading equivalent relative humidity of the hygroscopic material in the sorption layer) and, based on the monitored or estimated data, transitioning from the sorption mode to the desorption mode. In one illustrative example, controller 1170 can set valves 1105*a-b* in a closed state to flow regeneration gas in a closed loop through system 1100 during a time of day between 10 AM and 4 PM and/or if a solar panel of solar layer 1110 is generating power greater than a predetermined threshold (e.g., greater than 100 W, greater than 200 W and/or the like).

As depicted in flowchart 2000, the method comprises flowing regeneration gas in a regeneration flow path including the sorption layer at operation 2006. At operation 2006, the regeneration fluid can accumulate both heat and water vapor upon flowing through the regeneration flow path.

At operation 2008, the method comprises exchanging heat or energy between regeneration flow path segments, ambient air and/or system components, for example between sorption layer and heat exchange assembly, between nodes of a closed loop refrigeration circuit, between segments of a regeneration flow path, and/or between regeneration fluid in the regeneration flow path and the ambient environment. The heat exchange mechanism and/or rate can be varied based on: a user selection, data received from one or more sensors (e.g. data relating to one or more ambient conditions, data relating to water content, etc.), power availability of battery and/or PV panel, forecast conditions, a time of day, programmatic control, an algorithm, combinations thereof, or by any other desirable bases. In one example, the method comprises continuous monitoring of ambient conditions (e.g., solar irradiance, relative humidity, temperature), actual or estimated amount of power available from battery and/or PV panel, and/or actual or estimated amount of water in the sorption layer.

In some embodiments, operation 2008 comprises circulating, during the desorption cycle, a refrigerant in a closed loop refrigeration circuit including a refrigerant compressor, a refrigerant condenser, a refrigerant expansion device or valve, and a refrigerant evaporator. In one example, operation 2008 can include transferring, via the refrigerant evaporator, heat from condensation of water vapor in the regeneration gas to the refrigerant. In another example, operation 2008 can include transferring, via the refrigerant condenser, heat from condensation of refrigerant vapor to the sorption layer. In one example, controller (e.g., 1170) can determine an amount of power provided a fan (e.g., regeneration flow fan 1106 and/or cooling flow fan 1160) and a refrigerant compressor (e.g., 1134) based on and actual or estimated amount of power available from battery (e.g., 1172) and/or PV panel (e.g., 1114), and/or actual or estimated amount of water in the sorption unit (e.g., 1118).

At operation 2010, the method includes condensing water vapor from the regeneration gas in the regeneration flow path to produce liquid water during the desorption cycle. According to an embodiment, operations 2008 and 2010 can occur simultaneously.

At operation 2012, the method further comprises transitioning from the desorption or regeneration operational mode to the sorption or loading mode.

At operation 2014, the process can be repeated or cycled. Transitioning between the unloading/desorption mode and loading/sorption mode can be varied based on: a user selection, data received from one or more sensors (e.g. data relating to one or more ambient conditions, data relating to water content, etc.), power availability, forecast conditions, programmatic control, an algorithm, combinations thereof or by any other desirable bases. In one example, the method comprises continuous monitoring of ambient conditions (e.g., solar irradiance, relative humidity, temperature) and/or actual or estimated amount of water in the sorption layer and, based on the monitored or estimated data. In various implementations, the method can include determining if a water mass uptake by the sorption layer is greater than a predetermined mass associated with a nighttime relative humidity (e.g., average relative humidity at the panel) during a during nighttime or sorption time.

The control system can dynamically and efficiently produce liquid water based on ambient environmental conditions (e.g., solar insolation, solar irradiance, temperature, RH) in combination with system operational properties or status (e.g. water content in sorption layer, battery state of charge (SOC), and so on). For example, the operational ranges and/or setpoints of system 100 can be determined and dynamically adjusted (e.g., according to the diurnal cycle) so as to efficiently drive water vapor from the hygroscopic material (e.g., in the sorption layer) towards vapor pressure saturation in the working fluid and condensation at the condenser.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively. The term "about" or "substantially," as used herein, is intended to encompass minor deviations rather define an exact value.

The invention claimed is:

1. A system for generating water from ambient air comprising:

a multi-layer solar collection structure configured to convert solar radiation into heat and electrical energy;

a hygroscopic capture unit comprising a hygroscopic material configured to capture water vapor from ambient air during a loading mode;

a flow path configured to flow a working gas through the system to collect heat from the multi-layer solar collection structure by flowing the working gas along at least one exterior surface of the multi-layer solar collection structure and to accumulate water vapor from the hygroscopic capture unit during an unloading mode;

a modular heat exchange assembly including a refrigeration circuit configured to circulate a refrigerant between a refrigerant compressor, a refrigerant condenser, a refrigerant expansion device, and a refrigerant evaporator;

wherein the refrigerant evaporator is configured to transfer heat from condensation of water vapor in the working gas to the refrigerant, thereby condensing water vapor from the working gas during the unloading mode; and a microprocessor-based control module in communication with the refrigeration circuit, wherein the control module is configured to adjust a system operational setpoint based on a system operational state, an environmental condition or a combination thereof, wherein the hygroscopic capture unit is thermally coupled with the multi-layer solar collection structure such that thermal energy generated by the multi-layer solar collection structure is transferred to the hygroscopic capture unit during the unloading mode.

2. The system of claim 1, wherein the hygroscopic capture unit comprises a plurality of porous hygroscopic bodies comprising hygroscopic material, wherein the working gas flows through each of the plurality of porous hygroscopic bodies after flowing along the exterior surface of the multi-layer solar collection structure.

3. The system of claim 2, wherein each of the plurality of porous hygroscopic bodies is are separated by tapering flow channels through which working gas flows in the flow path.

4. The system of claim 1, wherein the modular heat exchange assembly comprises an ambient air heat exchanger configured to transfer heat from ambient air flowing in a cooling fluid path to the working gas upon flow therethrough, thereby driving condensation of water vapor from the working gas during the unloading mode.

5. The system of claim 4, wherein the ambient air flowing in the cooling fluid path is directed to the refrigerant condenser to collect heat therefrom.

6. The system of claim 4, further comprising a cooling fan configured to cool the working gas flowing in the ambient air heat exchanger, and, wherein the control module is configured to adjust a power distribution setpoint between the cooling fan and the refrigerant compressor of the refrigeration circuit.

7. The system of claim 1, wherein the modular heat exchange assembly comprises a recuperative heat exchanger including a plurality of hot-side flow layers alternating between a plurality of cold-side flow layers, wherein:

the working gas flows in a first segment of the flow path including the plurality of hot-side flow layers in a direction at least partially counter to:

a flow direction of a cooling fluid flow in a cooling fluid flow path including at least one of the plurality of cold-side flow layers;

a flow direction of the working gas flowing in a second segment of the flow path including at least one of the plurality of cold-side flow layers; or, a combination thereof.

8. The system of claim 1, wherein the flow path is configured to flow working gas in a closed loop such that at least a portion of the working gas is returned to the hygroscopic capture unit from the refrigerant evaporator.

9. The system of claim 1, wherein the refrigerant condenser is configured to transfer heat from condensation of refrigerant vapor to the hygroscopic capture unit by conductive heat transfer via direct thermal contact, convective heat transfer via fluid flow, or a combination thereof.

10. The system of claim 1, wherein the multi-layer solar collection structure comprises a plurality of photovoltaic cells; and, wherein the hygroscopic capture unit is configured to receive heat from the plurality of photovoltaic cells.

11. The system of claim 10, wherein the working gas flows along at least one surface of the plurality of photovoltaic cells to capture heat directly from the photovoltaic cells before flowing through the hygroscopic capture unit, the hygroscopic capture unit being thermally coupled to the plurality of photovoltaic cells in advance of flowing through the hygroscopic capture unit.

12. The system of claim 10, wherein the hygroscopic capture unit is coupled to a rear surface of the photovoltaic cells; and, wherein the working gas flows along a top surface of the photovoltaic cells, and through the hygroscopic capture unit coupled to the rear surface of the photovoltaic cells.

13. The system of claim 1, wherein the electrical energy generated by the multi-layer solar collection structure powers the refrigeration circuit.

14. The system of claim 1, wherein the refrigerant comprises: chlorofluorocarbon (CFC), hydrochlorfluorocarbon (HCFC), hydrofluorocarbon (HFC), hydrocarbon (HC), ammonia, carbon dioxide, water or combinations thereof.

15. The system of claim 1, wherein the control module is configured to adjust the operational setpoint based on the system operational state including a system power state, an amount of power produced by a power generation unit, an amount of power available of a battery, a battery state-of-charge, a system temperature, a temperature of the working gas, a humidity of the working gas, a pressure of the working gas, a humidity of ambient air during a prior loading cycle, a system water content, a water content of the hygroscopic capture unit, a water production rate, a water production volume, a water usage rate, an amount of water usage, or combinations thereof.

16. The system of claim 1, wherein the control module is configured to adjust the operational setpoint based on the environmental condition including an ambient relative humidity, an ambient temperature, a solar irradiance, a time of day, a weather event, a weather forecast, or combinations thereof.

17. The system of claim 1, wherein the control module is configured to adjust an electrical input to the refrigerant compressor based on an amount of power produced by the multi-layer solar collection structure, an amount of energy available of an onboard battery, a system water content, a water content of the hygroscopic capture unit, an ambient temperature, an ambient relative humidity, a solar irradiance, or a combination thereof.

18. The system of claim 1, wherein the control module is configured to adjust the operational setpoint based on the system operational state including an amount of power to the refrigerant compressor, an amount of power to a system fan, a power distribution setpoint between the refrigerant compressor and a system fan, setting system operation to transition between the loading mode and the unloading mode, or a combination thereof.

19. The system of claim 1, wherein the control module is configured to adjust the system operational setpoint including an amount of electrical energy or power to the refrigerant compressor based on: a system operational state, an environmental condition or a combination thereof.

20. A method for producing water from air comprising:

converting, by a multi-layer solar collection structure, solar radiation into heat and electrical energy;

flowing a process gas through a hygroscopic capture unit comprising a hygroscopic material to capture water vapor from ambient air during a loading cycle;

transitioning from the loading cycle to an unloading cycle;

flowing a working gas in a flow path to collect heat from the multi-layer solar collection structure by flowing the working gas along at least one exterior surface of the multi-layer solar collection structure prior to flowing through the hygroscopic capture unit and to accumulate water vapor from the hygroscopic capture unit during the unloading cycle;

circulating, during the unloading cycle, a refrigerant between a refrigerant compressor, a refrigerant condenser, a refrigerant expansion device, and a refrigerant evaporator; and, condensing, by the refrigerant evaporator, water vapor from the working gas in the flow path to produce liquid water during the unloading cycle, wherein the refrigerant evaporator is configured to transfer heat from condensation of water vapor in the working gas to the refrigerant.

21. The method of claim 20, further comprising adjusting, by a control module, a system operational setpoint based on a system operational state, an environmental condition or a combination thereof.

* * * * *